(12) United States Patent
Nayak

(10) Patent No.: US 9,274,717 B2
(45) Date of Patent: *Mar. 1, 2016

(54) DEDUPLICATION OF DATA BLOCKS ON STORAGE DEVICES

(71) Applicant: NetApp, Inc., Sunnyvale, CA (US)

(72) Inventor: Manoj Nayak, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/261,452

(22) Filed: Apr. 25, 2014

(65) Prior Publication Data

US 2014/0325147 A1 Oct. 30, 2014

Related U.S. Application Data

(63) Continuation of application No. 13/419,948, filed on Mar. 14, 2012, now Pat. No. 8,732,403.

(51) Int. Cl.
*G06F 3/06* (2006.01)
*G06F 12/12* (2006.01)
*G06F 12/08* (2006.01)

(52) U.S. Cl.
CPC .............. *G06F 3/0641* (2013.01); *G06F 3/067* (2013.01); *G06F 3/0608* (2013.01); *G06F 3/0619* (2013.01); *G06F 3/0689* (2013.01); *G06F 12/0833* (2013.01); *G06F 12/0866* (2013.01); *G06F 12/12* (2013.01)

(58) Field of Classification Search
CPC ............ G06F 17/30156; G06F 3/0641; G06F 3/0689; G06F 12/0833; G06F 12/0891; G06F 2212/69; G06F 3/0619; G06F 12/0866; G06F 3/0608; G06F 3/067; G06F 3/0683; G06F 12/12; G06F 11/1666
See application file for complete search history.

(56) References Cited

U.S. PATENT DOCUMENTS

| 8,463,981 B2 | 6/2013 | Mori et al. |
| 2009/0063528 A1 | 3/2009 | Yueh |
| 2009/0204765 A1 | 8/2009 | Gupta et al. |
| 2011/0320865 A1* | 12/2011 | Jain et al. ..................... 714/6.22 |
| 2013/0151756 A1* | 6/2013 | Tofano .......................... 711/103 |
| 2013/0226881 A1* | 8/2013 | Sharma et al. ................ 707/692 |

* cited by examiner

*Primary Examiner* — Hashem Farrokh
(74) *Attorney, Agent, or Firm* — Gilliam IP PLLC

(57) ABSTRACT

A storage system comprises a cache for caching data blocks and storage devices for storing blocks. A storage operating system may deduplicate sets of redundant blocks on the storage devices based on a deduplication requirement. Blocks in cache are typically deduplicated based on the deduplication on the storage devices. Sets of redundant blocks that have not met the deduplication requirement for storage devices and have not been deduplicated on the storage devices and cache are targeted for further deduplication processing. Sets of redundant blocks may be further deduplicated based on their popularity (number of accesses) in cache. If a set of redundant blocks in cache is determined to have a combined number of accesses being greater than a predetermined threshold number of accesses, the set of redundant blocks is determined to be "popular." Popular sets of redundant blocks are selected for deduplication in cache and the storage devices.

20 Claims, 24 Drawing Sheets

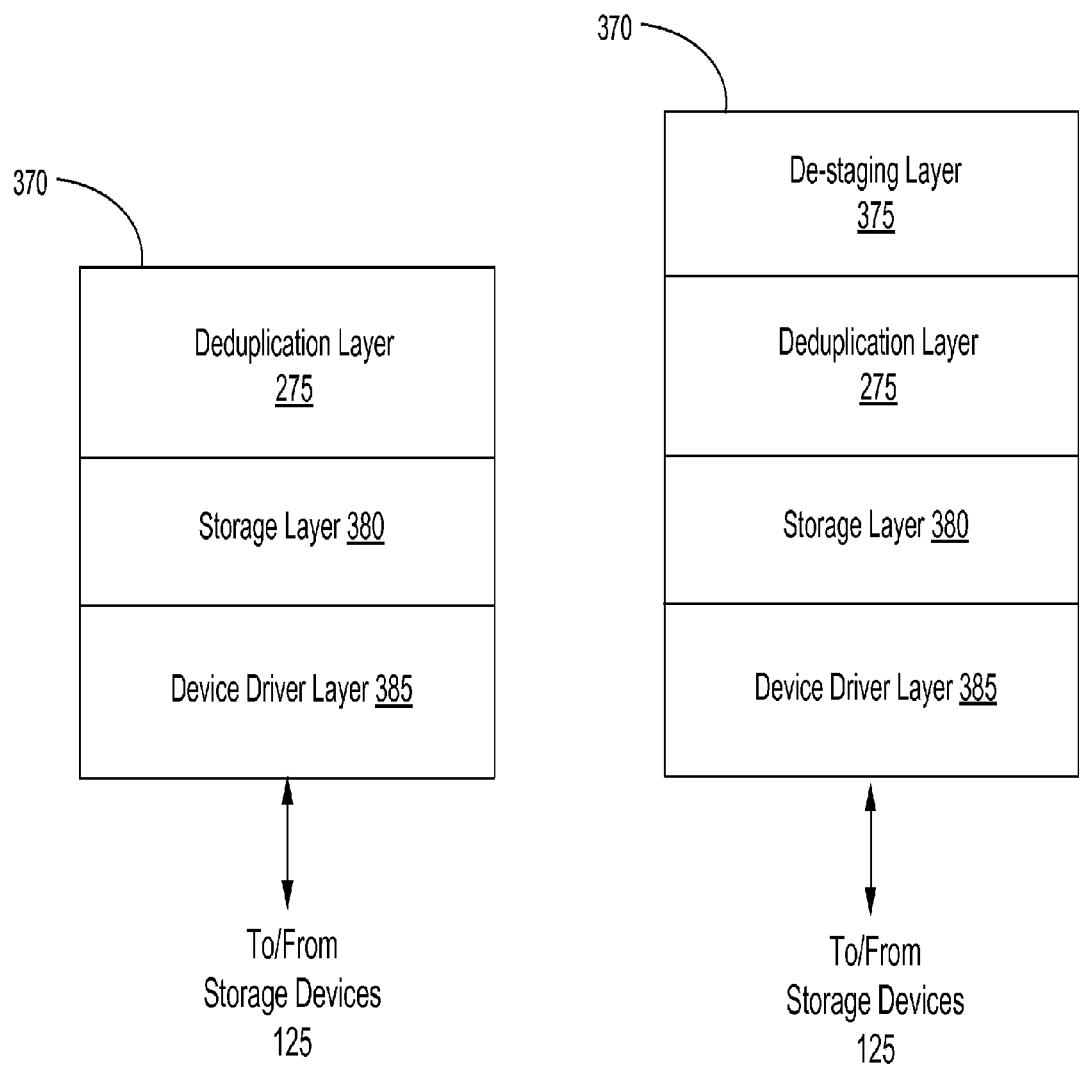

| Content ID | Size | SSAs | Ref count | THN indicator | Seq. DD indicator | Set DD indicators |
|---|---|---|---|---|---|---|
| CI1 | 6 | S1 1, E1 2<br>S2 3, E2 4 | 3 | 1 | 0 | 001100 |
| CI2 | 5 | S1 5, E1 6<br>S2 7, E2 8 | 2 | 1 | 0 | 11001 |
| CI3 | 5 | S1 9, E1 10<br>S2 11, E2 12 | 2 | 1 | 1 | 11111 |
| CI4 | 1 | S1 13<br>S2 14 | 4 | 0 | 1 | 1 |
| CI5 | 1 | S1 15<br>S2 16 | 2 | 0 | 0 | 0 |
| CI6 | 3 | S1 17, E1 18<br>S2 19, E2 20 | 3 | 0 | 1 | 111 |
| ⋮ | ⋮ | ⋮ | ⋮ | ⋮ | ⋮ | ⋮ |

Fig. 11

| SSA | Header CA |
|---|---|
| SSA B1 | CA C1 |
| SSA B2 | CA C2 |
| SSA B3 | CA C3 |
| SSA B4 | CA C3 |
| SSA B5 | CA C3 |
| SSA B6 | CA C4 |
| SSA B7 | CA C5 |
| ⋮ | ⋮ |

Fig. 15

DEDUPLICATION OF DATA BLOCKS ON STORAGE DEVICES

CROSS-REFERENCE TO RELATED APPLICATIONS

This application is a continuation of, claims the benefit of and priority to, previously filed U.S. patent application Ser. No. 13/419,948 filed Mar. 14, 2012, entitled "DEDUPLICATION OF DATA BLOCKS ON STORAGE DEVICES," the subject matter of which is hereby incorporated by reference in its entirety.

FIELD OF THE INVENTION

The present invention relates to storage systems, and particularly, to deduplication of data blocks on storage devices.

BACKGROUND OF THE INVENTION

A storage system is a processing system adapted to store and retrieve information/data on storage devices (such as disks). The storage system includes a storage operating system that implements a file system to logically organize the information as a hierarchical structure of directories and files on the storage devices. Each file may comprise a set of data blocks, whereas each directory may be implemented as a specially-formatted file in which information about other files and directories are stored.

The storage operating system generally refers to the computer-executable code operable on a storage system that manages data access and access requests (read or write requests requiring input/output operations) and may implement file system semantics in implementations involving storage systems. In this sense, the Data ONTAP® storage operating system, available from NetApp, Inc. Sunnyvale, Calif., which implements a Write Anywhere File Layout (WAFL®) file system, is an example of such a storage operating system implemented as a microkernel within an overall protocol stack and associated storage. The storage operating system can also be implemented as an application program operating over a general-purpose operating system, such as UNIX® or Windows®, or as a general-purpose operating system with configurable functionality, which is configured for storage applications as described herein.

A storage system's storage is typically implemented as one or more storage volumes that comprise physical storage devices, defining an overall logical arrangement of storage space. Available storage system implementations can serve a large number of discrete volumes. A storage volume is "loaded" in the storage system by copying the logical organization of the volume's files, data, and directories, into the storage system's memory. Once a volume has been loaded in memory, the volume may be "mounted" by one or more users, applications, devices, and the like, that are permitted to access its contents and navigate its namespace.

A storage system may be configured to allow server systems to access its contents, for example, to read or write data to the storage system. A server system may execute an application that "connects" to the storage system over a computer network, such as a shared local area network (LAN), wide area network (WAN), or virtual private network (VPN) implemented over a public network such as the Internet. The application executing on the server system may send an access request (read or write request) to the storage system for accessing particular data stored on the storage system.

As described above, the storage system may typically implement large capacity storage devices (such as disk devices) for storing data. For improved response to received read or write requests, however, the storage system may also temporarily store/cache particular data in a smaller cache memory in storage system memory for faster access. The cache memory may comprise a memory device having lower random read-latency than a typical storage device and may thus still provide faster data access than a typical large capacity storage device. However, the cache memory may comprise a memory device that is more costly (for a given amount of data storage) than a typical large capacity storage device. Since the storage size of the cache memory is relatively small, data stored in the cache memory must routinely be removed from the cache memory to make space for new data. The storage system may employ cache replacement algorithms that determine which data to retain and which to remove from cache memory.

Thus, the storage system may implement a cache memory in the storage system memory to provide faster responses to received read or write requests. In addition, the storage system may implement various methods for saving storage space on the storage system. For example, the storage system may also implement deduplication methods when storing data on the storage devices. Deduplication methods may be used to remove redundant data and to ensure that only a single instance of the same data is stored on the storage devices. Rather than storing multiple copies of the same data on the storage devices, a single instance of the data is typically stored and referenced/indexed multiple times. Since redundant data is removed, deduplication of data typically saves storage space.

However, indiscriminate deduplication of data may cause longer read latencies when reading data that has been deduplicated. For example, when a file to be written to the storage devices is received, any blocks of the received file that match any blocks currently stored in the storage devices are typically considered redundant blocks and are deduplicated (i.e., are deleted from or not stored to the storage devices and a reference/index to the address location of the matching stored blocks is produced in their place). Any non-redundant blocks in the received file are written to the storage devices. When a read request for the received file is later received, the storage system performs the read request by retrieving the stored non-redundant blocks and, for each redundant block, uses the reference/index produced for the redundant block to seek and retrieve its matching stored block.

However, when the storage devices comprise disk devices, the matching stored blocks may be written on particular tracks of a platter of the disk device, whereas the non-redundant blocks of the received file are typically written on different tracks of the disk device. When reading blocks from the same track, a read/write head of the disk device typically exhibits low latency times as it may quickly retrieve the blocks sequentially from the same track. When reading blocks from different tracks, however, a read/write head of the disk device incurs significant seek times each time it repositions onto a different track to retrieve a block of data.

If indiscriminate deduplication of data is performed on a single-block basis (whereby each individual block found to be redundant is deduplicated), later reading of the received file may incur significant read latency if the read/write head frequently seeks and retrieves single blocks stored on different tracks. For example, later reading of the received file may comprise retrieving non-redundant blocks on a first track, seeking and retrieving a single matching stored block on a second track, then seeking and retrieving non-redundant blocks on the first track, then seeking and retrieving a single matching stored block on the second track, etc. As such, use of deduplication on a single-block basis on a disk device may later cause significant read latency as the read/write head of the disk device repositions back and forth between different tracks to seek and retrieve single matching blocks.

Currently, deduplication methods have been developed to avoid such indiscriminate deduplication of data that increases read latencies. For example, some deduplication methods may require a predetermined threshold number (THN) of sequential blocks before deduplication is performed. Such deduplication methods may avoid the significant read latency incurred by indiscriminate deduplication.

If any data blocks are deduplicated on the storage devices, the same data blocks are also typically deduplicated in the cache memory of the storage system. When deduplicating data blocks in a cache memory, only a single instance of redundant blocks may be stored in the cache memory. Deduplication of data blocks in the cache memory may similarly provide storage savings in the cache memory. Since the storage size of the cache memory is relatively small, any storage savings realized in the cache memory is particularly beneficial. Typically, however, data blocks in cache memory are deduplicated based only on the deduplication of data blocks on the storage devices, and further deduplication processing of the data blocks in cache memory is not performed. As such, further deduplication of data blocks and storage savings in the cache memory are not realized by conventional deduplication methods.

SUMMARY OF THE INVENTION

A storage system may comprise a cache memory for caching data blocks and a set of storage devices for storing data blocks. The storage operating system may deduplicate sets of redundant data blocks on a set of storage devices based on a predetermined deduplication requirement for storage devices. In general, sets of redundant data blocks are deduplicated on the storage devices if they meet the predetermined deduplication requirement and sets of redundant data blocks are not initially deduplicated on the storage devices if they do not meet the predetermined deduplication requirement. As such, the storage devices typically store sets of redundant data blocks since not all sets of redundant data blocks will meet the predetermined deduplication requirement. For illustrative purposes only, the predetermined deduplication requirement is described below as a THN sequence of redundant blocks. In other embodiments, however, the predetermined deduplication requirement for storage devices comprises another type or form of deduplication requirement for storage devices.

Data blocks in cache memory are typically deduplicated based only on the deduplication of data blocks on the storage devices, and further deduplication processing of the data blocks in cache memory is not performed. As such, further deduplication of data blocks and storage savings in the cache memory are not realized by conventional deduplication methods. For example, if some sets of redundant data blocks were deduplicated on the storage devices (since they met the predetermined deduplication requirement), if corresponding copies of the sets of redundant data blocks are currently stored in cache memory, these corresponding copies of the sets will also be deduplicated in cache memory. However, if some sets of redundant data blocks were not deduplicated on the storage devices (since they did not meet the predetermined deduplication requirement), if corresponding copies of the sets of redundant data blocks are currently stored in cache memory, these corresponding copies of the sets will not be deduplicated in cache memory and further deduplication processing of redundant data blocks in cache memory is not performed.

In some embodiments, sets of redundant blocks in cache memory that have not been deduplicated are further processed for deduplication based on the popularity (number of accesses) of the sets of redundant blocks in cache memory. For example, sets of redundant blocks that have not met the predetermined deduplication requirement for storage devices (e.g., comprise non-THN sequences of redundant blocks) and have not been deduplicated on the storage devices (and thus have not been deduplicated in cache memory), are targeted for further deduplication processing in cache memory. In some embodiments, if a set of redundant blocks in cache memory is determined to have a combined number of accesses being equal to or greater than a predetermined threshold number of accesses, each data block in the set of redundant blocks is determined to be "popular." Popular sets of redundant blocks are selected for deduplication in cache memory and the storage devices.

Deduplication of popular sets of redundant blocks (data blocks with a relatively high number of accesses) is especially beneficial in cache memory since popular data blocks are typically retained in cache memory by the cache replacement policy for longer periods of time than unpopular data blocks (data blocks with a relatively low number of accesses). As such, greater storage savings are realized over a longer period of time for deduplication of popular sets of redundant blocks than for unpopular sets of redundant blocks.

In some embodiments, popular sets of redundant blocks identified and selected for deduplication in cache memory are also selected for deduplication on the storage devices. This may be referred to as "cache initiated deduplication on storage devices." Note that deduplication of sets of redundant blocks that have not met the predetermined deduplication requirement (e.g., non-THN sequences of redundant blocks) will still provide storage savings in the storage devices. However, deduplication of such sets of redundant blocks may have some negative effects as well. For example, deduplication of non-THN sequences of redundant blocks on the storage devices may cause longer read latencies when later reading the deduplicated data blocks. However, as described above, if data blocks requested in a read request are resident in cache memory (comprising a cache hit), the requested data blocks are retrieved from cache memory, thus avoiding the need to retrieve the requested data blocks from the storage devices and the longer read latencies. If data blocks are popular (have a relatively high number of accesses), they will likely be retained in cache memory for longer periods of time by the cache replacement policy. Thus the popular data blocks will often be retrieved from cache memory, thus avoiding retrieval from the storage devices altogether, and reducing the read latencies overall.

Novel embodiments described herein may leverage caching mechanisms for determining popularity of data blocks. The popularity information of data blocks may be used to provide further deduplication of data blocks in cache memory and storage devices. As such, embodiments described herein may combine features of caching and deduplication to provide further deduplication of data blocks in cache memory and storage devices.

Some embodiments herein describe a system and method for deduplicating data blocks on a set of storage devices, the system comprising the set of storage devices for storing data blocks and a cache memory for caching data blocks. The system may also comprise a deduplication engine configured for deduplicating one or more sets of redundant data blocks on the set of storage devices that meet a predetermined deduplication requirement for storage devices, each data block in a set of redundant data blocks comprising matching data content, wherein the set of storage devices stores sets of redundant data blocks that have not met the predetermined deduplication requirement; receiving a first data structure specifying at least a first set of redundant data blocks selected for deduplication in the cache memory; and deduplicating the first set of redundant data blocks on the storage devices based on the selection of the first set of redundant data blocks for deduplication in cache memory.

The first data structure may comprise a popular block data structure that specifies sets of redundant data blocks determined to be popular in cache memory, each popular set of redundant data blocks comprising data blocks having a combined number of accesses in cache memory greater than a predetermined threshold number of accesses. The deduplication engine may be further configured for, before deduplicating the first set of redundant data blocks on the storage devices, determining that the first set of redundant data blocks did not meet the predetermined deduplication requirement for the storage devices and have not been deduplicated on the set of storage devices.

The deduplication engine may be further configured for maintaining a deduplication data structure for storing information for sets of redundant data blocks on the set of storage devices, the deduplication data structure comprising a plurality of entries, each entry representing one or more sets of redundant data blocks and indicating if the one or more sets of redundant data blocks meets the predetermined deduplication requirement for storage devices or not. Each entry in the deduplication data structure further may indicate if all of the one or more sets of redundant data blocks have been deduplicated on the storage devices or not. The first entry may represent a plurality of sets of redundant data blocks; and the first entry may further indicate individually, for each set of redundant data blocks, if the set of redundant data blocks has been deduplicated on the storage devices or not.

Each data block stored to the set of storage devices may comprise an associated storage system address and a single data block in a deduplicated set of redundant data blocks may be stored to the set of storage devices. The storage system address of each data block in a deduplicated set of redundant data blocks may map to the single data block stored to the set of storage devices.

Other embodiments herein describe a system and method for deduplicating data blocks on a set of storage devices based on a predetermined threshold number (THN) of data blocks, the system comprising the set of storage devices for storing data blocks and a cache memory for caching data blocks. The system may further comprise a deduplication engine configured for deduplicating at least one THN sequence of redundant blocks on the set of storage devices, the THN sequence of redundant blocks comprising a first THN sequence of blocks that matches in data content a second THN sequence of blocks, each THN sequence of blocks comprising a sequence of THN or more blocks, THN having a value of 2 or greater, wherein the set of storage devices stores at least one non-THN sequence of redundant blocks comprising a first non-THN sequence of blocks that matches in data content a second non-THN sequence of blocks, each non-THN sequence of blocks comprising a sequence of less than THN blocks; receiving a first data structure specifying at least a first non-THN sequence of blocks for deduplication in the cache memory; and deduplicating the first non-THN sequence of blocks on the storage devices based on the selection of the first non-THN sequence of redundant blocks for deduplication in cache memory.

The first data structure may comprise a popular block data structure that specifies non-THN sequences of redundant blocks determined to be popular in cache memory, each popular non-THN sequence of redundant blocks comprising data blocks having a combined number of accesses in cache memory greater than a predetermined threshold number of accesses.

Each data block stored to the set of storage devices may comprise an associated storage system address, a single data block in a deduplicated sequence of redundant blocks may be stored to the set of storage devices, and the storage system address of each data block in a deduplicated sequence of redundant blocks may map to the single data block stored to the set of storage devices.

BRIEF DESCRIPTION OF THE DRAWINGS

The novel features are set forth in the appended claims. However, for purpose of explanation, several embodiments of the invention are set forth in the following figures.

FIG. 4 is a conceptual diagram of storage-side layers of the storage operating system;

FIG. 5 is a conceptual diagram of storage-side layers of the storage operating system comprising a de-staging layer;

FIG. 11 shows a conceptual diagram of an exemplary deduplication data structure (DS) maintained for the storage devices;

FIG. 15 shows a conceptual illustration of an exemplary cache mapping DS:

DETAILED DESCRIPTION

Figure 1:
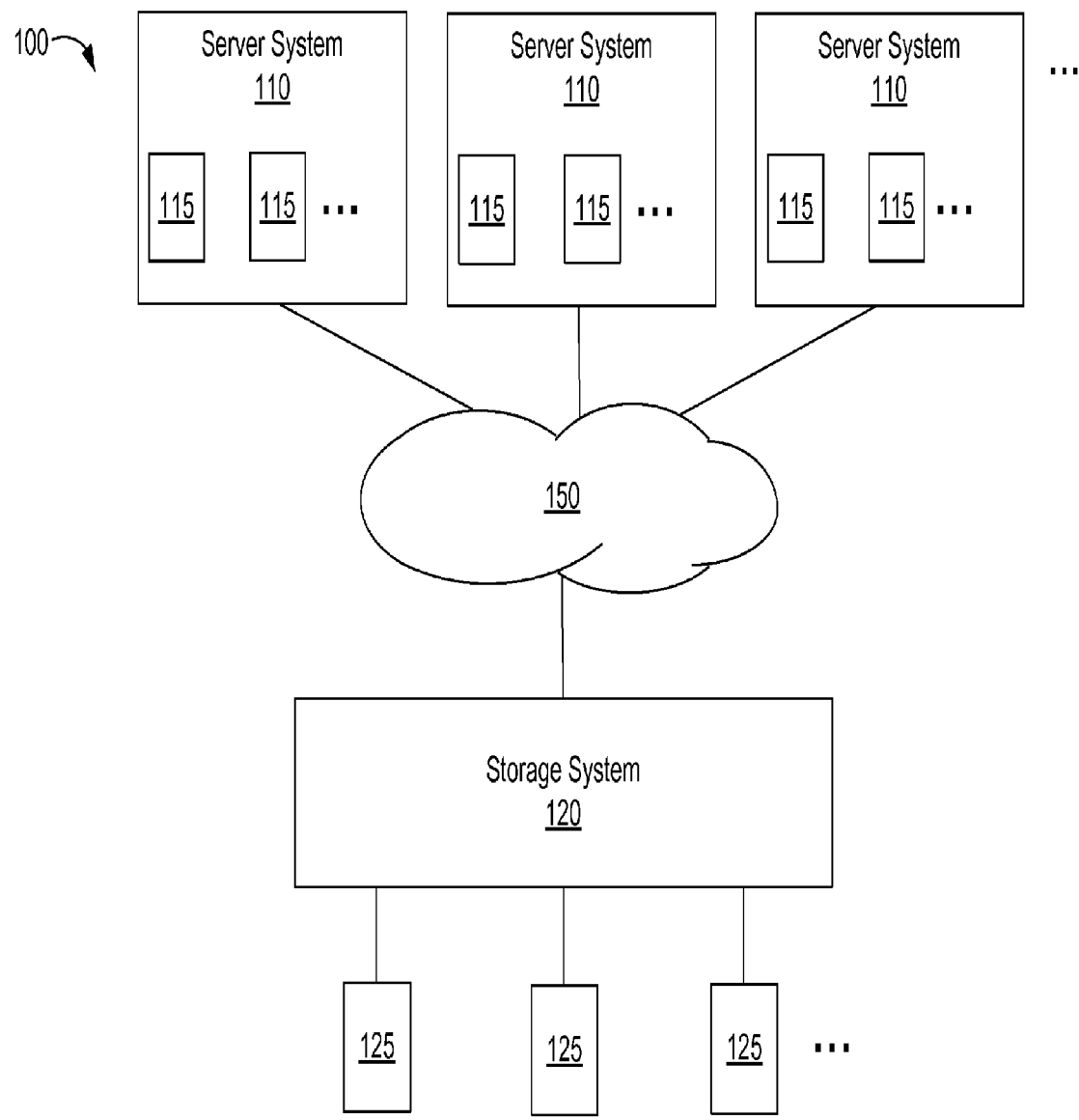
FIG. 1 is a schematic block diagram of an exemplary storage system environment using caching and deduplication in which some embodiments operate.

In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

The description that follows is divided into 8 sections. Section I describes terms used herein. Section II describes a storage system environment using caching and deduplication. Section III describes deduplication on storage devices based on threshold number of sequential blocks. Section IV describes deduplication of data on storage devices and cache memory. Section V describes caching mechanisms and methods. Section VI describes an overview of deduplication based on block popularity. Section VII describes offline deduplication on storage devices and cache memory based on block popularity. Section VIII describes online deduplication on storage devices and cache memory based on block popularity.

I. TERMS

Storage system address: As used herein, a storage system address may comprise logical and/or physical address location information used by the storage system for uniquely identifying a data block on the storage devices. The storage system address for a data block may be used by the storage operating system to locate and access (read/write) the data block. A storage system address may be expressed in various forms. Examples of various storage system addresses include inode number, file block number (FBN), logical block number (LBN), logical block address (LBA), physical block number (PBN), etc. In other embodiments, other forms of storage system addresses may be used.

Cache address: As used herein, a cache address indicates a storage location in cache memory. For example, a cache address may indicate the storage location of a metadata header or a data block stored in cache memory.

Block identifier: As used herein, a block identifier may uniquely identify a data block. Examples of block identifiers include a storage system address or a cache address of the data block.

Predetermined deduplication requirement for storage devices: As used herein, sets of redundant data blocks are deduplicated on storage devices based on a predetermined deduplication requirement for storage devices. For example, the predetermined deduplication requirement may comprise a THN sequence of redundant blocks. Sets of redundant data blocks are deduplicated on the storage devices if they meet the predetermined deduplication requirement. Sets of redundant data blocks are not initially deduplicated on the storage devices if they do not meet the predetermined deduplication requirement.

Threshold number (THN) of blocks: As used herein, THN comprises a predetermined threshold number of blocks being two or greater.

Sequence of blocks: As used herein, a sequence of blocks comprises blocks having sequential/consecutive storage system addresses.

THN sequence of blocks: As used herein, a THN sequence of blocks comprises a sequence of THN or more data blocks.

Non-THN sequence of blocks: As used herein, a non-THN sequence of blocks comprises a sequence of less than THN data blocks.

Redundant block: As used herein, a "redundant block" matches (in data content) a stored block ("matching stored block"). A block that does not match any stored blocks is referred to as a "non-redundant block." A block may be considered to "match" another block when both blocks have the same content or there is a high probability that both blocks have the same data content.

Deduplicated block: As used herein, a deduplicated block comprises a redundant block that is not stored and is replaced by an index to its corresponding matching stored block.

Sequence of redundant blocks: As used herein, if a first sequence of blocks match (in data content) a second sequence of blocks, the combination of the first and second sequences of blocks may be referred to as a "sequence of redundant blocks." As used herein, a "deduplicated sequence of redundant blocks" indicates that the first sequence of blocks is deduplicated and not stored and the second sequence of blocks is stored.

THN sequence of redundant blocks: As used herein, a "THN sequence of redundant blocks" comprises the combination of a first THN sequence of blocks that matches (in data content) a second THN sequence of blocks. In some embodiments, a THN sequence of redundant blocks meets the predetermined deduplication requirement for storage devices.

Non-THN sequence of redundant blocks: As used herein, a "non-THN sequence of redundant blocks" comprises a first non-THN sequence of blocks that matches (in data content) a second non-THN sequence of blocks. In some embodiments, a non-THN sequence of redundant blocks does not meet the predetermined deduplication requirement for storage devices.

Set of redundant blocks: As used herein, a sequence of redundant blocks may comprise one or more sets of redundant blocks. A set of redundant blocks comprises two or more blocks, each block in the set having matching data content. As used herein, a "deduplicated set of redundant blocks" indicates that one block in the set is stored and the other blocks in the set are deduplicated and not stored.

Fingerprint data structure: As used herein, a fingerprint data structure comprises data and mechanisms for storing, organizing, and indexing fingerprints (content identifiers) of data blocks.

Deduplication data structure: As used herein, a deduplication data structure comprises data and mechanisms for storing, organizing, and indexing data describing THN and non-THN sequences of redundant blocks.

Deduplicate in cache data structure: As used herein, a deduplicate in cache data structure comprises a data structure for storing block identifiers (e.g., storage system addresses) for data blocks that have been deduplicated on the storage devices. In some embodiments, data blocks that have been deduplicated on the storage devices are also deduplicated in cache memory. The deduplicate in cache data structure may be used by the cache layer to identify which data blocks to deduplicate in cache memory.

Storage device mapping data structure: As used herein, a storage device mapping data structure comprises mapping data and mechanisms for mapping storage system addresses for deduplicated data blocks to their corresponding matching data blocks stored on storage devices.

Cache mapping data structure: As used herein, a cache mapping data structure comprises mapping data and mechanisms for mapping storage system addresses to cache memory address for data blocks stored in cache memory, the data blocks comprising deduplicated and non-deduplicated data blocks.

Popular block data structure: As used herein, a popular block data structure comprises a data structure for storing block identifiers (e.g., storage system addresses or cache addresses) for data blocks identified as "popular" blocks. In some embodiments, a set of redundant blocks (each having matching data content), that are currently stored to cache memory or were previously stored to cache memory, having a combined total number of accesses equal to or greater than a predetermined threshold number of accesses are each identified as "popular" blocks.

II. STORAGE SYSTEM ENVIRONMENT WITH CACHING AND DEDUPLICATION

FIG. 1 is a schematic block diagram of an exemplary storage system environment 100 using caching and deduplication in which some embodiments operate. The environment 100 comprises a one or more server systems 110 and a storage system 120 (comprising one or more storage devices 125) that are connected via a connection system 150. The connection system 150 may comprise a network, such as a Local Area Network (LAN), Wide Area Network (WAN), metropolitan area network (MAN), the Internet, or any other type of network or communication system between computer systems.

A server system 110 may comprise a computer system that utilizes services of the storage system 120 to store and manage data in the storage devices 125 of the storage system 120. A server system 110 may execute one or more applications 115 that submit read/write requests for reading/writing data on the storage devices 125 of the storage system 120. Interaction between a server system 110 and the storage system 120 can enable the provision of storage services. That is, server system 110 may request the services of the storage system 120 (e.g., through read or write requests), and the storage system 120 may perform the requests and return the results of the services requested by the server system 110, by exchanging packets over the connection system 150. The server system 110 may submit access requests (e.g., read or write requests) by issuing packets using file-based access protocols, such as the Common Internet File System (CIFS) protocol or Network File System (NFS) protocol, over the Transmission Control Protocol/Internet Protocol (TCP/IP) when accessing data in the form of files and directories. Alternatively, the server system 110 may issue access requests by issuing packets using block-based access protocols, such as the Fibre Channel Protocol (FCP), or Internet Small Computer System Interface (iSCSI) Storage Area Network (SAN) access, when accessing data in the form of blocks.

The storage system 120 may comprise a computer system that stores data in a set of one or more storage devices 125. A storage device 125 may comprise a writable storage device media, such as disk devices, video tape, optical, DVD, magnetic tape, and any other similar media adapted to store information (including data and parity information). In some embodiments, a storage device 125 comprises a disk device (described in detail below). In other embodiments, the storage device 125 may comprise any other type of storage device.

The storage system 120 may implement a file system to logically organize the data as a hierarchical structure of directories and files on each storage device 125. Each file may be implemented as a set of blocks configured to store data, whereas each directory may be implemented as a specially-formatted file in which information about other files and directories are stored. A block of a file may comprise a fixed-sized amount of data that comprises the smallest amount of storage space that may be accessed (read or written) on a storage device 125. The block may vary widely in data size (e.g., 1 byte, 4-kilobytes (KB), 8 KB, etc.).

Figure 2:
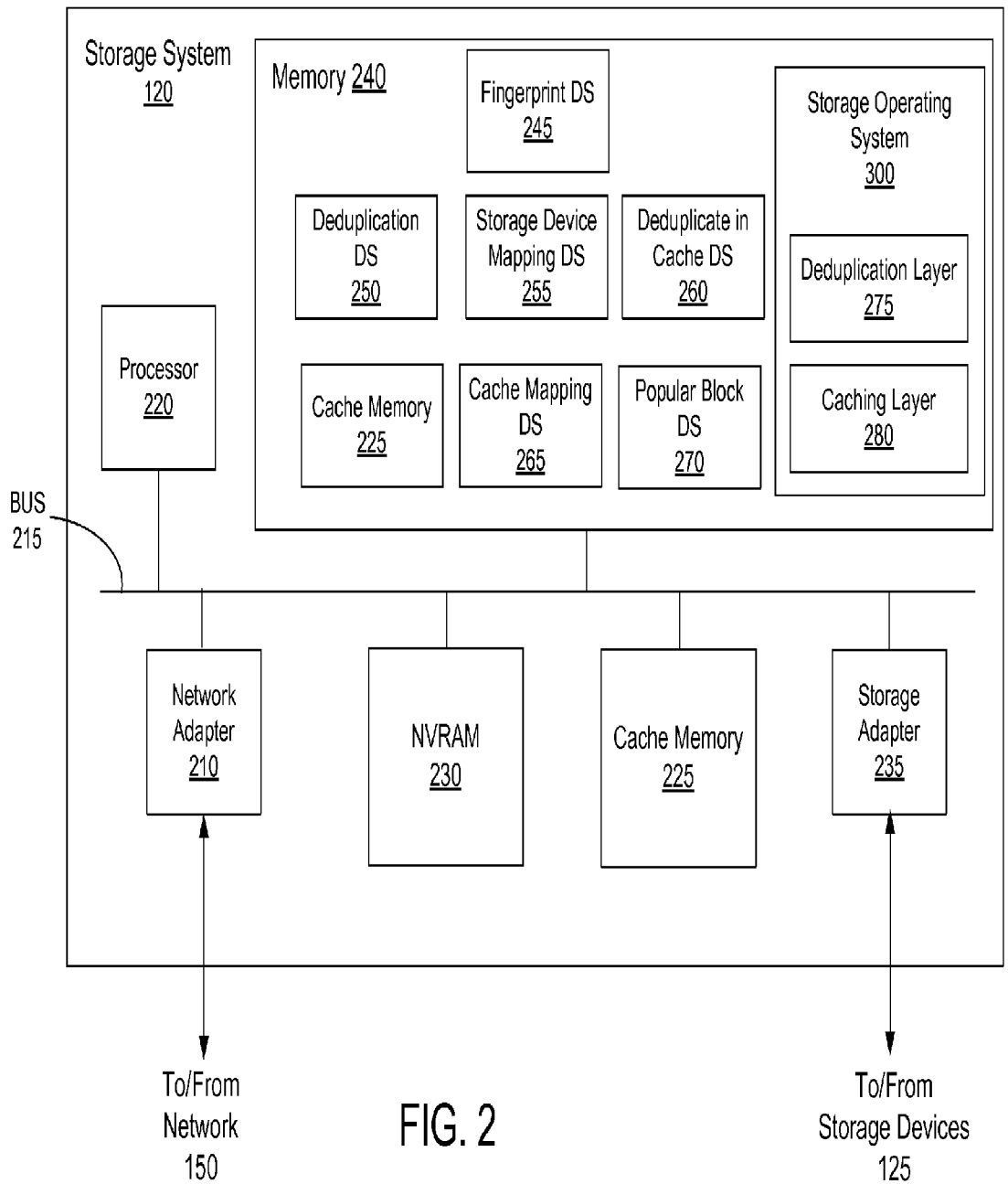
FIG. 2 is a schematic block diagram of an exemplary storage system that may be employed in the storage system environment of FIG. 1.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a standalone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The storage system 120 comprises a network adapter 210, a processor 220, a memory 240, a non-volatile random access memory (NVRAM) 230, a storage adapter 235, and a cache memory device 225 interconnected by a system bus 215. The network adapter 210 comprises the mechanical, electrical and signaling circuitry needed to connect the storage system 120 to a server system 110 over a computer network 150. The storage system may include one or more network adapters. Each network adapter 210 has a unique IP address and may provide one or more data access ports for server systems 110 to access the storage system 120 (where the network adapter accepts read/write access requests from the server systems 110 in the form of data packets).

The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may comprise a non-volatile form of memory that does not require power to maintain information. Some examples of memory include various form of volatile RAM (e.g., DRAM), flash memory, non-volatile random access memory (NVRAM), Magnetic Random Access Memory (MRAM), Phase Change RAM (PRAM), etc. The processor 220 and adapters may, in turn, comprise processing elements and/or logic circuitry configured to execute the software code and manipulate the data stored in the memory 240.

The storage system 120 may also include a NVRAM 230 that may be employed as a backup memory that ensures that the storage system 120 does not "lose" received information, e.g., CIFS and NFS requests, in the event of a system shutdown or other unforeseen problem. The NVRAM 230 is typically a large-volume solid-state memory array (RAM) having either a back-up battery, or other built-in last-state-retention capabilities (e.g. a FLASH memory), that holds the last state of the memory in the event of any power loss to the array. Therefore, even if an access request stored in memory 240 is lost or erased (e.g., due to a temporary power outage) it still may be recovered from the NVRAM 230.

The processor 220 executes a storage operating system application 300 of the storage system 120 that functionally organizes the storage system by, inter alia, invoking storage operations in support of a file service implemented by the storage system. In some embodiments, the storage operating system 300 comprises a plurality of software layers (including a deduplication layer 275 and caching layer 280) that are executed by the processor 220. In some embodiments, the deduplication layer 275 is implemented to deduplicate data on the storage devices 125. In some embodiments, the deduplication layer 275 operates in conjunction with the storage layer 380 to perform embodiments herein. In some embodiments, the caching layer 280 is implemented to manage the cache memory 225 (e.g., deduplicate and cache data in the cache memory 225). Portions of the storage operating system 300 are typically resident in memory 240. It will be apparent to those skilled in the art, however, that other processing and memory means, including various computer readable media, may be used for storing and executing program instructions pertaining to the storage operating system 300.

In some embodiments, the memory 240 also includes a cache memory 225. In some embodiments, the cache memory 225 comprises a sub-portion of the storage space of a memory device 240 or storage device. In other embodiments, the cache memory 225 may comprise a separate dedicated cache memory device 225. The cache memory 225 may be allocated by the storage operating system for use by the file system 350 for caching data.

The memory 240 also stores various data structures (DSs) used for the deduplication of data on the storage devices and the cache memory 225 and for the caching of data in the cache memory 225. In some embodiments, the memory 240 stores a fingerprint DS 245, a deduplication DS 250, a storage device mapping DS 255, a deduplicate in cache DS 260, a cache mapping DS 265, and/or a popular block DS 270. In other embodiments, any or all of the various data structures (DSs) 245, 250, 255, 260, 265, and 270 may also be resident in NVRAM 230 and/or stored on a storage device 125. The various data structures (DSs) are discussed below and shown in the Figures in detail.

For illustrative purposes, the DSs 245, 250, 255, 260, 265, and 270 are described below and shown in the Figures as simple tables. In other embodiments, the DSs may comprise any other container or object for data (such as a file, list, etc.). Also, the data in any or all of the various data structures (DSs) may be organized and indexed using any known methods to provide efficient data lookups in the DSs. In these embodiments, the DSs 245, 250, 255, 260, 265, and 270 may comprise various mechanisms and functions for organizing and indexing its data.

For example, the DSs may be organized as hash tables that are indexed using hash functions. As known in the art, hash tables and hash functions provide an efficient organizing and indexing mechanism for locating particular data and entries in DSs. For example, the hash function may be applied to an input hash value (comprising the search data) to produce an output hash value. The output hash value may be used to identify a particular slot in the hash table, the slot containing data for locating data related to the search data. For example, for the cache mapping DS 265 that maps storage system addresses to cache addresses, a hash function may be applied to a requested storage system address (input hash value) to produce a mapping value (output hash value). The mapping value may then be is used to identify a particular slot in the hash table, the slot containing a pointer to a metadata buffer in cache memory that contains a pointer (cache address) to a data block stored in cache memory corresponding to the requested storage system address. The cache address may be used to retrieve the requested data block from the cache memory. However, in other embodiments, other known methods, other than hash tables and functions, are used to organize and index data in the DSs.

The storage adapter 235 cooperates with the storage operating system 300 executing on the storage system 120 to access data requested by the server system 110. The data may be stored on the storage devices 125 that are attached, via the storage adapter 235, to the storage system 120 or other node of a storage system as defined herein. The storage adapter 235 includes input/output (I/O) interface circuitry that couples to the storage devices 125 over an I/O interconnect arrangement, such as a conventional high-performance, Fibre Channel serial link topology. In response to an access request received from a server system 110, data may be retrieved by the storage adapter 235 and, if necessary, processed by the processor 220 (or the adapter 235 itself) prior to being forwarded over the system bus 215 to the network adapter 210, where the data may be formatted into a packet and returned to the server system 110.

In an illustrative embodiment, the storage devices 125 may be arranged into a plurality of volumes, each having a file system associated therewith. In some embodiments, the storage devices 125 comprise disk devices that are configured into a plurality of RAID (redundant array of independent disks) groups whereby multiple storage devices 125 are combined into a single logical unit (i.e., RAID group). In a typical RAID group, storage devices 125 of the group share or replicate data among the disks which may increase data reliability or performance. The storage devices 125 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of storage devices 125 and may be embodied as a plurality of RAID groups.

The organization of a storage operating system 300 for the exemplary storage system 120 is now described briefly. However, it is expressly contemplated that the principles of the embodiments described herein can be implemented using a variety of alternative storage operating system architectures. As discussed above, the term "storage operating system" as used herein with respect to a storage system generally refers to the computer-executable code operable on a storage system that implements file system semantics (such as the above-referenced WAFL®) and manages data access. In this sense, Data ONTAP® software is an example of such a storage operating system implemented as a microkernel. The storage operating system can also be implemented as an application program operating over a general-purpose operating system, such as UNIX® or Windows®, or as a general-purpose operating system with configurable functionality.

Figure 3:
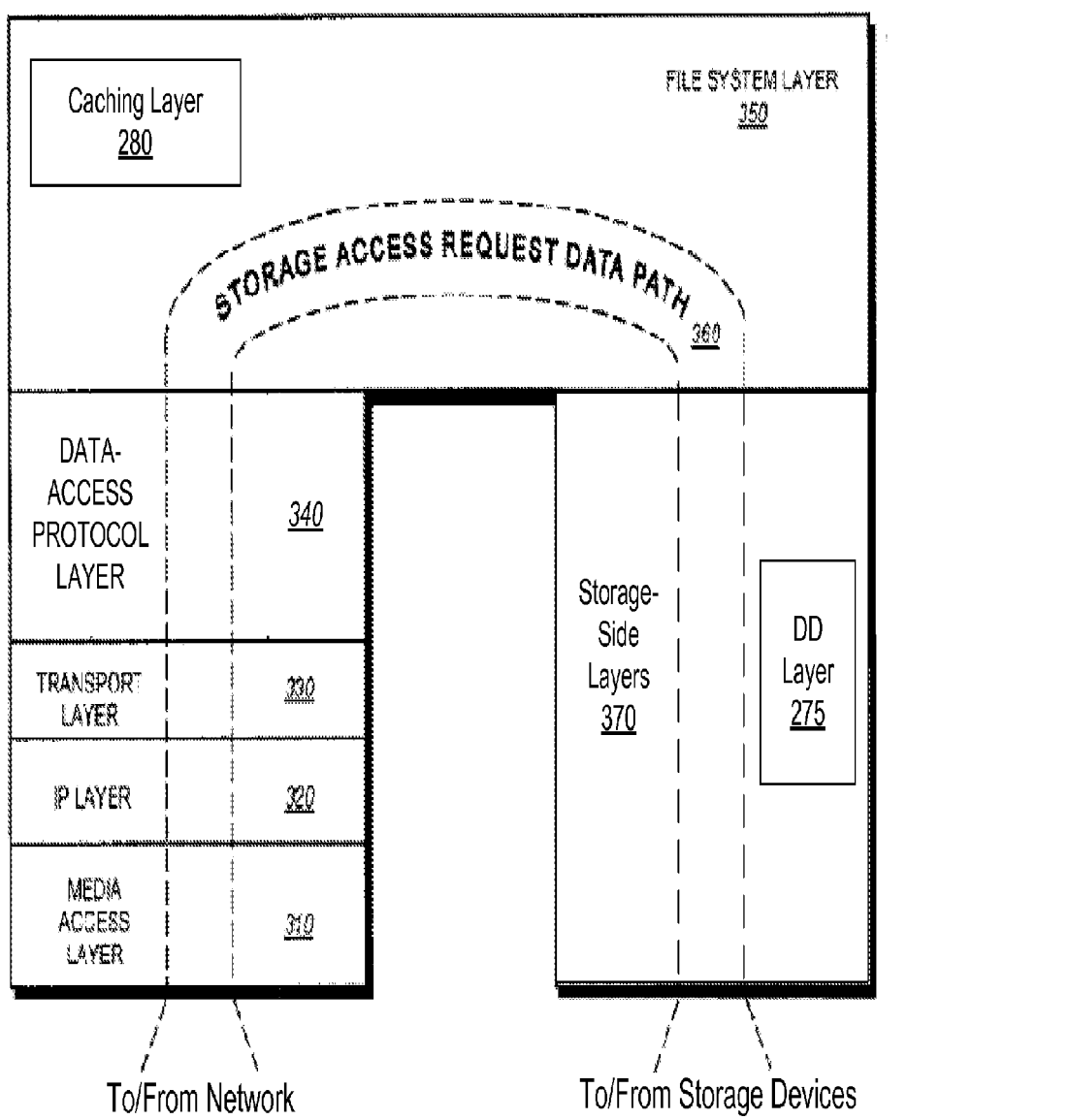
FIG. 3 is a schematic block diagram of an exemplary storage operating system that may be implemented by the storage system in FIG. 2.

As shown in FIG. 3, the storage operating system 300 comprises a set of software layers that form an integrated protocol software stack. The protocol stack provides data paths 360 for server systems 110 to access data stored on the storage system 120 using data-access protocols. The protocol stack includes a media access layer 310 of network drivers (e.g., an Ethernet driver). The media access layer 310 interfaces with network communication and protocol layers, such as the Internet Protocol (IP) layer 320 and the transport layer 330 (e.g., TCP/UDP protocol). The IP layer 320 may be used to provide one or more data access ports for server systems 110 to access the storage system 120. In some embodiments, the IP layer 320 layer provides a dedicated private port for each of one or more remote-file access protocols implemented by the storage system 120.

A data-access protocol layer 340 provides multi-protocol data access and, for example, may include file-based access protocols, such as the Hypertext Transfer Protocol (HTTP) protocol, the NFS protocol, the CIFS protocol, and so forth. The storage operating system 300 may include support for other protocols, such as block-based access protocols. Such protocols may include, but are not limited to, the direct access file system (DAFS) protocol, the web-based distributed authoring and versioning (WebDAV) protocol, the Fibre Channel Protocol (FCP), the Internet small computer system interface (iSCSI) protocol, and so forth.

The storage operating system 300 may manage the storage devices 125 using storage-side layers 370. As shown in FIG. 4, the storage-side layers 370 may include a storage layer 380 that implements a storage protocol (such as a RAID protocol) and a device driver layer 385 that implements a device control protocol (such as small computer system interface (SCSI), integrated drive electronics (IDE), etc.). Bridging the storage-side layers 370 with the network and protocol layers is a file system layer 350 of the storage operating system 300. In an illustrative embodiment, the file system layer 350 implements a file system having an on-disk format representation that is block-based using inodes to describe the files.

The file system layer 350 assigns, for each file, a unique inode number and an associated inode. An inode may comprise a data structure used to store metadata information about the file (such as name of the file, when the file was produced or last modified, ownership of the file, access permission for the file, size of the file, etc.). Each inode may also contain information regarding the block locations of the file. In some embodiments, the block locations are indicated by a unique logical block number (LBN) given for each block of the file. As discussed below, if a storage device comprises a disk device, a set of blocks having sequential LBNs indicates that the set of blocks are stored sequentially on a same track of the disk device. The file system 350 may store and maintain an inode file that contains and indexes (by inode number) the inodes of the various files.

In response to receiving a file-access request (containing an external file handle) from a server system 110, the file system 350 generates operations to load (retrieve) the requested data from storage devices 125 (if it is not resident in the storage system's cache memory). The external file handle in the access request typically identifies a file or directory requested by the server system 110. Specifically, the file handle may specify a generation number, inode number and volume number corresponding to the requested data. If the information is not resident in the cache memory, the file system layer 350 indexes into the inode file using the received inode number to access the appropriate inode entry for the identified file and retrieve file location information (e.g., logical block number) from the inode.

The file system layer 350 then passes the logical block number to the appropriate driver (for example, an encapsulation of SCSI implemented on a fibre channel interconnection) of the device driver layer 385. The device driver layer 385 accesses the appropriate blocks from the storage devices 125 and loads the requested data in memory 240 for processing by the storage system 120. Upon successful completion of the request, the storage system (and storage operating system) returns a response (e.g., a conventional acknowledgement packet defined by the CIFS specification) to the server system 110 over the network 150.

It should be noted that the software "path" 360 through the storage operating system layers described above needed to perform data storage access for the requests received at the storage system may alternatively be implemented in computer hardware or a combination of hardware and software. That is, in an alternative embodiment, the storage access request path 360 may be implemented as logic circuitry embodied within a field programmable gate array (FPGA) or an application specific integrated circuit (ASIC). This type of hardware implementation may increase the performance of the file service provided by storage system 120 in response to a file system request packet issued by server system 110. Moreover, in a further embodiment, the processing elements of network and storage adapters 210 and 235 may be configured to offload some or all of the packet processing and storage access operations, respectively, from processor 220 to thereby increase the performance of the data access service provided by the storage system 120.

In some embodiments, the storage operating system 300 also comprises a deduplication layer 275 and a caching layer 280. In some embodiments, the caching layer 280 resides in the file system layer 350. The caching layer 280 operates in conjunction with the other software layers of the storage operating system 300 to manage the cache memory 225 (e.g., deduplicate and cache data in the cache memory 225) as described herein. In some embodiments, the deduplication layer 275 resides in the storage-side layers 370 for deduplicating data on the storage devices 125. The deduplication layer 275 that operates in conjunction with the other software layers of the storage operating system 300 to deduplicate data on the storage devices 125 as described herein.

In some embodiments, the caching layer 280 may comprise a cache engine comprising computer software and/or hardware configured to perform embodiments described herein. In some embodiments, the deduplication layer 275 may comprise a deduplication engine comprising computer software and/or hardware configured to perform embodiments described herein. In general, functions of a software module or software layer described herein may be embodied directly in computer hardware, or embodied as software executed by a processor, or embodied as a combination of the two. For example, the storage layer 380 may comprise a storage engine comprising computer software and/or hardware configured to perform embodiments described herein in conjunction with the deduplication layer/engine.

FIG. 4 is a conceptual diagram of the storage-side layers 370 of the storage operating system 300. In the example of FIG. 4, the deduplication layer 275 may reside between the file system layer 350 and the storage layer 380 of the storage operating system 300. FIG. 5 is a conceptual diagram of storage-side layers 370 comprising a de-staging layer 375. In the example of FIG. 5, the de-staging layer 375 may reside between the file system layer 350 and the deduplication layer 275 of the storage operating system 300.

The de-staging layer 375 may be implemented in some storage systems 120 to perform received write requests for files in two stages. In a first stage, write requests received by the file system layer 350 are sent to the de-staging layer 375, a write request containing blocks of data to be written. The de-staging layer 375 produces a write log for each received write request, a write log containing the blocks of data to be written.

Embodiments described herein may be applied to a storage system 120 that is implemented with or without a de-staging layer 375. In some embodiments, the deduplication layer 275 is used in conjunction with the de-staging layer 375. In these embodiments, the deduplication layer 275 may process the write logs accumulated during the first stage that are awaiting the next consistency point to be written to a storage device 125. During this time, the deduplication layer 275 may process the blocks in the accumulated write logs for possible deduplication before the blocks are written to the storage devices 125. In other embodiments, the deduplication layer 275 is used without use of a de-staging layer 375. In these embodiments, the deduplication layer 275 may receive write requests from the file system 350 and process blocks of the write requests for deduplication as they are received.

Note that when a write log for a write request for a file is produced in the first stage, the file system layer 350 may assign LBNs for each block in the file to be written, the assigned LBN of a block indicating the location on a storage device 125 where the block will be written to at the next consistency point. Also, the file system layer 350 may assign an inode number and an inode for the file. As such, each write log may comprise blocks of data to be written, the locations (LBNs) of where the blocks are to be written, and an inode number assigned to the file. When a write log for a write request for a file is produced in the first stage, the file system layer 350 may also store LBNs for the blocks of the file in its assigned inode.

In other embodiments where the deduplication layer 275 is used without the de-staging layer 375, the deduplication layer 275 may receive write requests for files from the file system 350, whereby the file system layer 350 may assign LBNs for each block in the file to be written. Also, the file system layer 350 may assign an inode number and an inode for the file and store the assigned LBN for the blocks of the file in its assigned inode.

III. DEDUPLICATION OF DATA ON STORAGE DEVICES BASED ON THRESHOLD NUMBER OF SEQUENTIAL BLOCKS

A. Single-Block Deduplication

The storage system 120 may implement deduplication methods when storing data on the storage devices 125. Deduplication methods may be used to remove redundant data and ensure that only a single instance of the same data is stored on the storage devices. Rather than storing multiple copies of the same data on the storage devices, a single instance of the data is typically stored and referenced/indexed multiple times. Deduplication of data may be applied at any level, for example, across a single storage device 125 or volume (where redundant data within the single storage device 125 or volume are removed), across multiple storage devices 125 or volumes (where redundant data within multiple storage devices 125 or volumes are removed), across the entire storage system 120 (where redundant data within the storage system 120 are removed), across multiple storage systems 120 (where redundant data within the multiple storage systems 120 are removed), and so forth. Since redundant data is removed, deduplication of data typically saves storage space. Deduplication of data, however, may also cause longer read latencies when reading data that has been deduplicated on a disk device.

Figure 6:
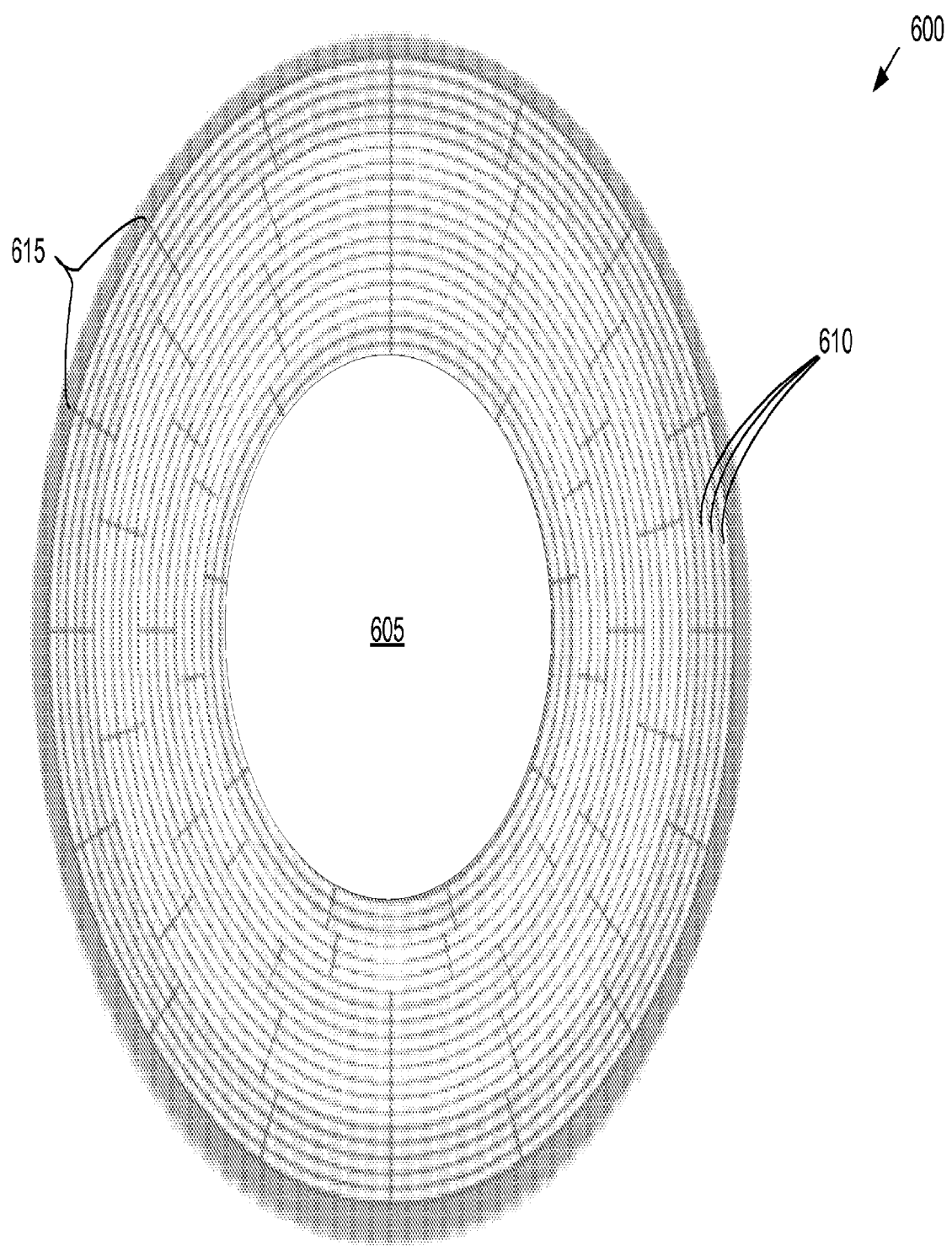
FIG. 6 is a conceptual representation of a disk platter of a disk device.

As known in the art, a disk device comprises a plurality of stacked platters, each platter having a read/write head that retrieves and writes data to the platter. FIG. 6 shows a conceptual representation of a disk platter 605 that comprises a plurality of tracks 610 (shown as concentric circles), each track being divided into a plurality of sectors/blocks 615 (shown as segments of the concentric circles). As used herein, a "block" may comprise any size of data (e.g., 1 byte, 4 KB, 8 KB, etc.).

Each block that is stored in the storage system 120 is typically assigned a unique logical block number (LBN) by the file system 350. The LBNs of a set of blocks may reflect the physical storage locations of the blocks relative to each other on a storage device 125. In particular, a set of blocks having sequential LBNs indicates that the set of blocks are stored sequentially on a same track of a disk device. For example, blocks having LBNs 234, 235, and 236 indicates that the blocks are stored sequentially on the same track of a disk device. In the embodiments described below, the locations of a set of blocks are indicated by LBNs. However, in other embodiments, the locations of a set of blocks are indicated by another type of number (other than LBN) that reflects the physical storage locations of the blocks relative to each other on a disk device.

As used herein, blocks 615 on a disk platter 605 are accessed "sequentially" when they are accessed from the same track 610 in order (i.e., accessed one after another along the same track). When reading blocks sequentially from the same track, the read/write head of the disk device typically exhibits low latency times. As used herein, blocks 615 on a disk platter 605 are accessed "randomly" when they are accessed from different tracks 610. When reading blocks from different tracks, the read/write head of the disk device may incur significant latency time each time it repositions onto a different track to retrieve a block of data. As used herein, the read/write head performs a "seek" when moving to a different track which incurs a "seek time" latency.

Read latency may be incurred when using conventional "single-block" deduplication methods. For example, when a file to be written to the storage devices is received, a comparison is performed to determine whether any of the blocks of the received file match any blocks currently stored in the storage devices. As used herein, a "received" file comprises a "received" set of blocks that are processed for deduplication. The received blocks are compared to "currently stored" blocks of "currently stored" files that are presently stored on the storage system 120. Note that in some situations (e.g., in offline processing), received blocks may also be currently stored on the storage system 120. In these embodiments, currently stored blocks may be compared to other currently stored blocks to determine if any of the currently stored blocks may be deduplicated.

A received block that matches a currently stored block is referred to as a "redundant block," whereas the corresponding currently stored block is referred to as a "matching stored block." A received block that does not match any currently stored blocks is referred to as a "non-redundant block." A block may be considered to "match" another block when both blocks have the same content or there is a high probability that both blocks have the same content.

Deduplication of a redundant data block may comprise deleting from or not storing the redundant data block to the storage devices and, producing in their place, an index to the address location of the corresponding matching stored blocks (the index being produced, for example, in the inode for the received file). Any non-redundant blocks in the received file are written to the storage devices. For each written non-redundant block, an index to the address location of the non-redundant block where the block was stored may also be produced in the inode for the received file. When a read request for the received file is later received, the storage system may perform the read request by using the inode to index and retrieve the stored non-redundant blocks and, for each redundant block, the corresponding matching stored block.

When the storage devices 125 comprise disk devices, the matching stored blocks may be written on particular tracks 610 of the disk device, whereas the non-redundant blocks of the received file are typically written on different tracks of the disk device. Deduplication of data is typically performed on a single-block basis, whereby each individual block found to be redundant is deduplicated. As such, later reading of the received file (using the indexes to the matching stored blocks and non-redundant blocks in the inode for the file) may incur significant read latency if the read/write head frequently seeks and retrieves single blocks stored on different tracks. For example, later reading of the received file may comprise retrieving non-redundant blocks on a first track, seeking and retrieving a single matching stored block on a second track, then seeking and retrieving non-redundant blocks on the first track, then seeking and retrieving a single matching stored block on the second track, etc. As such, conventional "single-block" deduplication methods may result in a later read operation that incurs significant seek latencies.

B. Deduplication Based on a Threshold Number of Sequential Blocks

In some embodiments, deduplication of a received set of blocks is performed based on a predetermined threshold number (THN) of sequential blocks, the threshold number being two or greater. In these embodiments, deduplication may be performed by determining if a "series" of THN or more received blocks (referred to herein as a "THN series") match a "sequence" of THN or more currently stored blocks (referred to herein as a "THN sequence"). If a matching THN sequence is found to exist, the blocks in the THN series may be deduplicated. The number of blocks in the THN series may be equal to the number of blocks in the matching THN sequence. Other received blocks that are not deduplicated are referred to as "non-deduplicated" blocks. In some embodiments described below, for illustrative purposes, the value of THN equals 5, although in other embodiments, the value of THN may equal any other number of two or greater.

As used herein, a "series" of blocks indicates a set of consecutive/adjacent blocks in a predetermined order. As used herein, blocks of a series are numbered by consecutive "block-series numbers" (BSNs) that indicate the ordering of the blocks in the series. BSNs may be used below in relation to a series of received blocks. Note however, that a series of received blocks may also have associated LBNs assigned by the file system layer 350.

In some embodiments, a "sequence" of blocks have sequential/consecutive storage system addresses (e.g., LBNs). In some embodiments, a "sequence" of blocks indicates a series of blocks stored or to be stored on the same track of a disk device. In other embodiments, a "sequence" of blocks may be stored on different tracks of a disk device. For example, blocks of a sequence may be numbered by consecutive LBNs that indicate the ordering of the blocks in the sequence. In other embodiments, a sequence of blocks indicates a series of blocks that are assigned to be stored on the same track of a disk device and have assigned consecutive storage system addresses (e.g., LBNs). Deduplication based on a threshold number of sequential blocks may reduce the overall read latency of a file or set of blocks as the number of seeks between tracks may be reduced (in comparison to deduplication based on single blocks).

For example, if the value of THN equals 5 and a series of 10 blocks with BSNs 0-9 are received, deduplication of the received blocks may be performed when a series of 5 or more of the received blocks match a sequence of 5 or more currently stored blocks (i.e., 5 or more blocks stored on the same track on a disk device). Thus if the series of received blocks having BSNs 3-7 match a sequence of any 5 currently stored blocks, the entire series of received blocks having BSNs 3-7 are considered redundant and is deduplicated (i.e., replaced by indexes to the sequence of 5 matching stored blocks). Therefore, for example, non-redundant blocks having BSNs 0-2 may be stored on a first track, the sequence of 5 matching stored blocks may be stored on a second track (the 5 matching stored blocks corresponding to redundant blocks having BSNs 3-7), and non-redundant blocks having BSNs 8-9 may also be stored on the first track of a disk device.

As such, upon later reading of the received blocks having BSNs 0-9, the read/write head of the disk device would retrieve non-redundant blocks having BSNs 0-2 on the first track, seek and retrieve the sequence of 5 matching stored blocks on the second track, and seek and retrieve non-redundant blocks having BSNs 8-9 on the first track. This example illustrates how read latency of the received blocks may be mitigated since there are fewer seek operations during the read. Further, when a seek to a different track is performed, the seek is performed to retrieve more than just a single block. Thus, the time cost of the seek is spread over THN or more blocks (in this example, the time cost is spread over 5 blocks), rather than just a single block.

In some embodiments, the deduplication methods described herein are performed by the deduplication layer 275 of the storage operating system 300. In some embodiments, received blocks are processed for deduplication prior to being written to a storage device 125 (referred to as online processing). In these embodiments, the deduplication layer 275 may receive blocks to be written and determine deduplication prior to any of the received blocks being written to a storage device 125. In online processing, storage space may be saved immediately and unnecessary write operations to storage devices 125 are avoided. In other embodiments, blocks are processed for deduplication after being written to a storage device 125 (referred to as offline processing). In these embodiments, the deduplication layer 275 may process blocks currently stored to the storage devices 125 to determine whether deduplication of the stored blocks is needed. In offline processing, if deduplication is performed on blocks found to be redundant, the redundant blocks may be deleted from the storage devices 125.

Figure 7:
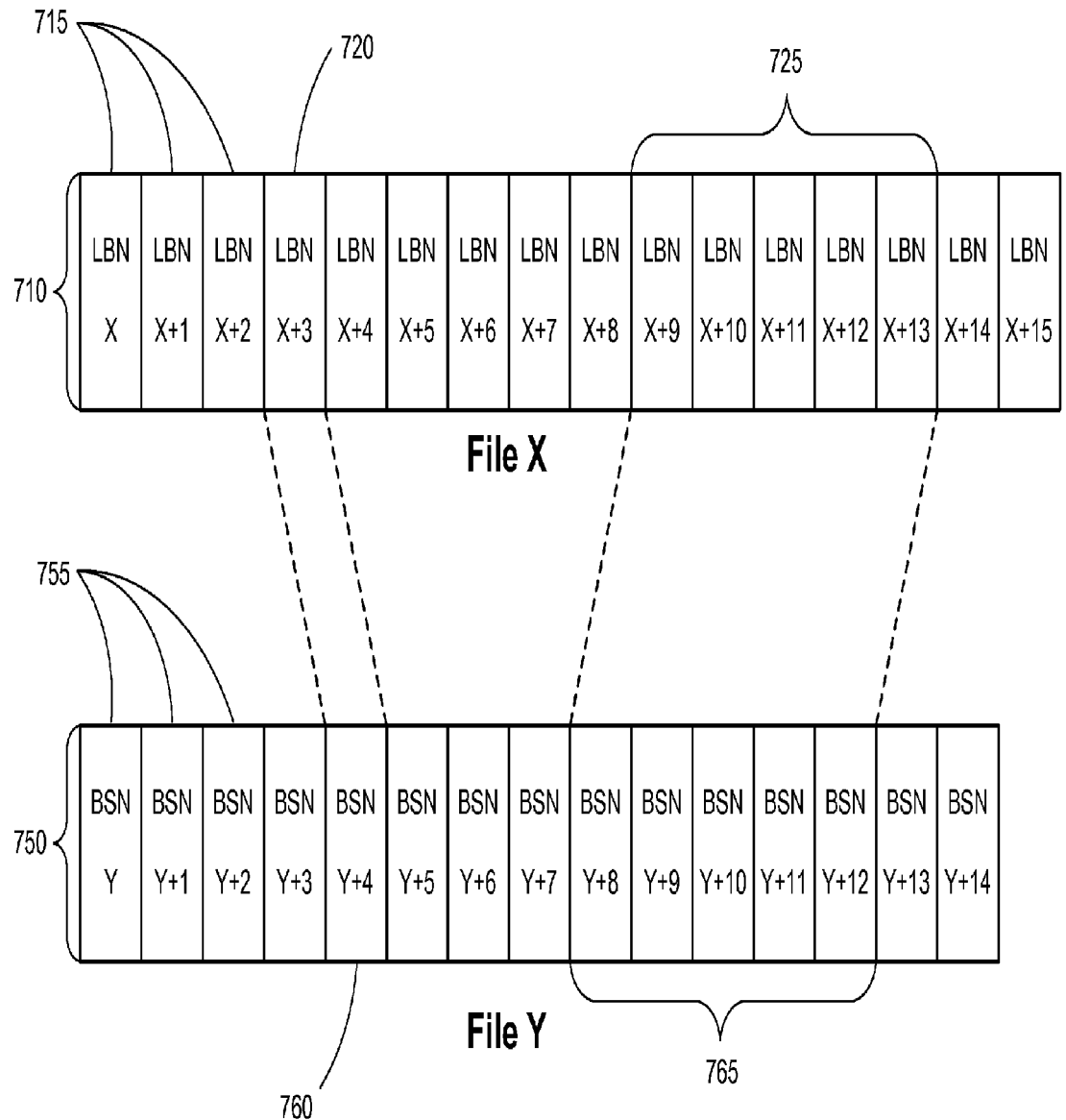
FIG. 7 shows a conceptual diagram of stored file X and received file Y.

FIGS. 7-10 are exemplary conceptual diagrams illustrating deduplication based on a threshold number of sequential blocks in accordance with some embodiments. FIG. 7 shows a conceptual diagram of a first file 710 ("file X") comprising a plurality of blocks 715 and a second file 750 ("file Y") comprising a plurality of blocks 755. In the example of FIG. 7, file X comprises a currently stored file comprising a sequence of 16 blocks 715 having sequential LBNs (X, X+1, X+2 . . . X+15), whereby X is the LBN of the first block in the sequence. As such, in the example of FIG. 7, the sequence of 16 blocks 715 are stored on a same track of a disk device. In the example of FIG. 7, file Y comprises a received file that is to be processed for deduplication. File Y comprises a series of 15 blocks 755 numbered by BSNs (Y, Y+1, Y+2 . . . Y+14) that indicate the ordering of the blocks in the series, whereby Y is the BSN of the first block in the series.

For example, if the threshold number (THN) equals 5, deduplication of any of the blocks 755 of received file Y may be performed when a series of 5 or more blocks 755 match a sequence of 5 or more blocks 715 in currently stored file X. In the example of FIG. 7, block BSN (Y+4) 760 of file Y matches block LBN (X+3) 720 of file X. However, since this match comprises a single-block match that is below the threshold number (THN) of 5 sequential blocks, block BSN (Y+4) 760 of file Y is not deduplicated.

In the example of FIG. 7, the series of blocks BSN (Y+8) through BSN (Y+12) 765 of file Y matches the sequence of blocks LBN (X+9) through LBN (X+13) 725 of file X. Since this match comprises a match that is equal to or above the threshold number (THN) of 5 sequential blocks, the series of blocks 765 of file Y are considered redundant blocks and marked for deduplication. When deduplicating the series of redundant blocks 765, the series of redundant blocks 765 are deleted from or not stored to the storage devices 125 and indexes to the address locations of the sequence of matching blocks 725 are produced in their place.

Figure 8:
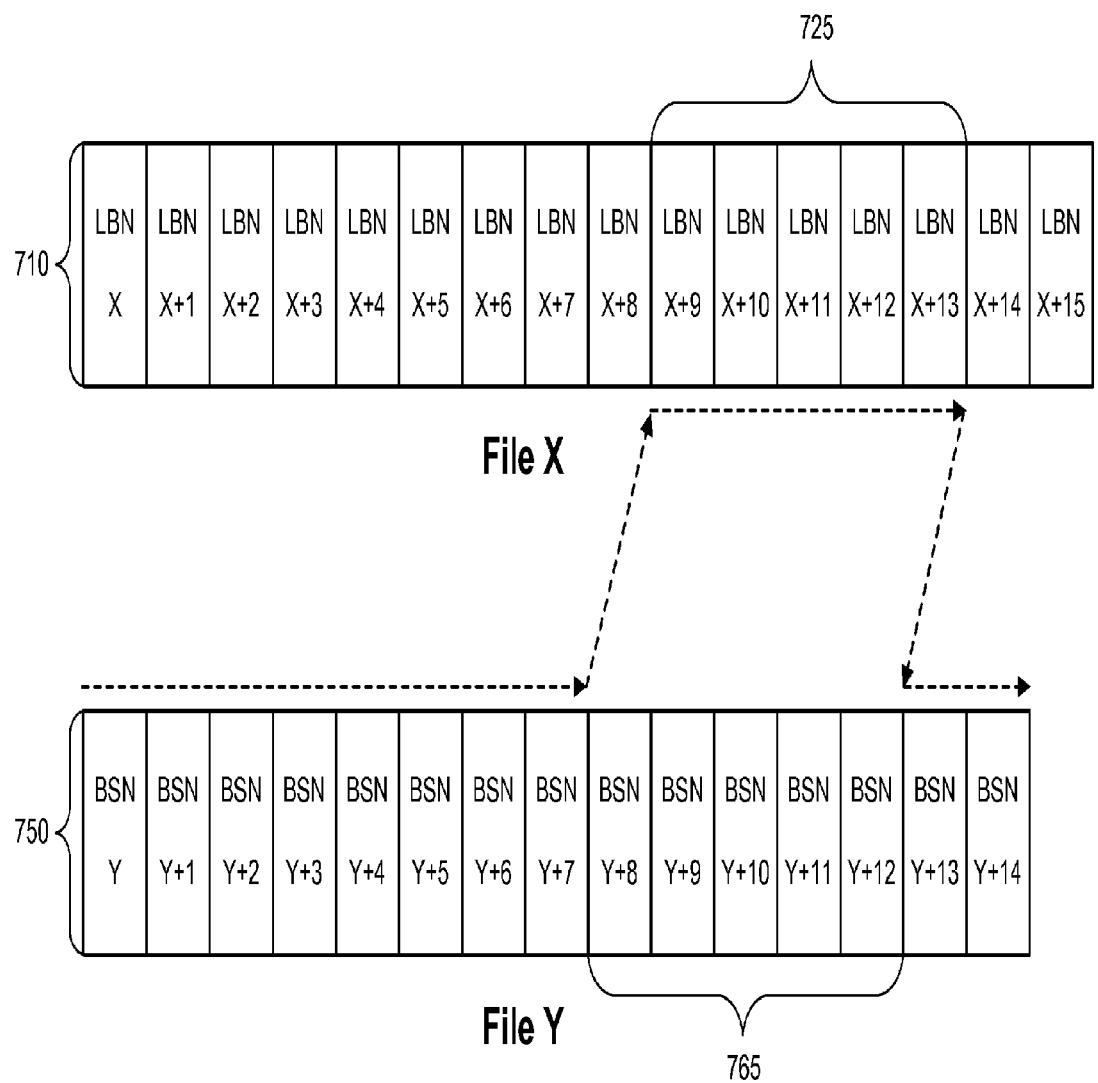
FIG. 8 shows a conceptual diagram of the blocks that comprise the received file Y after deduplication of a series of redundant blocks.

FIG. 8 shows a conceptual diagram of the blocks that will comprise the received file Y after deduplication of the series of redundant blocks 765 is performed. As shown in FIG. 8, the received file Y will comprise blocks BSN (Y) through BSN (Y+7), the matching sequence of blocks LBN (X+9) through LBN (X+13) 725, and blocks BSN (Y+13) through BSN (Y+14).

Figure 9:
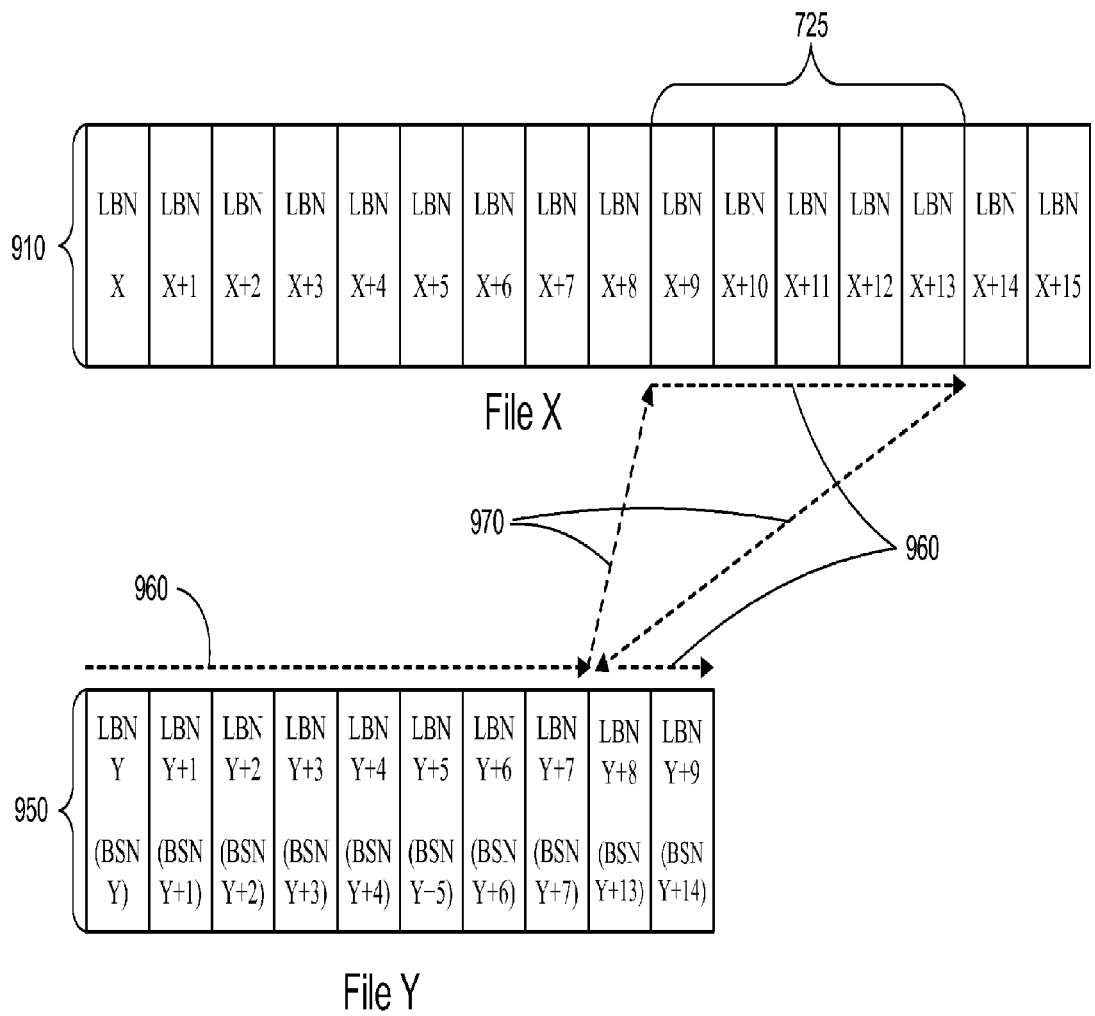
FIG. 9 shows a conceptual diagram of the storage and reading of file Y.

FIG. 9 shows a conceptual diagram of the storage of the blocks of file Y and the operations of a read request for file Y. In the example of FIG. 9, blocks BSN (Y) through BSN (Y+7) of file Y are stored on a first track 950 of a disk device, the blocks having LBNs (Y) through LBN (Y+7). The matching sequence of blocks LBN (X+9) through LBN (X+13) 725 of file X may be stored on a second track 910 of the disk device (the matching sequence of blocks 725 corresponding to the series of redundant blocks 765 of file Y). Blocks BSN (Y+13) through BSN (Y+14) of file Y may also be stored on the first track 950 of the disk device, the blocks having LBNs (Y+8) through LBN (Y+9).

Figure 10:
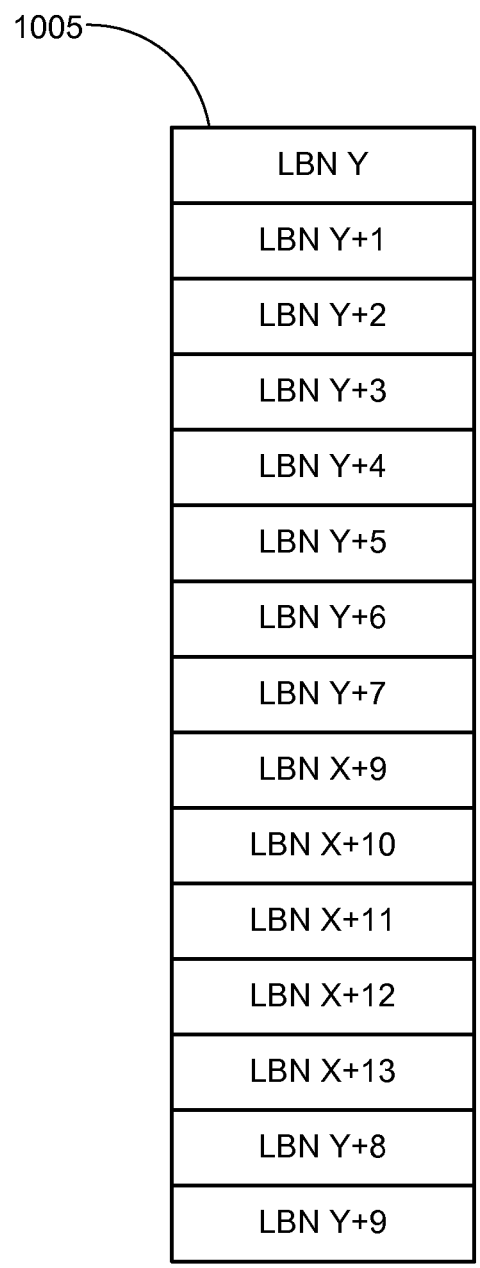
FIG. 10 shows a conceptual diagram of an inode associated with file Y.

FIG. 10 shows a conceptual diagram of an inode 1005 associated with file Y that stores the LBNs of each block of file Y (in accordance with FIG. 9). The LBNs of the blocks of file Y are stored in the inode 1005 in the particular order needed to properly read the blocks of file Y. When a later read request is received for file Y, the storage operating system 300 would retrieve the associated inode 1005 and retrieve the blocks at the LBNs stored in the associated inode 1005, the blocks being retrieved in the particular order specified in the associated inode 1005.

In the example of FIG. 9, when a read request for file Y is later received, the read request is performed according to the associated inode 1005 of file Y. As such, the read/write head of the disk device would perform the read operation as follows: perform a sequential read 960 on blocks having LBNs (Y) through LBN (Y+7) on the first track 950, perform a seek 970 to the second track 910, perform a sequential read 960 on blocks having LBNs (X+9) through LBN (X+13) on the second track 910, perform a seek 970 to the first track 950, and perform a sequential read 960 on blocks having LBNs (Y+8) through LBN (Y+9) on the first track 950.

The above example illustrates how read latency of the received blocks of file Y may be mitigated since there are fewer seek operations during the read of file Y. For example, the single-block match of block 760 of file Y and block 720 of file X was not deduplicated, thus avoiding, during a later read operation, a seek to the second track 910 just to read the single block 720 of file X. For example, when a seek to the second track 910 is performed, the seek is performed to retrieve a sequence of THN (e.g., 5) or more blocks on the second track 910. Thus, the time cost of the seek is spread over the THN or more blocks (in this example, the time cost is spread over 5 blocks), rather than just a single block.

IV. DEDUPLICATION OF DATA ON STORAGE DEVICES AND CACHE MEMORY

A. Sequence of Redundant Blocks

As described in Section III, deduplication on storage devices may be based on predetermined threshold number (THN) of sequential blocks. As used herein, if a first sequence of blocks match (in data content) a second sequence of blocks, the combination of the first and second sequences of blocks may be referred to as a "sequence of redundant blocks." As used herein, a "deduplicated sequence of redundant blocks" indicates that the first sequence of blocks is deduplicated and not stored and the second sequence of blocks is stored.

A sequence of redundant data blocks may comprise one or more sets of redundant blocks. A "set of redundant blocks" comprises two or more blocks, each block in the set having matching data content. For example, if the first and second sequences each comprise a sequence of 3 blocks, the first block of the first and second sequences will match in data content and comprise a first set of redundant blocks. Likewise, the second block of the first and second sequences will match in data content and comprise a second set of redundant blocks, and the third block of the first and second sequences will match in data content and comprise a third set of redundant blocks.

As used herein, a "THN sequence of redundant blocks" comprises the combination of a first sequence of THN or more blocks that matches (in data content) a second sequence of THN or more blocks. Deduplication may be performed on a THN sequence of redundant blocks on a storage device. For example, the first sequence of THN or more blocks may be deduplicated and the second sequence of THN or more blocks may be stored. As used herein, a "non-THN sequence of redundant blocks" comprises a sequence of redundant blocks that does not comprise THN or more redundant blocks (i.e., comprises less than THN redundant blocks). As such, non-THN sequence of redundant blocks do not meet the THN requirement for deduplication and are not initially deduplicated on a storage device.

B. Deduplication Data Structure (DS)

In some embodiments, data describing THN and non-THN sequences of redundant blocks are stored to a deduplication DS 250. FIG. 11 shows a conceptual diagram of an exemplary deduplication DS 250 maintained by the storage operating system 300. The deduplication DS 250 contains a plurality of sequence entries 1101, one entry representing a THN or non-THN sequence of redundant blocks stored on the storage devices and/or cache memory. In some embodiments, a sequence entry 1101 may comprise data fields describing the sequence, such as data fields for a content identifier 1105, sequence size 1115, storage system addresses (SSAs) 1120, reference count 1130, THN indicator 1135, sequence deduplication indicator 1140, set deduplication indicator(s) 1145, or any combination of these. Note that any of the data fields may be used as an index into the deduplication DS 250, whereby any of the data fields may be searched for a particular value to locate a particular sequence entry 1101 in the deduplication DS 250. In the example of FIG. 11, for illustrative purposes only, the threshold number (THN) is equal to 5.

The content identifier 1105 represents the data contents of the sequence of redundant blocks and is produced using a content identifier operation/algorithm on the data contents of the sequence. The type of content identifier 1105 used may be such that two sequences of blocks having the same content identifier have a high probability of also having the same data content. As described above, a sequence of redundant blocks comprises a first sequence of blocks that match (in data content) a second sequence of blocks. As such, the content identifier for the first sequence will match the content identifier for the second sequence. Thus, in some embodiments, the sequence of redundant blocks is represented by the content identifier 1105 which stores only one content identifier (shown in FIG. 11 as CI1, CI2, CI3, etc.) that represents the first sequence as well as the second sequence.

A content identifier may be referred to herein as a "fingerprint." Fingerprints of individual data blocks stored to the storage devices are typically produced and stored to a fingerprint DS 245 (not shown) by the storage operating system 300. The fingerprint DS 245 may comprise a plurality of entries, each entry representing and describing a particular data block. For example, each entry may contain the content identifier/fingerprint value, storage system address, inode generation number (for detecting stale fingerprint entries), etc. The storage operating system 300 may use the content identifiers/fingerprints in the fingerprint DS 245 to produce the content identifier 1105.

In some embodiments, the content identifier/fingerprint of a block or sequence of blocks is determined using a checksum operation that produces a checksum value representing the data contents of the block or sequence of blocks, the checksum value comprising the content identifier of the block or sequence of blocks. For example, the checksum value may comprise a 128 or 256 bit number that represents the data contents of the block or sequence of blocks. As known in the art, when two blocks or sequences of blocks have the same checksum value, there is a high probability that the two blocks or sequences of blocks have the same data content, whereby only in rare instances is this not true. In other embodiments, the content identifier is determined by applying a hashing operation/algorithm to the checksum value that produces a hash value representing the data contents of the block or sequence of blocks, the hash value comprising the content identifier. In further embodiments, the content identifier is determined using other operations/algorithms.

In some embodiments, a content identifier operation is applied separately to each block of a sequence to produce a single content identifier/fingerprint for each block. The single content identifiers may then be concatenated (whereby the single content identifiers are joined/appended end to end) to create an aggregate content identifier/fingerprint (comprising a superset of all the single content identifiers) that comprises the content identifier for the sequence of blocks. For example, a checksum operation may be applied separately to each block of a sequence to produce a single checksum for each block. The set of single checksums may then be concatenated to create an aggregate checksum that represents the contents of the sequence of blocks.

The sequence size 1115 indicates the number of sets of redundant blocks in the sequence. The sequence size 1115 may be equal to one or more. For example, if the entry represents a sequence of redundant blocks comprising first and second matching sequences each comprising a sequence of 3 blocks, there are 3 sets of redundant blocks in the sequence. As such, the sequence size 1115 is 3 for this entry and sequence. Note that a sequence size 1115 may be equal to one, whereby the entry represents one set of redundant blocks. Since the predetermined threshold number (THN) of redundant blocks is two or greater, a sequence size 1115 equal to one will comprise a non-THN sequence of redundant blocks.

The storage system addresses 1120 indicate the locations where the sequence is stored on a storage device 125. In some embodiments, the storage system address 1120 indicates the starting location where the sequence is stored. In other embodiments, the storage system address 1120 indicates the starting and ending locations where the sequence is stored. Since the entry represents a sequence of redundant blocks comprising first and second matching sequences, the storage system addresses 1120 indicate the storage locations where both the first sequence and the second sequence are stored on a storage device. In the example shown in FIG. 11, the storage system addresses 1120 indicate the starting location (e.g., S1 1) and ending starting location (e.g., E1 3) for the first sequence and the starting location (e.g., S2 3) and ending starting location (e.g., E2 4) for the second sequence. Note that for a sequence of redundant blocks having a size equal to one (i.e., a set of redundant blocks), the sequence of redundant blocks comprises first and second matching blocks. As such, the storage system addresses 1120 for a sequence of redundant blocks having a size equal to one may specify the locations of the first block (e.g., S1 13) and the second block (e.g., S2 14).

The reference count 1130 may indicate how many files or set of blocks index the corresponding sequence. The reference count 1130 indicates how many matching sequences have been deduplicated using the corresponding sequence and were replaced by an index to the corresponding sequence. The reference count may be used to prevent any deletion of a sequence or entry when the sequence or entry is currently being used.

The THN indicator 1135 may indicate whether the sequence comprises a THN sequence or non-THN sequence of redundant blocks. For example, a value of 0 may indicate that the sequence comprises a non-THN sequence of redundant blocks and a value of 1 may indicate that the sequence comprises a THN sequence of redundant blocks. An entry 1101 representing a THN sequence of redundant blocks may be referred to herein as a "THN entry." An entry 1101 representing a non-THN sequence of redundant blocks may be referred to herein as a "non-THN entry."

In some embodiments, the deduplication DS 250 stores entries representing deduplicated and non-deduplicated redundant blocks. In these embodiments, indicators are used to indicate which entries represent deduplicated or non-deduplicated redundant blocks. The sequence deduplication indicator 1140 may comprise a single indicator that indicates whether the entire sequence of redundant blocks has been deduplicated on the storage devices (i.e., whether all sets of redundant blocks in the sequence has been deduplicated on the storage devices). The sequence deduplication indicator 1140 is further described in relation to FIG. 12. The set deduplication indicator(s) 1145 may comprise one or more indicators 1145, each indicating whether a particular corresponding set of redundant blocks within the sequence has been deduplicated on the storage devices. In some embodiments, the sequence deduplication indicator 1140 is used for offline deduplication. In some embodiments, the sequence deduplication indicator 1140 and the set deduplication indicator(s) 1145 are used for online deduplication. The set deduplication indicator(s) 1145 is further described in relation to FIG. 12.

C. Deduplication Indicators

Figure 12:
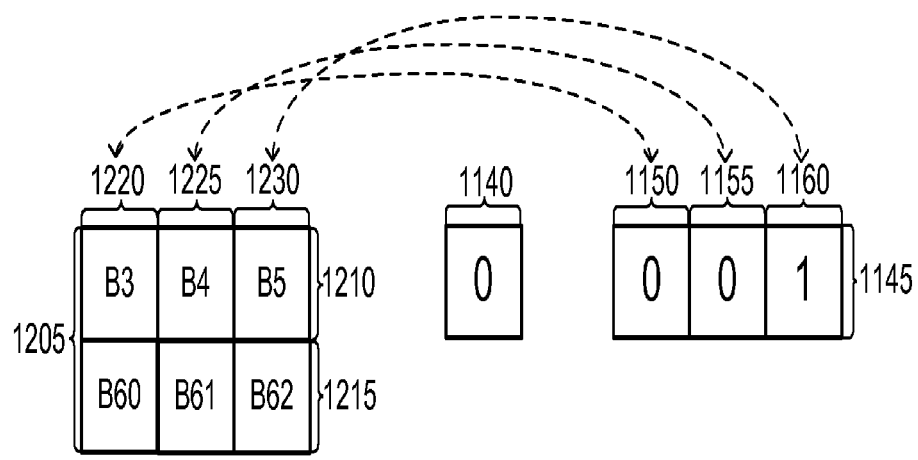
FIG. 12 shows a conceptual diagram of sequence deduplication indicator and set deduplication indicator(s) in a sequence entry of the deduplication DS.

FIG. 12 shows a conceptual diagram of the sequence deduplication indicator 1140 and the set deduplication indicator(s) 1145 used in a sequence entry 1101 of the deduplication DS 250. In the example of FIG. 12, the sequence entry 1101 represents a sequence of redundant blocks 1205 comprising a first sequence of blocks 1210 (B3, B4, B5) that matches a second sequence of blocks 1215 (B60, B61, B62) in data content, each sequence 1210 and 1215 comprising a sequence of 3 blocks. As such, the first sequence of redundant blocks 1205 comprises a first set of redundant blocks 1220 (B3 and B60), a second set of redundant blocks 1225 (B4 and B61), and a third set of redundant blocks 1230 (B5 and B62).

In the example of FIG. 12, the sequence deduplication indicator 1140 for the sequence of redundant blocks 1205 indicates (e.g., by storing a value of "0") that the entire sequence of redundant blocks 1205 (i.e., all 3 sets of redundant blocks) has not been deduplicated on the storage devices. Note that for THN entries representing THN sequences of redundant blocks, the sequence deduplication indicator 1140 will indicate (e.g., by storing a value of "1") that the entire sequence of redundant blocks is deduplicated. For non-THN entries representing non-THN sequences of redundant blocks, however, the sequence deduplication indicator 1140 may indicate that the entire sequence of redundant blocks may or may not have been deduplicated.

In the example of FIG. 12, the set deduplication indicator(s) 1145 comprises a plurality of set deduplication indicators 1150, 1155 and 1160, each indicator corresponding to a particular set of redundant blocks within the sequence of redundant blocks 1205. For example, a first indicator 1150 may correspond to the first set of redundant blocks 1220 and indicate whether the first set of redundant blocks 1220 has been deduplicated on the storage devices. Likewise, a second indicator 1155 may correspond to the second set of redundant blocks 1225 and indicate whether the second set of redundant blocks 1225 has been deduplicated on the storage devices. And a third indicator 1160 may correspond to the third set of redundant blocks 1230 and indicate whether the third set of redundant blocks 1230 has been deduplicated on the storage devices. In the example of FIG. 12, the first indicator 1150 indicates (e.g., by storing a value of "0") that the first set of redundant blocks 1220 has not been deduplicated, the second indicator 1155 indicates (e.g., by storing a value of "0") that the second set of redundant blocks 1225 has not been deduplicated, and the third indicator 1160 indicates (e.g., by storing a value of "1") that the third set of redundant blocks 1230 has been deduplicated on the storage devices.

Note that if the sequence deduplication indicator 1140 indicates that the entire sequence of redundant blocks is deduplicated, there is no need to further examine the set deduplication indicator(s) 1145. In some embodiments, if the sequence deduplication indicator 1140 indicates that the entire sequence of redundant blocks is deduplicated, all of the set deduplication indicator(s) 1145 are also automatically set to indicate that all corresponding sets of redundant blocks are deduplicated. When the sequence deduplication indicator 1140 indicates that the entire sequence of redundant blocks is not deduplicated, however, the set deduplication indicator(s) 1145 may need to be examined to determine which particular sets of redundant blocks have been deduplicated and which have not.

D. Storage Device Mapping Data Structure (DS)

As described above, if a first sequence of blocks match (in data content) a second sequence of blocks, the combination of the first and second sequences of blocks may be referred to as a "sequence of redundant blocks." As used herein, a "deduplicated sequence of redundant blocks" indicates that the first sequence of blocks is deduplicated and not stored and the second sequence of blocks is stored. When the storage operating system 300 deduplicates the first sequence of blocks, for the first sequence of blocks, it produces indexes in a storage device mapping DS 255 to the second sequence of block in place of the redundant first sequence of blocks. The indexes may comprise, for example, the storage system addresses on a storage device of the second sequence of blocks. Indexes may be produced in the storage device mapping DS 255 for each block in the first sequence of blocks that are deduplicated.

As such, the storage device mapping DS 255 is used to record mappings of deduplicated redundant blocks to their corresponding matching stored blocks. For example, the storage device mapping DS 255 may store a mapping for each deduplicated block in the first sequence of blocks to its corresponding matching block in the second sequence of blocks. The storage device mapping DS 255 may be used by the storage operating system 300 to perform later read requests received for deduplicated redundant blocks.

Figure 13:
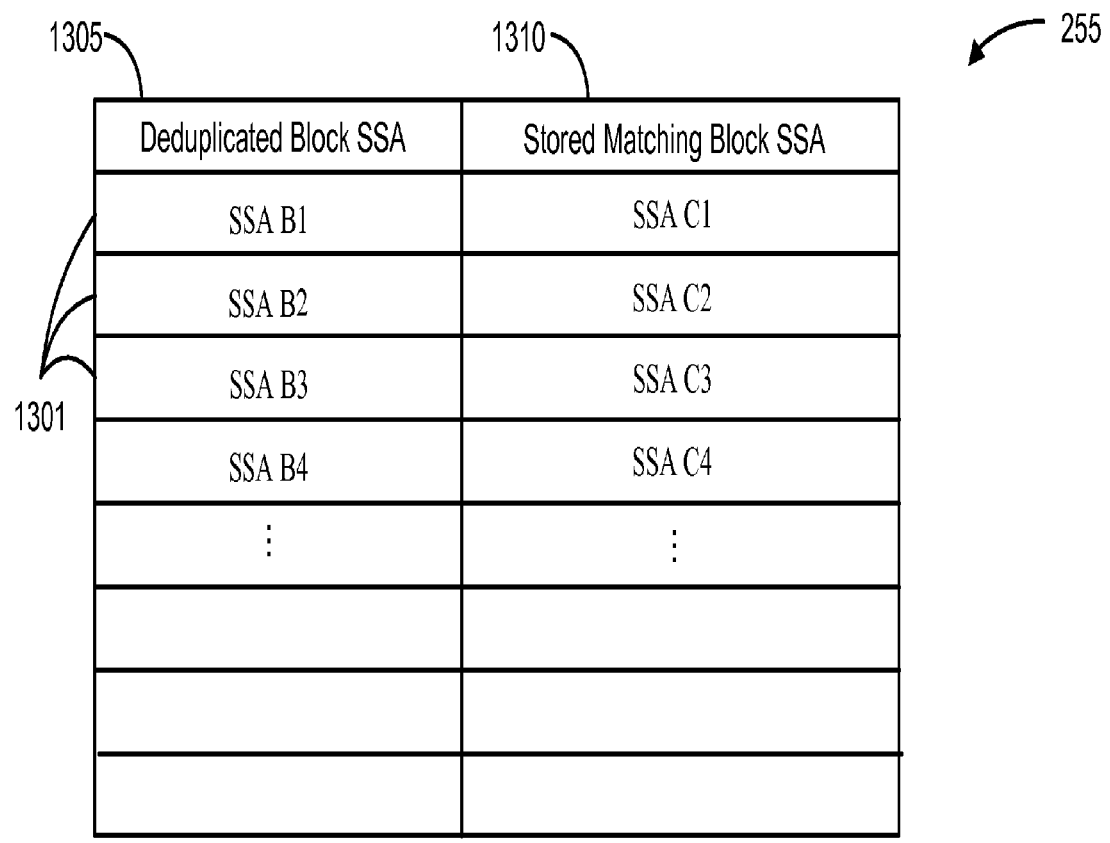
FIG. 13 shows a conceptual diagram of an exemplary storage device mapping DS.

FIG. 13 shows a conceptual diagram of an exemplary storage device mapping DS 255 comprising a plurality of mapping entries 1301, one mapping entry 1301 for each deduplicated block. A mapping entry 1301 may comprise data fields for an assigned storage system address (SSA) 1305 for a deduplicated block and an index 1310 to a corresponding matching stored block. The index 1310 may comprise a pointer or storage system address (SSA) to the corresponding matching stored block. For example, a mapping entry 1301 may comprise the assigned LBN for a deduplicated block and an LBN for the corresponding matching stored block.

Later read requests received for deduplicated blocks may then be performed by the storage operating system 300 by using the storage device mapping DS 255. Each received read request will specify storage system addresses of deduplicated blocks to be read. The storage device mapping DS 255 may then be used to map the SSAs of the deduplicated blocks (received in the read request) to the SSAs of the corresponding matching blocks, whereby the data of the corresponding matching blocks are retrieved and returned.

V. CACHE MECHANISMS AND METHODS

A. Caching Overview

As discussed above, the storage operating system 300 comprises a caching layer 280 for managing the cache memory 225. In some embodiments, the caching layer 280 operates in conjunction with the other software layers of the storage operating system 300 to cache and deduplicate data in the cache memory 225. To perform its functions, the caching layer 280 may maintain or access various data structures (DSs), such as a fingerprint DS 245, a deduplication DS 250, a deduplicate in cache DS 260, a cache mapping DS 265, and/or a popular block DS 270 (as shown in FIG. 2).

The storage system may typically implement large capacity storage devices (such as disk devices) for storing data. The cache memory 225 may be allocated by the storage operating system for use by the file system 350 for caching data. For improved response to received read or write requests, the file system 350 may temporarily store/cache particular data into the cache memory 225 for faster access. The cache memory 225 may comprise a memory device having lower random read-latency than a typical storage device and may thus still provide faster data access than a typical large capacity storage device.

Typically, data blocks may be stored to the cache memory 225 upon receiving a new write or read request. A new write request, that is received by the storage operating system, will comprise new data blocks to be stored to the storage devices. These new data blocks are typically stored to the cache memory 225 as well. Also, if a new read request is received by the storage operating system, and the requested data is not already resident in cache memory 225 (cache miss), the storage operating system will retrieve the requested data from the storage devices 125 and also typically store the requested data to the cache memory 225.

In particular, in response to receiving a read request (specifying a storage system address of a requested data block) form a server system 110, the storage operating system may first determine if the requested data block is stored in the cache memory 225. The caching layer 280 may determine such using the cache mapping DS 265 that maps storage system addresses to cache addresses. For example, if the requested storage system address is found in the cache mapping DS, the caching layer may determine that the requested data resides in the cache memory 225 and retrieve the requested data from the cache memory 225 at the mapped cache address. If the requested data are resident in the cache memory 225 (cache hit), the requested data is loaded in memory 240 for processing by the storage system 120. However, if the requested data are not resident in the cache memory 225 (cache miss), the storage operating system 300 then retrieves the requested data from the storage devices 125 using the received storage system address. The requested data may then be loaded in memory 240 for processing by the storage system 120. Upon successful completion of the request, the storage operating system 300 returns a response to the server system 110 over the network 150.

B. Storage Mechanisms of the Cache Memory

Figure 14:
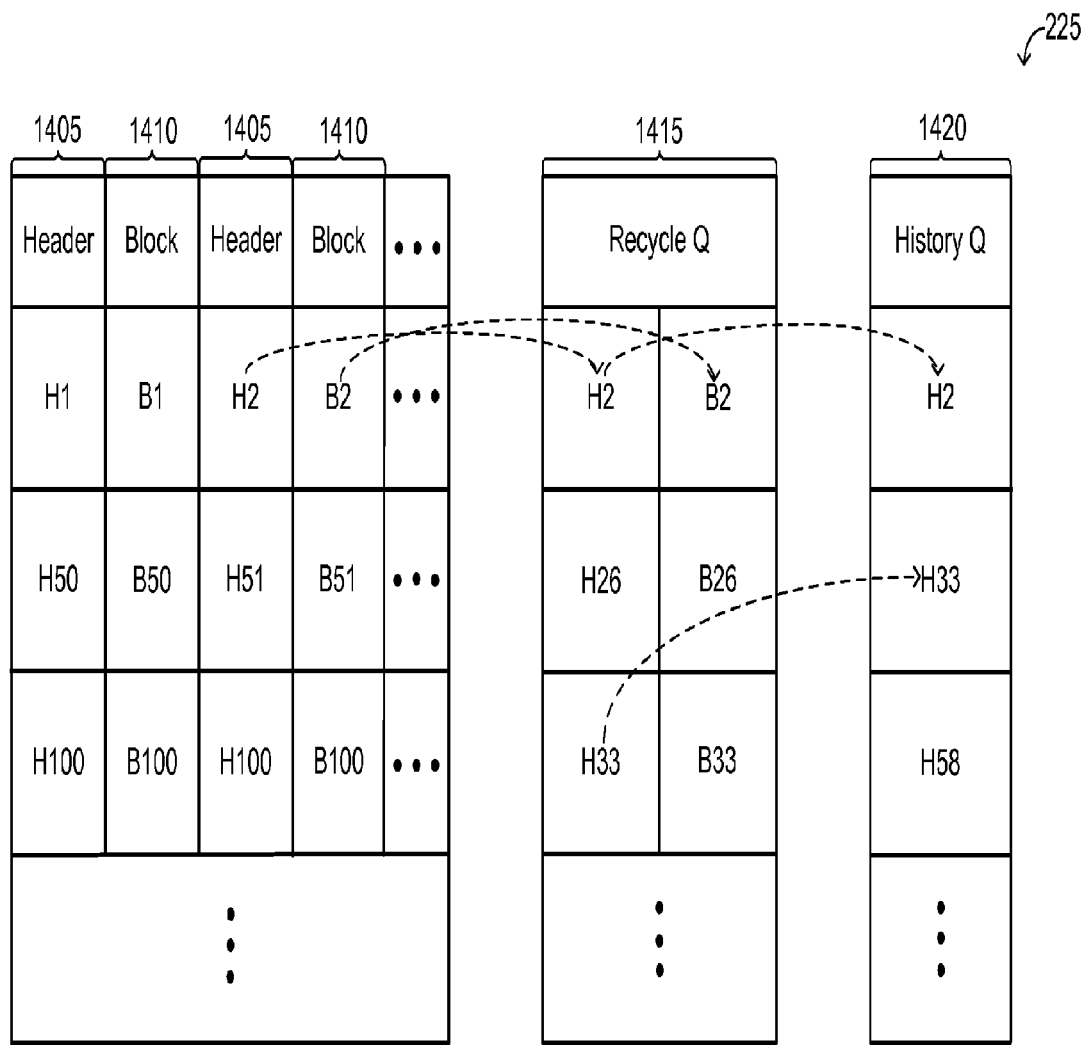
FIG. 14 shows a conceptual diagram of a storage mechanisms used for caching data blocks in the cache memory.

As shown in the example of FIG. 2, the cache memory 225 may comprise some or all of the storage space of the memory 240 of the storage system 120. In other embodiments, the cache memory 225 may comprise a separate dedicated cache memory device 225. FIG. 14 shows a conceptual diagram of a storage mechanisms used for caching data blocks in the cache memory 225.

As shown in the example of FIG. 14, the storage space of the cache memory 225 may be logically partitioned/divided into a plurality of metadata headers 1405 (shown as "H1," "H2," etc.) and a plurality of data blocks 1410 (shown as "B1," "B2," etc.), each data block 1410 having an associated metadata header 1405. For illustrative purposes, in the example of FIG. 14, the metadata header 1405 associated with a data block 1410 is stored in a storage location adjacent to the data block 1410. In other embodiments, however, the metadata header 1405 associated with a data block 1410 is not stored in a storage location adjacent to the data block 1410. Also, in other embodiments, the plurality of metadata headers 1405 may be stored external to the storage space of the cache memory 225.

Each data block 1410 stored in cache memory 225 has a corresponding data block copy stored on a storage device 125. Each data block 1410 stored in cache memory 225 has an associated storage system address used by the storage system 120 to uniquely identify the data block. For example, the storage system address of the data block in cache memory may comprise the storage system address of the data block copy stored on a storage device 125. Each data block 1410 stored in cache memory 225 also has an associated cache memory address that indicates the storage location of the data block 1410 in the cache memory 225. Each metadata header 1405 also has an associated cache memory address that indicates the storage location of the metadata header 1405 in the cache memory 225.

The metadata header 1405 stores metadata describing an associated data block 1410. For example, the metadata header 1405 may store metadata for the associated data block 1410 such as a block access history, storage system address information, pointer to the associated data block 1410 in cache memory, etc. In other embodiments, other metadata header 1405 may store other metadata for the associated data block 1410.

The block access history may comprise a total number of times/occurrences that the data block 1410 was accessed while stored in the cache memory 225 (referred to as the "number of accesses"). For example, the block access history may comprise a total number of access requests (read/write requests) received by the storage operating system 300 for the data block 1410 while stored in the cache memory 225. In some embodiments, a set of redundant blocks (each having matching data content), that are currently stored to cache memory or were previously stored to cache memory, having a combined total number of accesses equal to or greater than a predetermined threshold number of accesses are each identified as "popular" blocks. In these embodiments, sets of redundant blocks in cache memory identified as popular data blocks are selected for deduplication in cache memory 225 and on the storage devices 125.

The storage system address information may comprise various forms of storage system addresses used by the storage system for uniquely identifying the data block 1410. The storage system addresses may include logical and/or physical storage location information. Examples of various storage system addresses that may be used include inode number, a file block number (FBN), logical block number (LBN), physical block number (PBN), etc. In other embodiments, other forms of storage system addresses may be used.

The pointer to the associated data block 1410 in cache memory may comprise the cache address where the associated data block 1410 is stored in the cache memory 225. Note that typically the metadata header 1405 of a data block 1410 is located first, then the pointer to the data block 1410 stored in the metadata header 1405 is used to locate the associated data block 1410 in cache memory 225. The metadata header 1405 may be located using a cache mapping DS 265 that maps storage system addresses of data blocks to cache addresses where the data blocks are stored in cache memory. The cache mapping DS 265 is discussed below in relation to FIG. 15.

As shown in the example of FIG. 14, the cache memory 225 may also store and maintain various queues, such as a recycle queue 1415 and a history queue 1420. Each queue may comprise a predetermined reserved storage space in the cache memory 225 allocated for use by the queue. In other embodiments, the various queues 1415 and 1420 may be stored external to the storage space of the cache memory 225.

As known in the art, the caching layer 280 transfers a data block 1410 and its associated metadata header 1405 to the recycle queue 1415 upon the occurrence of a predetermined event. When a data block 1410 and its associated metadata header 1405 are transferred to the recycle queue 1415, the data block 1410 and its associated metadata header 1405 are deleted from its original storage location in the cache memory 225 and stored to the reserved storage space allocated to the recycle queue 1415 in the cache memory 225. This is conceptually shown in FIG. 14 by the dashed arrow lines from the original storage location in the cache memory 225 to the recycle queue 1415 for data block B2 and its associated metadata header H2.

The occurrence of a predetermined event may comprise receiving a read request. For example, after a read request is received for the data block 1410, data block 1410 and its associated metadata header 1405 are typically transferred to the recycle queue 1415. As discussed above, when a new write request is received by the storage operating system 300, the new write request comprising new data blocks to be stored, the new data blocks are typically stored to the cache memory 225 and also processed for storage to the storage devices 125. This processing may include deduplication processing of the new data blocks for possible deduplication on the storage devices 125. In some embodiments, after the storage operating system 300 completes deduplication processing of the new data block, the corresponding new data block stored in the cache memory 225 is transferred to the recycle queue 1415. Note that the new data blocks may or may not ultimately be stored to a storage device 125 after the deduplication processing is completed depending on the results of the deduplication processing.

Since the storage size of the cache memory 225 is relatively small, data blocks must routinely be removed from the cache memory to make space for new data blocks. As known in the art, the caching layer 280 executes a cache replacement policy at regular time intervals to examine data blocks in the recycle queue 1415 for possible replacement/removal from cache memory 225. Various cache replacement policies known in the art may be utilized by the caching layer 280, such as a least recently used (LRU) algorithm, or other algorithms known in the art. If a data block 1410 is selected for removal by the cache replacement policy, the data block 1410 and its associated metadata header 1405 are typically deleted from the recycle queue 1415 and their cache addresses are stored to a free queue (not shown) to indicate that these cache addresses are free to store new data and metadata.

In some embodiments, if a data block 1410 is selected for removal by the cache replacement policy, before the data block 1410 and its associated metadata header 1405 are deleted from the recycle queue 1415, the caching layer 280 first examines the deduplication DS 250 to determine whether the data block 1415 is part of a non-THN sequence or set of redundant blocks (e.g., by examining the THN indicator 1135, sequence deduplication indicator 1140, and/or set deduplication indicator(s) 1145). If so, the data block 1410 is deleted but its associated metadata header 1405 is transferred to the history queue 1420. When the associated metadata header 1405 is transferred to the history queue 1420, the associated metadata header 1405 is deleted from the recycle queue 1415 and stored to the reserved storage space allocated to the history queue 1420 in the cache memory 225. This is conceptually shown in FIG. 14 by the dashed arrow lines from the recycle queue 1415 to the history queue 1420 for associated metadata headers H2 and H33.

C. Cache Mapping DS

As discussed above, the storage system 120 may store a plurality of data blocks on a plurality of storage devices 125, each data block having an associated storage system address that indicates the storage location of the data block on a storage device. Each data block stored in the cache memory has an associated storage system address and a cache memory address that indicates the storage location of the data block in the cache memory. Access requests (read/write requests) received from server systems 110 typically specify storage system addresses. When the access requests are received by the storage system, the storage operating system may perform a mapping between the received storage system addresses to cache memory addresses to access the requested data blocks in the cache memory (if the requested data blocks reside in cache memory).

As such, when using a cache memory 225 to store data, the caching layer 280 keeps track of the data stored in the cache memory 225 and is able to map storage system addresses of data blocks to cache memory addresses where the data blocks are stored in cache memory. Typically, the caching layer 280 may do so by producing and maintaining a cache mapping DS 265.

Figure 15:
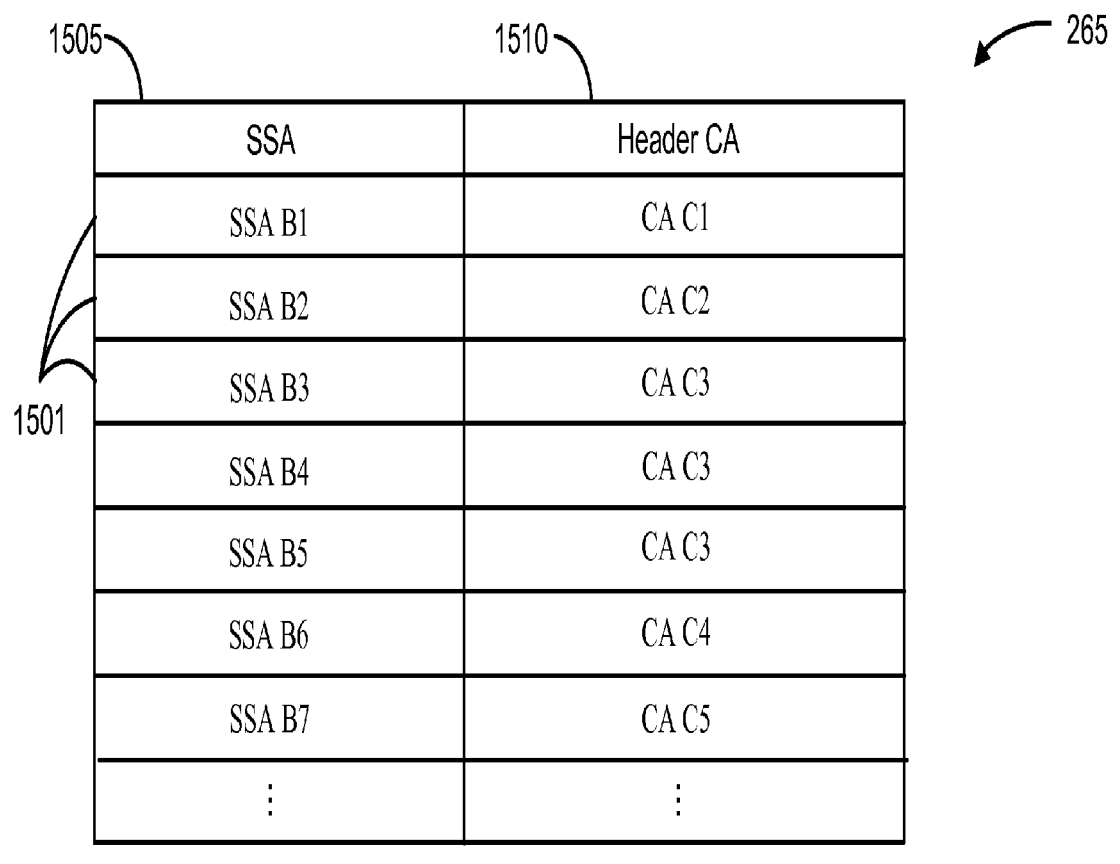

FIG. 15 shows a conceptual illustration of an exemplary cache mapping DS 265. As used herein, a cache mapping DS 265 may comprise any container or object for organizing and storing mapping data (such as a table, file, etc.). A cache mapping DS 265 may comprise a plurality of mapping entries 1501, each mapping entry 1501 comprising mapping data used for mapping a storage system address to a cache memory address for a data block stored in cache memory.

A mapping entry 1501 may comprise data fields for a storage system address (SSA) 1505 for a data block and an index 1510 to an associated metadata header 1405 stored in cache memory 225. The index 1510 may comprise a pointer or cache address (CA) to the metadata header 1405 associated with the data block. As such, the metadata header 1405 of a data block 1410 may be located in the cache memory first, then the pointer to the data block 1410 stored in the metadata header 1405 is used to locate the data block 1410 in cache memory 225.

Note that the cache mapping DS 265 stores mapping entries 1501 for all data blocks in cache memory, regardless of whether the data block is deduplicated or not in cache memory. For data blocks that are not deduplicated in cache memory, each storage system address will map to a different metadata header 1405 which will ultimately map to a different data block 1410 in cache memory 225. In the examples shown in FIG. 15, a first data block having a storage system address SSA B1 maps to a first metadata header 1405 having a cache address CA C1, which will contain a pointer to the first data block in cache memory 225. A second data block having a storage system address SSA B2 maps to a second metadata header 1405 having a cache address CA C2, which will contain a pointer to the second data block 1410 in cache memory 225.

For a set of redundant blocks that are deduplicated in cache memory, however, each storage system address will map to a same metadata header 1405 which will ultimately map to a same data block 1410 in cache memory 225. This is because there is a single instance of a data block stored to cache memory for each set of redundant blocks that are deduplicated in cache memory. In the examples shown in FIG. 15, third, fourth, and fifth data blocks comprise a set of redundant blocks that are deduplicated in cache memory. As such, the third, fourth, and fifth data blocks having storage system addresses SSA B3, SSA B4, and SSA B5, respectively, each map to a same third metadata header 1405 having a cache address CA C3, which will contain a pointer to the same third data block in cache memory 225.

D. Deduplication in Cache Memory

If any data blocks are deduplicated on the storage devices 125, if the same data blocks are also stored in the cache memory 225 of the storage system 120, they are also deduplicated in the cache memory 225. When deduplicating data blocks in a cache memory 225, only a single instance of redundant blocks are stored in the cache memory while any redundant blocks are deduplicated and deleted or not stored in the cache memory. Deduplication of data blocks in the cache memory may similarly provide storage savings in the cache memory. Since the storage size of the cache memory is relatively small, any storage savings realized in the cache memory is particularly beneficial.

In some embodiments, the deduplication layer 275 or storage layer 380 may specify data blocks that have been deduplicated on the storage devices in the deduplicate in cache DS 260. In these embodiments, the caching layer 280 may examine the deduplicate in cache DS 260 to determine if any of the specified data blocks are stored in the cache memory. If so, the caching layer 280 deduplicates the data blocks in cache memory. To deduplicate a set of redundant blocks in cache memory, the caching layer 280 may locate and delete all but one instance of the redundant blocks, whereby only one data block in the set of redundant blocks is stored in cache memory. The caching layer 280 then modifies the cache mapping DS 265 so that the storage system addresses of each redundant block in the set maps to the same metadata header associated with the stored data block, which then points to the stored data block in cache memory.

VI. OVERVIEW OF DEDUPLICATION BASED ON BLOCK POPULARITY

As described above, the storage operating system may deduplicate sets of redundant data blocks on a set of storage devices based on a predetermined deduplication requirement for storage devices. In general, sets of redundant data blocks are deduplicated on the storage devices if they meet the predetermined deduplication requirement and sets of redundant data blocks are not initially deduplicated on the storage devices if they do not meet the predetermined deduplication requirement. As such, the storage devices typically store sets of redundant data blocks since not all sets of redundant data blocks will meet the predetermined deduplication requirement.

For illustrative purposes only, the predetermined deduplication requirement is described below as a THN sequence of redundant blocks. In other embodiments, however, the predetermined deduplication requirement for storage devices comprises another type or form of deduplication requirement for storage devices. In some embodiments, a THN sequence of redundant blocks meets the predetermined deduplication requirement for storage devices. In some embodiments, a non-THN sequence of redundant blocks does not meet the predetermined deduplication requirement for storage devices.

A. Popular Redundant Blocks

Data blocks in cache memory 225 are typically deduplicated based only on the deduplication of data blocks on the storage devices 125, and further deduplication processing of the data blocks in cache memory is not performed. As such, further deduplication of data blocks and storage savings in the cache memory are not realized by conventional deduplication methods. For example, if some sets of redundant data blocks were deduplicated on the storage devices (since they met the predetermined deduplication requirement), if corresponding copies of the sets of redundant data blocks are currently stored in cache memory, these corresponding copies of the sets will also be deduplicated in cache memory. However, if some sets of redundant data blocks were not deduplicated on the storage devices (since they did not meet the predetermined deduplication requirement), if corresponding copies of the sets of redundant data blocks are currently stored in cache memory, these corresponding copies of the sets will not be deduplicated in cache memory and further deduplication processing of redundant data blocks in cache memory is not performed.

In some embodiments, sets of redundant blocks in cache memory that have not been deduplicated are further processed for deduplication based on the popularity (number of accesses) of the sets of redundant blocks in cache memory. For example, sets of redundant blocks that have not met the predetermined deduplication requirement for storage devices (e.g., comprise non-THN sequences of redundant blocks) and have not been deduplicated on the storage devices (and thus have not been deduplicated in cache memory), are targeted for further deduplication processing in cache memory. In some embodiments, if a set of redundant blocks in cache memory is determined to have a combined number of accesses being equal to or greater than a predetermined threshold number of accesses, each data block in the set of redundant blocks is determined to be "popular." Popular sets of redundant blocks are selected for deduplication in cache memory and the storage devices.

Deduplication of popular sets of redundant blocks (data blocks with a relatively high number of accesses) is especially beneficial in cache memory since popular data blocks are typically retained in cache memory by the cache replacement policy for longer periods of time than unpopular data blocks (data blocks with a relatively low number of accesses). As such, greater storage savings are realized over a longer period of time for deduplication of popular sets of redundant blocks than for unpopular sets of redundant blocks.

In some embodiments, popular sets of redundant blocks identified and selected for deduplication in cache memory are also selected for deduplication on the storage devices (based on the selection of the sets of redundant data blocks for deduplication in cache memory). This may be referred to as "cache initiated deduplication on storage devices." Note that deduplication of sets of redundant blocks that have not met the predetermined deduplication requirement (e.g., non-THN sequences of redundant blocks) will still provide storage savings in the storage devices. However, deduplication of such sets of redundant blocks may have some negative effects as well. For example, deduplication of non-THN sequences of redundant blocks on the storage devices may cause longer read latencies when later reading the deduplicated data blocks. However, as described above, if data blocks requested in a read request are resident in cache memory (comprising a cache hit), the requested data blocks are retrieved from cache memory, thus avoiding the need to retrieve the requested data blocks from the storage devices and the longer read latencies. If data blocks are popular (have a relatively high number of accesses), they will likely be retained in cache memory for longer periods of time by the cache replacement policy. Thus the popular data blocks will often be retrieved from cache memory, thus avoiding retrieval from the storage devices altogether, and reducing the read latencies overall.

B. Offline and Online Deduplication of Storage Devices and Cache

Deduplication processing may be performed for new data blocks received in new write requests (e.g., received from server systems 110). In some embodiments, deduplication processing of new data blocks may be performed using two processes that may execute concurrently for deduplicating data on the storage devices and the cache memory. Further, deduplication processing may be performed offline or online.

A first deduplication process is referred to as "storage device deduplication" for deduplicating new data blocks on the storage devices according to predetermined requirements. For example, deduplication on the storage devices may require a THN sequence of redundant blocks before deduplication is performed. In other embodiments, however, a different deduplication requirement may be utilized for deduplication on the storage devices. Regardless of the deduplication requirement utilized for deduplication on the storage devices, the first deduplication process may deduplicate redundant blocks that meet the deduplication requirement (e.g., THN sequences of redundant blocks) and not deduplicate redundant blocks that do not meet the deduplication requirement (e.g., non-THN sequences of redundant blocks). Redundant blocks that have been deduplicated in the storage devices will also be deduplicated in cache memory. Likewise, redundant blocks that have not been deduplicated in the storage devices will not be deduplicated in cache memory. As such, the cache memory will typically contain redundant blocks.

A second deduplication process is referred to as "cache memory deduplication" for deduplicating new data blocks on the cache memory according to embodiments herein. In some embodiments, the second deduplication process further processes redundant blocks in cache memory that have not been deduplicated on the storage devices by the first deduplication process, and hence have not been deduplicated on the cache memory as well. In some embodiments, the second deduplication process deduplicates redundant blocks in cache memory based on the popularity of the redundant blocks.

Also, deduplication processing on storage devices and cache memory may be performed offline or online. In offline deduplication, deduplication processing is performed at regular predetermined time intervals. Also, offline deduplication is typically not performed upon arrival of the new data blocks but is performed after the new data blocks are stored to the storage devices 125. The data blocks currently stored to the storage devices 125 may be processed to determine whether deduplication of the stored blocks is needed. In offline deduplication, if deduplication is performed on data blocks found to be redundant, the redundant blocks may be deleted from the storage devices 125.

In online deduplication, deduplication processing is not performed at regular predetermined time intervals but is performed upon arrival of new data blocks in newly received write requests. Online deduplication is typically performed before the new data blocks are stored to the storage devices 125. Newly received data blocks may be processed to determine if they are redundant with data blocks currently stored to the storage devices 125, and whether the newly received data blocks should be deduplicated. In online deduplication, if deduplication is performed on data blocks found to be redundant, the redundant blocks may not need to be deleted from the storage devices 125 as they may not have been stored to the storage devices 125 yet.

Offline deduplication may provide more efficient and effective deduplication of data blocks on the storage devices since it will consider for deduplication a larger number of new data blocks comprising all data blocks received since the last time interval. As such, the deduplication requirement imposed by the storage device deduplication process may be more easily met in offline deduplication. Thus more data blocks will typically be deduplicated on the storage devices (and hence the cache memory) in offline deduplication.

Since online deduplication is performed upon arrival of the new data blocks, it may provide less efficient and effective deduplication of data blocks on the storage devices. Since it will consider for deduplication a smaller number of new data blocks (those recently received in a new write request), the deduplication requirement imposed by the storage device deduplication process may be more difficult to meet instantly in online deduplication. Rather, the deduplication requirement may need to be met in an incremental piecemeal manner as data blocks are gradually received, which is less efficient. However, online processing may deduplicate data blocks as they are received, thus storage space may be saved immediately. Also, since redundant blocks may be deduplicated before being stored to the storage devices 125, online processing may avoid unnecessary write and delete operations to the storage devices 125.

As such, offline or online processing may be chosen considering the advantages and disadvantages of each. As described above, there are four types of deduplication processes: 1) offline storage device deduplication (described below in relation to FIGS. 16 and 17A-B), 2) offline cache memory deduplication (described below in relation to FIGS. 18 and 19), 3) online storage device deduplication (described below in relation to FIGS. 20 and 21A-B), and 4) online cache memory deduplication (described below in relation to FIGS. 22-23). In some embodiments, the deduplication layer 275 and the storage layer 380 are configured to perform 1) offline storage device deduplication and 3) online storage device deduplication. In some embodiments, the caching layer 280 is configured to perform 2) offline cache memory deduplication and 4) online cache memory deduplication.

The offline storage device and cache memory deduplication processes may execute concurrently, but are interrelated processes. Since offline storage device deduplication may be performed at regular intervals, offline cache memory deduplication may also be performed at regular intervals. The online storage device and cache memory deduplication processes may execute concurrently, but are also interrelated processes. Since online storage device deduplication may be performed upon arrival of new data blocks, online cache memory deduplication may also be performed upon arrival of new data blocks.

VII. OFFLINE DEDUPLICATION ON STORAGE DEVICES AND CACHE MEMORY BASED ON BLOCK POPULARITY

Figure 16:
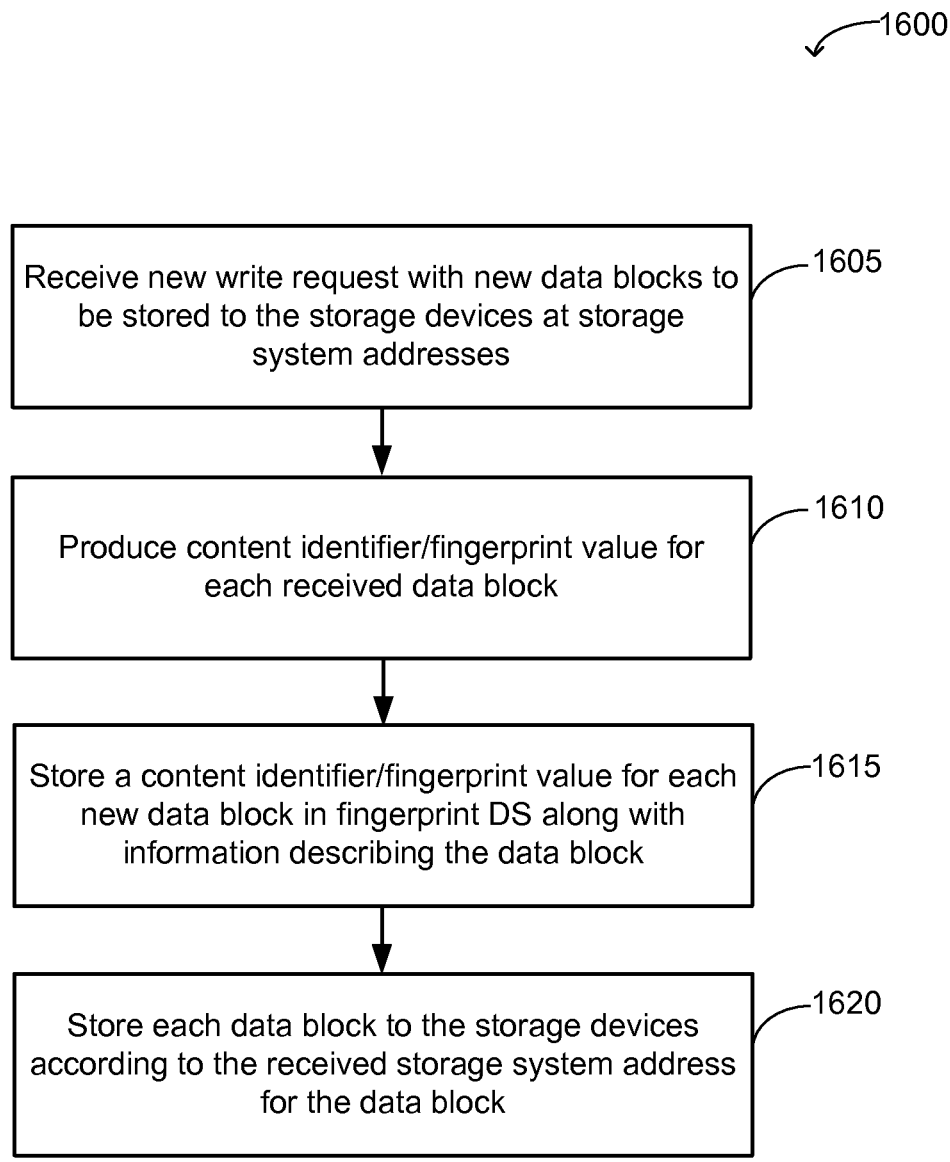
FIG. 16 is a flowchart of a method for an offline pre-processing routine for deduplication of data blocks on storage devices.
Figure 17A:
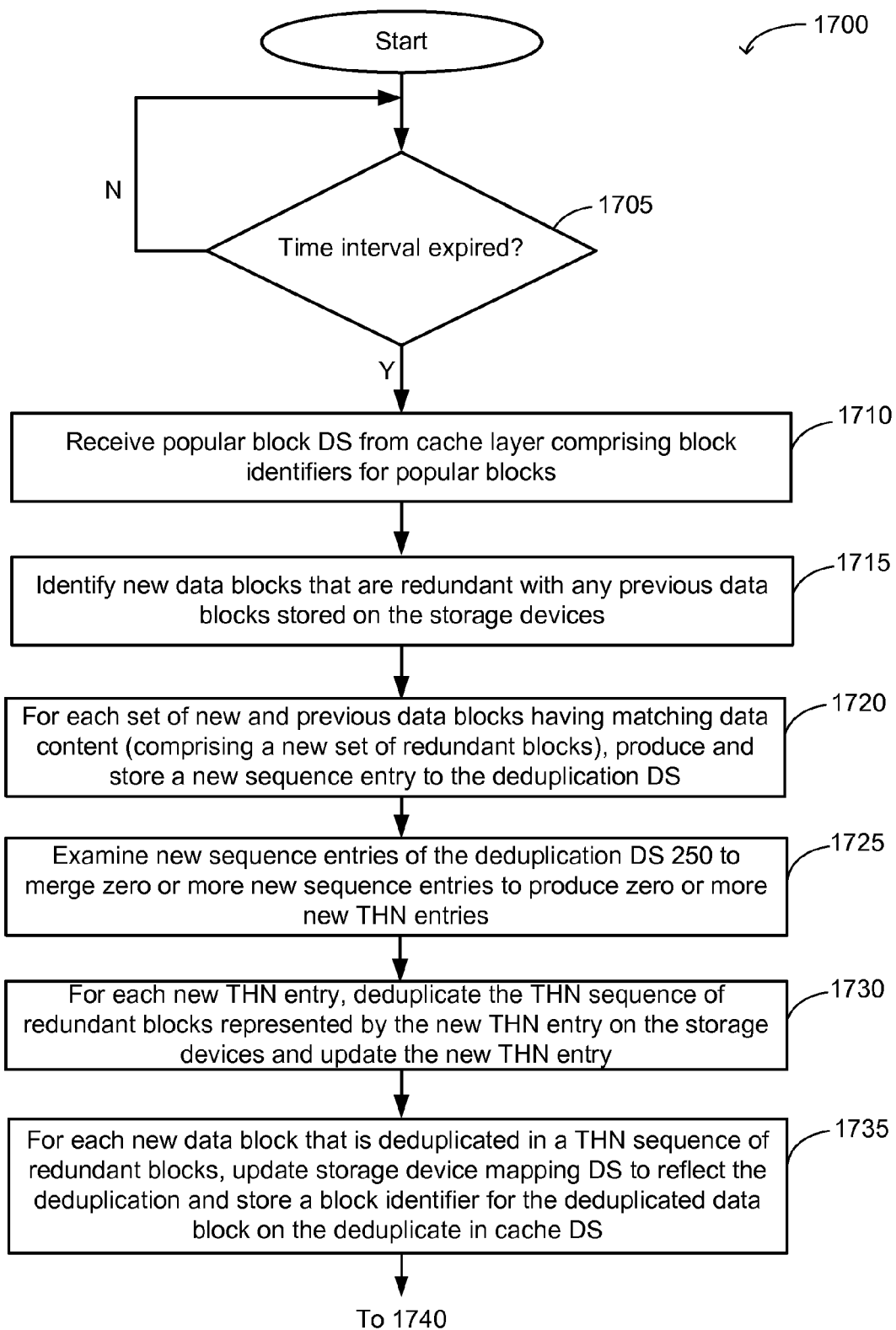
FIGS. 17A-B show a flowchart of a method for offline deduplication of data blocks on storage devices.
Figure 17B:
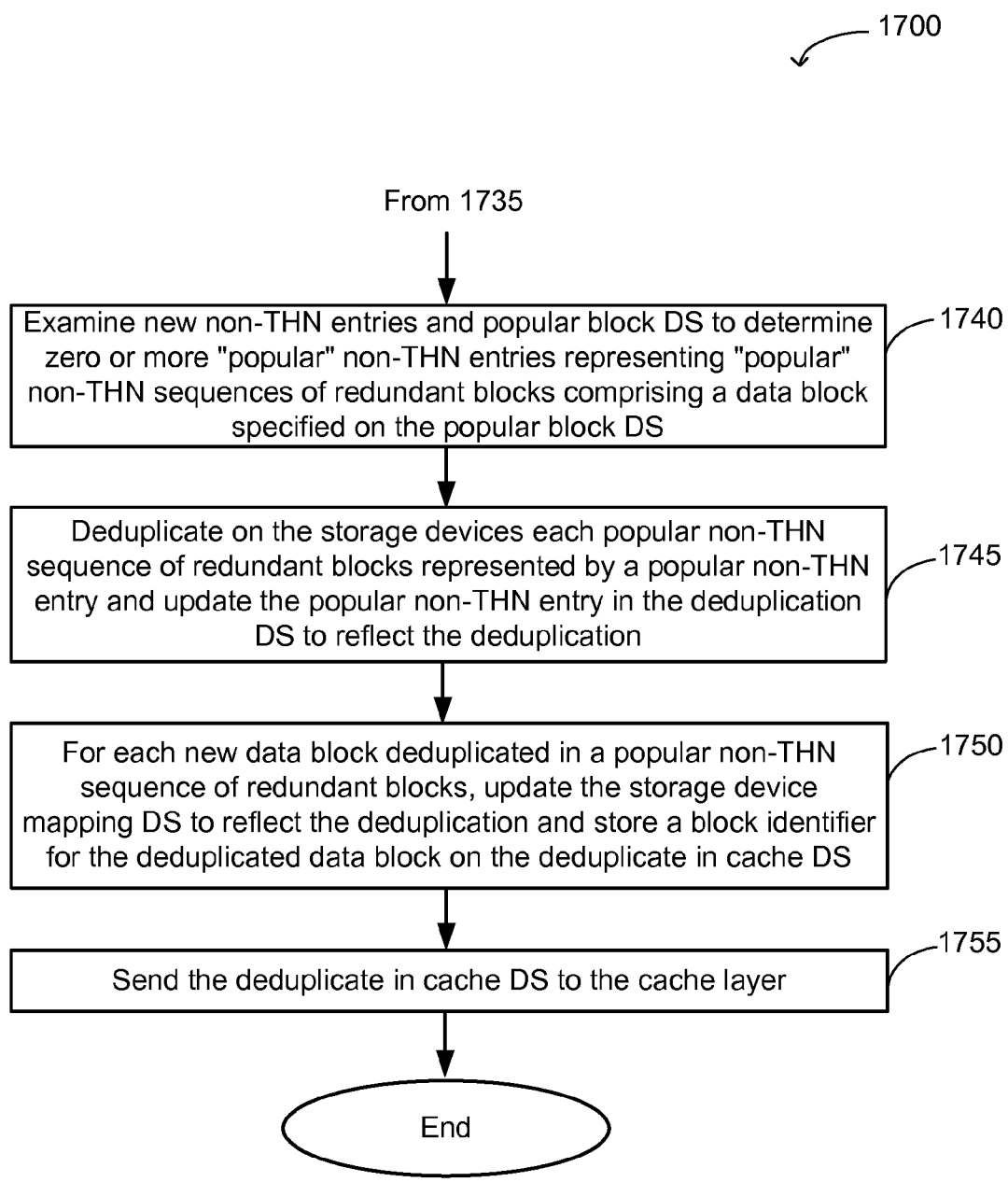
Figure 18:
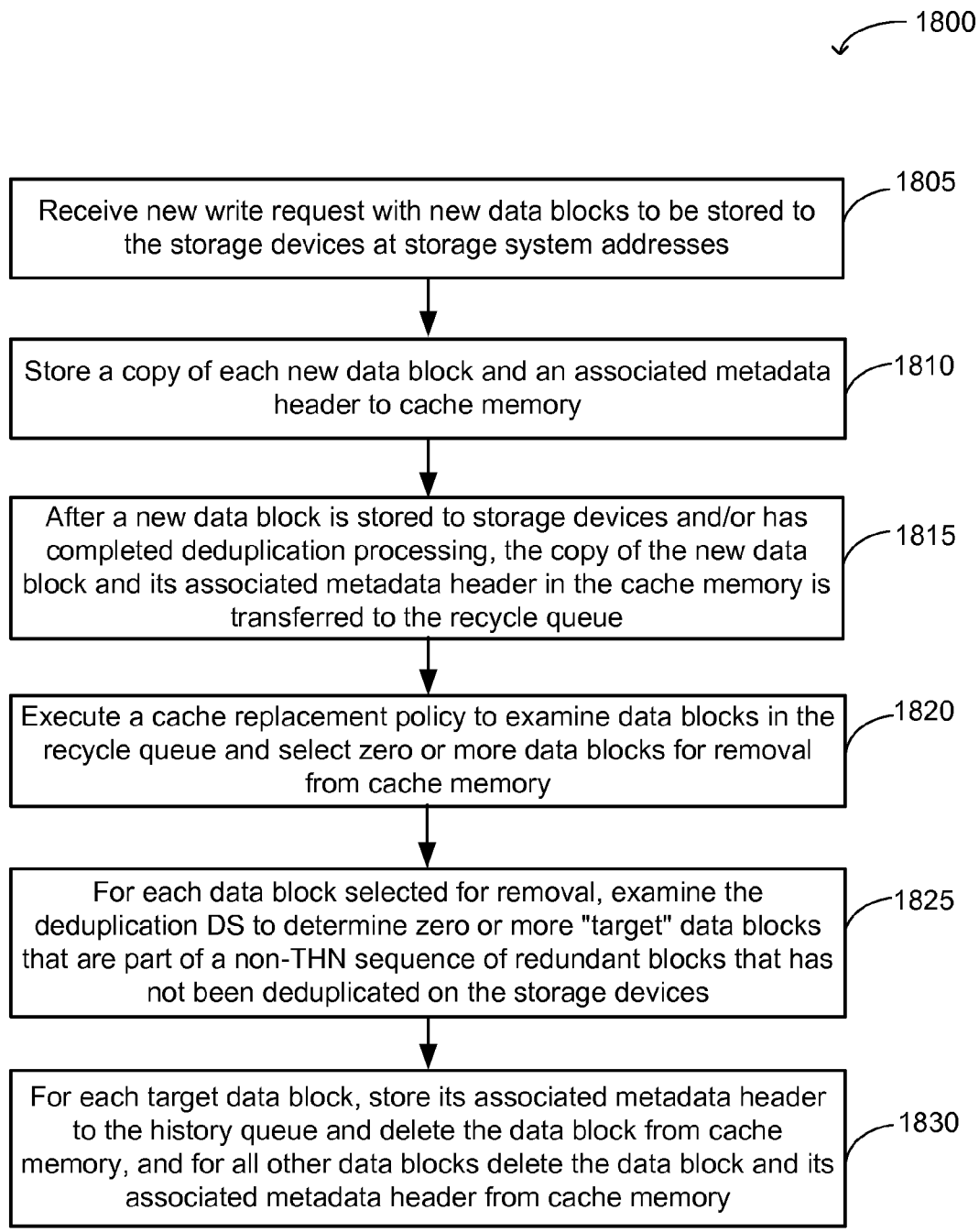
FIG. 18 is a flowchart of a method for an offline pre-processing routine for deduplication of data blocks on cache memory.
Figure 19:
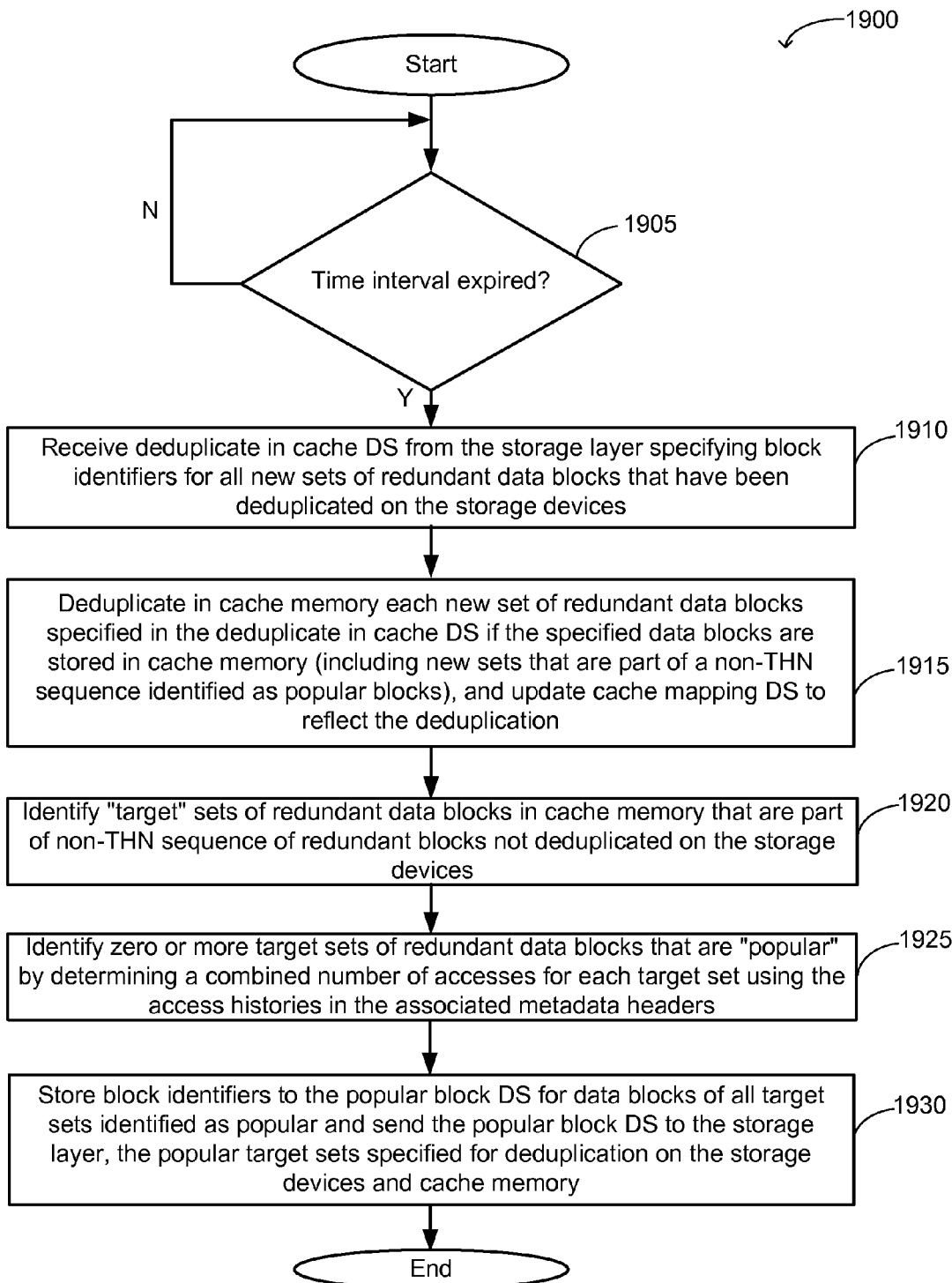
FIG. 19 is a flowchart of a method for offline deduplication of data blocks on cache memory.

FIGS. 16-19 show flowcharts of methods for offline deduplication on storage devices and cache memory. FIGS. 16 and 17A-B show flowcharts of methods for offline deduplication performed on the storage devices (e.g., by the deduplication layer 275 and the storage layer 380). FIGS. 18 and 19 show flowcharts of methods for offline deduplication performed on the cache memory (e.g., by the caching layer 280). Although interrelated, each flowchart of FIGS. 16-19 may be executed concurrently. In some embodiments, some or all of the steps of the methods shown in FIGS. 16-19 are implemented by software and/or hardware.

A. Offline Pre-processing Routine of Deduplication on Storage Devices

FIG. 16 is a flowchart of a method 1600 for an offline pre-processing routine for deduplication of data blocks on storage devices 125 of a storage system 120. In some embodiments, some of the steps of method 1600 are performed by the deduplication layer 275 in conjunction with other layers of the storage operating system 300. The order and number of steps of the method 1600 are for illustrative purposes only and, in other embodiments, a different order and/or number of steps are used.

The method 1600 begins when a new write request with new data blocks to be stored to the storage devices is received (at 1605). The received write request will specify or indicate a storage system address for each data block indicating the address location where the data block is to be stored on the storage devices. For example, the write request may be received by the storage system from an application 115 executing on a server system 110. The method 1600 then produces (at 1610) a content identifier/fingerprint value for each received data block. For example, the method 1600 may apply a checksum operation to each data block to produce a checksum value comprising the content identifier value for each data block. The method 1600 then stores (at 1615) a content identifier/fingerprint value for each new data block in the fingerprint DS 245 along with information describing the data block as an entry in the fingerprint DS 245. For example, an entry for a data block may contain such information as the content identifier/fingerprint value, storage system address, inode generation number (for detecting stale fingerprint entries), etc. The method 1600 then stores (at 1620) each data block to the storage devices 125 according to the received storage system address for the data block. The method 1600 then ends.

The method 1600 executes each time a new write request with new data blocks is received by the storage system. Note that since this is an offline process, deduplication of the received data blocks are not performed upon receiving of the data blocks, but rather at regular time intervals (as described below in relation to FIGS. 17A-B).

B. Offline Deduplication on Storage Devices

FIGS. 17A-B show a flowchart of a method 1700 for offline deduplication of data blocks on storage devices 125 of a storage system 120. In some embodiments, some of the steps of method 1700 are performed by the deduplication layer 275 and the storage layer 380 in conjunction with other layers of the storage operating system 300. The order and number of steps of the method 1700 are for illustrative purposes only and, in other embodiments, a different order and/or number of steps are used.

Since the method 1700 is an offline process, the method 1700 is performed at predetermined time intervals. As such, the method 1700 begins by determining (at 1705) if a predetermined time interval has expired. If not, the method 1700 continues at step 1705. Note that since this is an offline process, the deduplication of data blocks is initiated at predetermined time intervals after the data block have already been stored on the storage devices. If the predetermined time interval has expired, the method 1700 continues at step 1710.

At step 1710, the method receives a popular block DS 270 from the caching layer 280. In some embodiments, the caching layer 280 produces the popular block DS 270 and sends it to the storage layer 380 at regular time intervals. The popular block DS 270 comprises block identifiers (e.g., storage system addresses) for data blocks identified as "popular" blocks by the caching layer 280. The popular block DS 270 is described further below in relation to FIG. 19.

In some embodiments, the popular block DS 270 specifies sets of redundant data blocks that were identified as "popular" blocks by the caching layer 280 and also did not meet the predetermined deduplication requirement for the storage devices. For example, the popular block DS 270 may specify any "popular" sets of redundant data blocks that are part of a non-THN sequence of redundant blocks that have not been deduplicated on the storage devices. In some embodiments, "popular" sets of redundant data blocks that did not meet the predetermined deduplication requirement for the storage devices are selected by the cache layer for deduplication in the cache memory 225. As such, the popular block DS 270 specifies sets of redundant data blocks selected for deduplication in the cache memory 225. In these embodiments, sets of redundant data blocks selected for deduplication in the cache memory 225 are also selected for deduplication on the storage devices (based on the selection of the sets of redundant data blocks for deduplication in cache memory), described below in relation to steps 1740 and 1745.

At step 1715, for the data blocks (referred to as "new data blocks") received since the just previous time interval expired and when the deduplication process was last initiated, the method 1700 identifies all new data blocks that are redundant with any data blocks (referred to as "previous data blocks") previously stored on the storage devices. In some embodiments, the new data blocks comprises all data blocks received since the last time interval expired and the previous data blocks comprises all other data blocks stored on the storage devices. The method may do so, for example, using the fingerprint DS 245 to identify any new data blocks that have a fingerprint matching a fingerprint of any previous data block.

If matching fingerprints are found between a new data block and a previous data block (comprising a set of new and previous data blocks), the method may also perform a verification process by retrieving the data of the new and previous data blocks and comparing the data byte by byte to verify that the data content of the new and previous data blocks actually match.

For each set of new and previous data blocks determined to have matching data content, the method produces and stores (at 1720) a new sequence entry 1101 to the deduplication DS 250 representing the set of new and previous data blocks (which comprises a new set of redundant blocks). As shown in the example of FIG. 11, a sequence entry 1101 comprises data fields describing the sequence, such as data fields for a content identifier 1105, sequence size 1115, storage system addresses 1120, reference count 1130, THN indicator 1135, sequence deduplication indicator 1140, set deduplication indicator(s) 1145, or any combination of these. The content identifier 1105 may comprise a content identifier 1105 retrieved from the fingerprint DS 245 for either the new or previous data block since they will be equal in value. The sequence size 1115 may be set to equal one since the sequence comprises one set of redundant blocks (the new and previous data blocks). The storage system addresses 1120 may comprise the storage system addresses of the new and previous data blocks. The THN indicator 1135 may indicate it is a non-THN sequence of redundant blocks. The sequence deduplication indicator 1140 may indicate the sequence has not been deduplicated. In some embodiments, the set deduplication indicator(s) 1145 are not used for offline deduplication.

The method 1700 then examines (at 1725) all the new sequence entries 1101 produced and stored to the deduplication DS 250 to merge zero or more new sequence entries 1101 to produce zero or more new THN entries 1101. A THN entry 1101 represents a THN sequence of redundant blocks comprising a first THN sequence of blocks that matches in data content a second THN sequence of blocks. Note that each THN sequence of blocks comprises a sequence of THN or more data blocks having sequential/consecutive storage system addresses. As such, the method may determine that THN or more new sets of redundant blocks may be merged to form a THN sequence of redundant blocks by comparing the storage system addresses of the new sets of redundant blocks. For example, if the corresponding storage system addresses of two or more new sets of redundant blocks are sequential/consecutive, the two or more new sets of redundant blocks may be merged into a THN sequence of redundant blocks. If so, the corresponding two or more new sequence entries 1101 may be merged into a single new THN entry 1101 in the deduplication DS 250.

For each new THN entry 1101 produced in the deduplication DS 250, the method 1700 deduplicates (at 1730), on the storage devices, the THN sequence of redundant blocks represented by the new THN entry 1101. The new THN entry 1101 is also updated/modified (at 1730) in the deduplication DS 250. For example, the content identifier 1105 may be updated to comprise a content identifier 1105 for the THN sequence of redundant blocks, the sequence size 1115 may be updated to equal the number of sets of redundant blocks in the sequence (being THN or greater), the storage system addresses 1120 may be updated to comprise the storage system addresses of the THN sequence of redundant blocks, the THN indicator 1135 may indicate it is a THN sequence of redundant blocks, and the sequence deduplication indicator 1140 may indicate the sequence has been deduplicated.

For each new data block that is deduplicated in a THN sequence of redundant blocks at step 1730, the method 1700 updates/modifies (at 1735) the storage device mapping DS 255 to reflect the deduplication on the storage devices and stores a block identifier for the deduplicated data block on a deduplicate in cache DS 260. For example, the method may store a storage system address for each new data block that has been deduplicated in a THN sequence of redundant blocks at step 1730.

Each new sequence entry 1101 that has not been merged into a new THN entry 1101 at step 1725 is thus considered a new non-THN entry 1101 that represents a non-THN sequence of redundant blocks (comprising a set of redundant blocks). The method 1700 examines (at 1740) each new non-THN entry 1101 and the popular block DS 270 (received at step 1710) to determine zero or more "popular" non-THN entries 1101. A "popular" non-THN entry 1101 represents a "popular" non-THN sequence of redundant blocks comprising a data block specified on the popular block DS 270. For example, the method may compare the storage system addresses of popular data blocks listed in the popular block DS 270 with storage system addresses of the data blocks represented by each new non-THN entry 1101 to determine if any of the storage system addresses match and thus determine any "popular" non-THN entries 1101. Although the popular block DS 270 already specifies "popular" sets of redundant data blocks that are part of a non-THN sequence of redundant blocks that have not been deduplicated on the storage devices (as discussed below in steps 1920-1930 of method 1900), the method 1700 may reconfirm this at step 1740 in case modifications were made, a popular set of redundant data blocks has been deleted, etc.

The method 1700 deduplicates on the storage devices (at 1745) each popular non-THN sequence of redundant blocks (comprising a set of redundant blocks) represented by a popular non-THN entry 1101 determined at step 1740. Each popular non-THN entry 1101 is also updated/modified (at 1745) in the deduplication DS 250 to reflect the deduplication. For example, the sequence deduplication indicator 1140 may indicate the sequence has been deduplicated.

For each new data block that is deduplicated in a popular non-THN sequence of redundant blocks at step 1745, the method 1700 updates/modifies (at 1750) the storage device mapping DS 255 to reflect the deduplication on the storage devices and stores a block identifier for the deduplicated data block on a deduplicate in cache DS 260. For example, the method may store a storage system address for each new data block that has been deduplicated in a non-THN sequence of redundant blocks at step 1745.

The method sends (at 1755) the deduplicate in cache DS 255 to the caching layer 280. In some embodiments, data blocks that have been deduplicated on the storage devices are also deduplicated in cache memory. The deduplicate in cache DS 255 may be used by the caching layer 280 to identify which data blocks to deduplicate in cache memory (as discussed below). Since the deduplicate in cache DS 255 specifies popular non-THN sequences of redundant blocks that have been deduplicated on the storage devices, the popular non-THN sequences of redundant blocks are also deduplicated in cache memory. The method 1700 then ends.

As such, the method 1700 provides offline deduplication of THN sequences of redundant blocks on the storage devices. The method 1700 also provides offline deduplication of non-THN sequences of redundant blocks on the storage devices that comprise data blocks determined to be "popular" in cache memory.

C. Offline Pre-processing Routine of Deduplication on Cache Memory

FIG. 18 is a flowchart of a method 1800 for an offline pre-processing routine for deduplication of data blocks on cache memory 225 of a storage system 120. In some embodiments, some of the steps of method 1800 are performed by the caching layer 280 in conjunction with other layers of the storage operating system 300. The order and number of steps of the method 1800 are for illustrative purposes only and, in other embodiments, a different order and/or number of steps are used.

The method 1800 begins when a new write request with new data blocks to be stored to the storage devices is received (at 1805). The received write request will specify or indicate a storage system address for each data block indicating the address location where the data block is to be stored on the storage devices. Typically, copies of new data blocks of new write requests are stored to the cache memory 225 upon being received. As such, for each received data block, the method 1800 stores (at 1810) a copy of the data block 1410 to a cache address in cache memory 225 and produces and stores an associated metadata header 1405 to another cache address in cache memory 225. The associated metadata header 1405 may store metadata describing the data block 1410, such as block access history, storage system address information, and a pointer to the data block 1410 in cache memory, etc.

Note that the new data blocks of the new write request will also be concurrently processed by the deduplication and storage layers. For example, the deduplication and storage layers may perform the methods 1600 and 1700 of FIGS. 16 and 17A-B to store the new data blocks to the storage devices and/or perform deduplication processing of the new data blocks on the storage devices. After a new data block is stored to the storage devices and/or has completed deduplication processing on the storage devices, the corresponding copy of the new data block 1410 and its associated metadata header 1405 in the cache memory 225 is transferred (at 1815) to the recycle queue 1415. The method 1800 executes a cache replacement policy to examine (at 1820) data blocks 1410 in the recycle queue 1415 and selects zero or more data blocks for replacement/removal from cache memory 225.

For each data block 1410 in the recycle queue 1415 selected for replacement/removal from cache memory 225 in step 1820, the method 1800 examines (at 1825) the deduplication DS 250 to determine zero or more data blocks 1410 that are part of a non-THN sequence of redundant blocks that has not been deduplicated on the storage devices (referred to as a "target" data block). The method 1800 may do so by examining the deduplication DS 250 to determine if a selected data block 1410 is represented by a sequence entry 1101 (referred to as a "matching" sequence entry 1101) in the deduplication DS 250. The method 1800 may do so using any of the various data fields of the sequence entries 1101 as an index into the deduplication DS 250, whereby any of the data fields may be searched for a particular value to locate a matching sequence entry 1101 (if any).

For example, the storage system address of the data block 1410 (stored in the associated metadata header 1405) may be used as an index to search the storage system address 1120 data field to locate any matching sequence entries 1101. As another example, a content identifier/fingerprint of the data block may be produced and used as an index to search the content identifier 1105 data field to locate any matching sequence entries 1101. If a matching sequence entry 1101 is found, the method may then examine the THN indicator 1135 to determine if the matching sequence entry 1101 represents a non-THN sequence of redundant blocks and examine the sequence deduplication indicator 1140 determine if the matching sequence entry 1101 represents a sequence that has not been deduplicated on the storage devices. If both these conditions are determined to be true, the method determines (at 1825) that the data block is a "target" data block that is part of a non-THN sequence of redundant blocks has not been deduplicated on the storage devices.

For each target data block, the method 1800 stores (at 1830) its associated metadata header 1410 to the history queue 1420 and deletes the data block 1410 from cache memory 225. For all other data blocks 1410 selected for replacement/removal from cache memory 225 in step 1820, the method 1800 deletes (at 1830) the data block 1410 and its associated metadata header 1410 from cache memory 225. As such, the method 1800 only retains (in the history queue 1420) the associated metadata header 1410 for target data blocks that are part of a non-THN sequence of redundant blocks that has not been deduplicated, since these are the types of data blocks targeted for further deduplication processing. Data blocks that are part of a THN sequence of redundant blocks or are part of a non-THN sequence that has already been deduplicated would not require further deduplication processing. The method 1800 then ends.

D. Offline Deduplication in Cache Memory

FIG. 19 is a flowchart of a method 1900 for offline deduplication of data blocks on cache memory 225 of a storage system 120. In some embodiments, some of the steps of method 1900 are performed by the caching layer 280 in conjunction with other layers of the storage operating system 300. The order and number of steps of the method 1900 are for illustrative purposes only and, in other embodiments, a different order and/or number of steps are used. Note that the method 1900 assumes that the cache memory 225 comprises redundant blocks that have not been deduplicated on the storage devices.

Since the method 1900 is an offline process, the method 1900 is performed at predetermined time intervals. As such, the method 1900 begins by determining (at 1905) if a predetermined time interval has expired. If not, the method 1900 continues at step 1905. If the predetermined time interval has expired, the method 1900 continues at step 1910.

At step 1910, the method receives a deduplicate in cache DS 260 from the storage layer 380. The deduplicate in cache DS 260 may specify block identifiers (e.g., storage system addresses) for all new sets of redundant blocks that have been deduplicated on the storage devices (using the method 1700) since the just previous time interval expired. In some embodiments, data blocks that have been deduplicated on the storage devices are also deduplicated in cache memory. The duplicate in cache DS 255 may be used by the method 1900 to identify which data blocks to deduplicate in cache memory.

The method 1900 deduplicates in cache memory (at 1915) each new set of redundant blocks specified in the deduplicate in cache DS 260 if the specified data blocks are currently stored in cache memory 225 (including the recycling queue). As described above in Section V (Part D), when deduplicating data blocks in cache memory 225, the method 1900 may examine the deduplicate in cache DS 260 to determine if any of the specified data blocks are stored in the cache memory. If so, the method 1900 deduplicates the data blocks in cache memory whereby only a single instance of redundant blocks are stored in the cache memory while any redundant blocks are deduplicated and deleted or not stored in the cache memory. The method 1900 also modifies (at 1915) the cache mapping DS 265 to reflect the deduplication, whereby the storage system addresses of each redundant block in the set maps to the same metadata header associated with the stored data block, which then points to the stored data block in cache memory.

The deduplicate in cache DS 260 may specify new sets of redundant blocks that may be part of a THN sequence of redundant blocks. As such, the method 1900 may deduplicate in cache memory (at 1915) new sets of redundant blocks that are part of a THN sequence of redundant blocks. In some embodiments, the deduplicate in cache DS 260 also specifies one or more new sets of redundant blocks that are part of a non-THN sequence of redundant blocks that have been identified as popular blocks. In these embodiments, the method 1900 may deduplicate in cache memory (at 1915) new sets of redundant blocks that are part of a non-THN sequence of redundant blocks that have been identified as popular blocks.

In steps 1920-1930, the method 1900 then determines a combined number of accesses for each set of redundant blocks in cache memory that are also part of a non-THN sequence of redundant blocks that have not been deduplicated on the storage devices. If a set of redundant blocks in cache memory 225 is determined to have a combined number of accesses being equal to or greater than a predetermined threshold number of accesses, the set of redundant blocks is determined to be "popular" and the set of redundant blocks are added to the popular block DS 270.

At step 1920, the method 1900 identifies all sets of redundant blocks in the cache memory that are also part of a non-THN sequence of redundant blocks that have not been deduplicated on the storage devices (referred to as "target" sets of redundant blocks). These target sets will comprise data blocks that are redundant and have not been deduplicated in cache memory, and as such are targeted for further deduplication processing in cache memory. In some embodiments, target sets of redundant blocks that are determined to be "popular" are deduplicated in cache memory and the storage devices.

The method may do so by examining the deduplication DS 250 to locate all sets of redundant blocks in cache memory that are also represented in non-THN sequence entries 1101 that indicate they are not deduplicated on the storage devices. For example, the method may determine all sequence entries 1101 that represent sets of redundant blocks in cache memory (e.g., by using the storage system addresses listed in the storage system addresses 1120 of the entries 1101) and examine the THN indicator 1135 of the entries 1101 to determine all non-THN sequence entries 1101. The method may then examine the sequence deduplication indicators 1140 to determine all non-THN sequence entries 1101 that have not been deduplicated on the storage devices. All sets of redundant blocks in cache memory represented by non-THN sequence entries 1101 that have not been deduplicated are referred to as "target" sets of redundant blocks.

In some embodiments, a non-THN sequence entry 1101 representing a set of redundant blocks in cache memory may also specify one or more additional data blocks that also contain the same data content as the set of redundant blocks in cache memory. These additional data blocks may comprise data blocks that were previously stored to cache memory but were removed from cache by the cache replacement policy. As discussed above in relation to FIG. 18, the method 1800 (at step 1830) will have stored the associated metadata headers 1410 of these additional data blocks to the history queue 1420 prior to their removal from the cache memory. In these embodiments, these additional data blocks are also added to the "target" sets of redundant blocks.

The method 1900 then identifies (at 1925) zero or more target sets of redundant blocks that are "popular" based on the number of accesses for the target set of redundant blocks while the data blocks are stored (currently and/or previously) in cache memory. In some embodiments, a target set of redundant blocks is determined to be "popular" based on the combined total number of accesses for the data blocks in the target set while the data blocks are stored (currently and/or previously) in cache memory. The combined total number of accesses may be based on the individual number of accesses for each data block in the target set.

In these embodiments, the method may determine a combined number of accesses for each target set of redundant blocks by determining an individual number of accesses for each data block in the target set and combining (e.g., adding/summing) the individual number of accesses. The method may do so by locating the metadata headers 1405 associated with each data block in the target set (e.g., by using their storage system addresses or cache addresses to locate the metadata headers 1405). For data blocks in the target set that are currently stored to cache memory, the associated metadata headers 1405 may be located anywhere in the cache memory, including the recycle queue 1415. In some embodiments, for data blocks in the target set that were previously stored to cache memory but were removed (by the cache replacement policy), the associated metadata headers 1405 may be located in the history queue 1420.

The metadata header 1405 stores a block access history that specifies a total number of times/occurrences that the associated data block 1410 was accessed while stored in the cache memory 225 (referred to as the "number of accesses"). The method may determine the individual number of accesses for each data block in the target set using the block access history, and combine (e.g., add/sum) the individual number of accesses to produce a total number of accesses for the target set. If the combined number of accesses is equal to or greater than a predetermined threshold number of accesses, the method identifies the target set as "popular." In some embodiments, a target set of redundant blocks, currently stored to cache memory or previously stored to cache memory, having a combined total number of accesses, while stored in cache memory, that is equal to or greater than a predetermined threshold number of accesses are each identified as "popular" blocks.

For example, a target set of redundant may comprise data blocks B1, B2, and B3, each comprising the matching data content, the target set being part of a non-THN sequence of redundant blocks that have not been deduplicated on the storage devices. The metadata header for B1 is located in the recycle queue and specifies a number of accesses of 3. The metadata header for B2 is also located in the recycle queue and specifies a number of accesses of 5. The metadata header for B3 is located in the history queue and specifies a number of accesses of 6 (indicating that B3 was previously stored to cache memory but has been removed). Thus, the combined number of accesses is 14. If the predetermined threshold number of accesses is equal to 12, each block B1, B2, and B3 in the target set is identified as a "popular" block. Note that although data block B3 is no longer stored in cache memory, the block access history of B3 is still considered relevant since it contains the same data content as data blocks B1 and B2. As such, the number of accesses of B3 is included in the combined number of accesses for the target set.

The method 1900 then stores block identifiers (at 1930) to the popular block DS 270 for the data blocks of all target sets of redundant blocks identified as popular in step 1925, and sends the popular block DS 270 to the storage layer 380 for further processing. In some embodiments, the popular block DS 270 specifies sets of redundant data blocks that were identified as "popular" blocks by the caching layer 280 and also did not meet the predetermined deduplication requirement for the storage devices. In some embodiments, "popular" sets of redundant data blocks that did not meet the predetermined deduplication requirement for the storage devices are selected by the cache layer for deduplication in the cache memory 225. As such, the popular block DS 270 specifies sets of redundant data blocks selected for deduplication in the cache memory 225. In these embodiments, sets of redundant data blocks selected for deduplication in the cache memory 225 are also selected for deduplication on the storage devices (based on the selection of the sets of redundant data blocks for deduplication in cache memory).

Sets of redundant blocks selected for deduplication in cache memory (as specified in the popular block DS 270) are later deduplicated on the storage devices by the deduplication and storage layers using the popular block DS 270. This may be referred to as "cache initiated deduplication on storage devices" (since the deduplication of sets of redundant data blocks on the storage devices is based on the selection of the sets of redundant data blocks for deduplication in cache memory). In turn, any sets of redundant blocks that are deduplicated on the storage devices (as specified in the deduplicate in cache DS 260) are then deduplicated in cache memory by the cache layer using the deduplicate in cache DS 260. As such, the target sets of redundant blocks identified as popular in cache memory are eventually deduplicated on the storage devices as well as cache memory. The method 1900 then ends.

VIII. ONLINE DEDUPLICATION ON STORAGE DEVICES AND CACHE MEMORY BASED ON BLOCK POPULARITY

Figure 20:
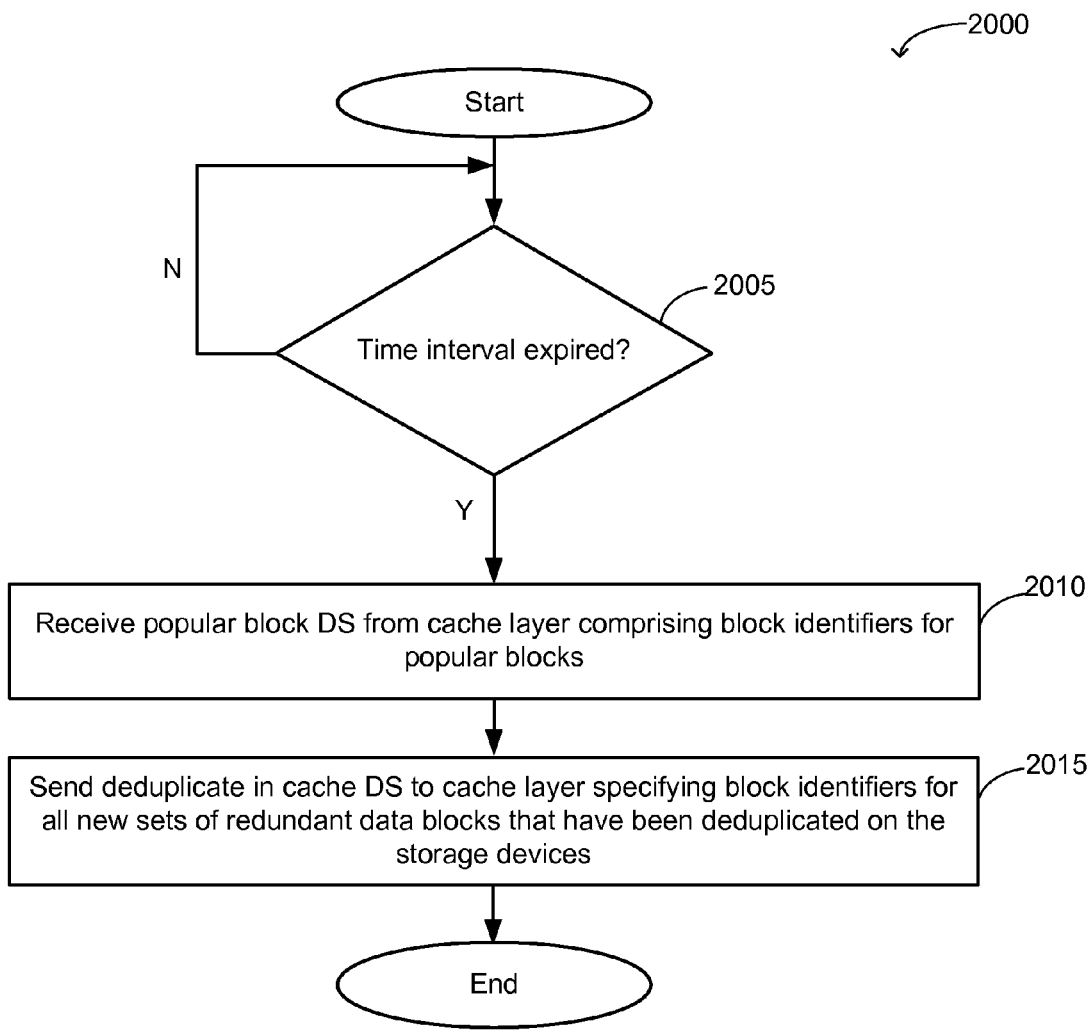
FIG. 20 is a flowchart of a method for an online background routine for deduplication of data blocks on storage devices.
Figure 21A:
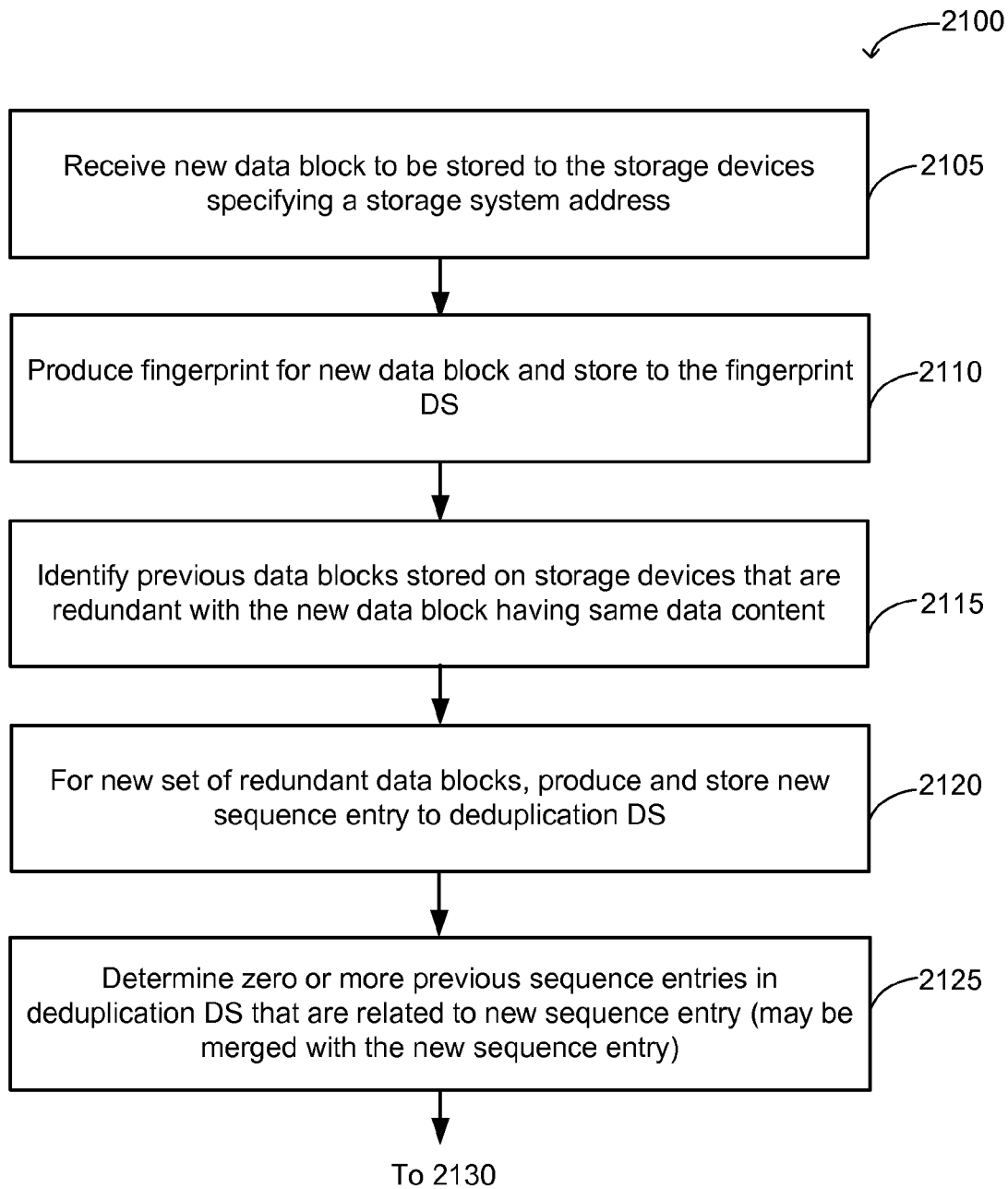
FIGS. 21A-B show a flowchart of a method for online deduplication of data blocks on storage devices.
Figure 21B:
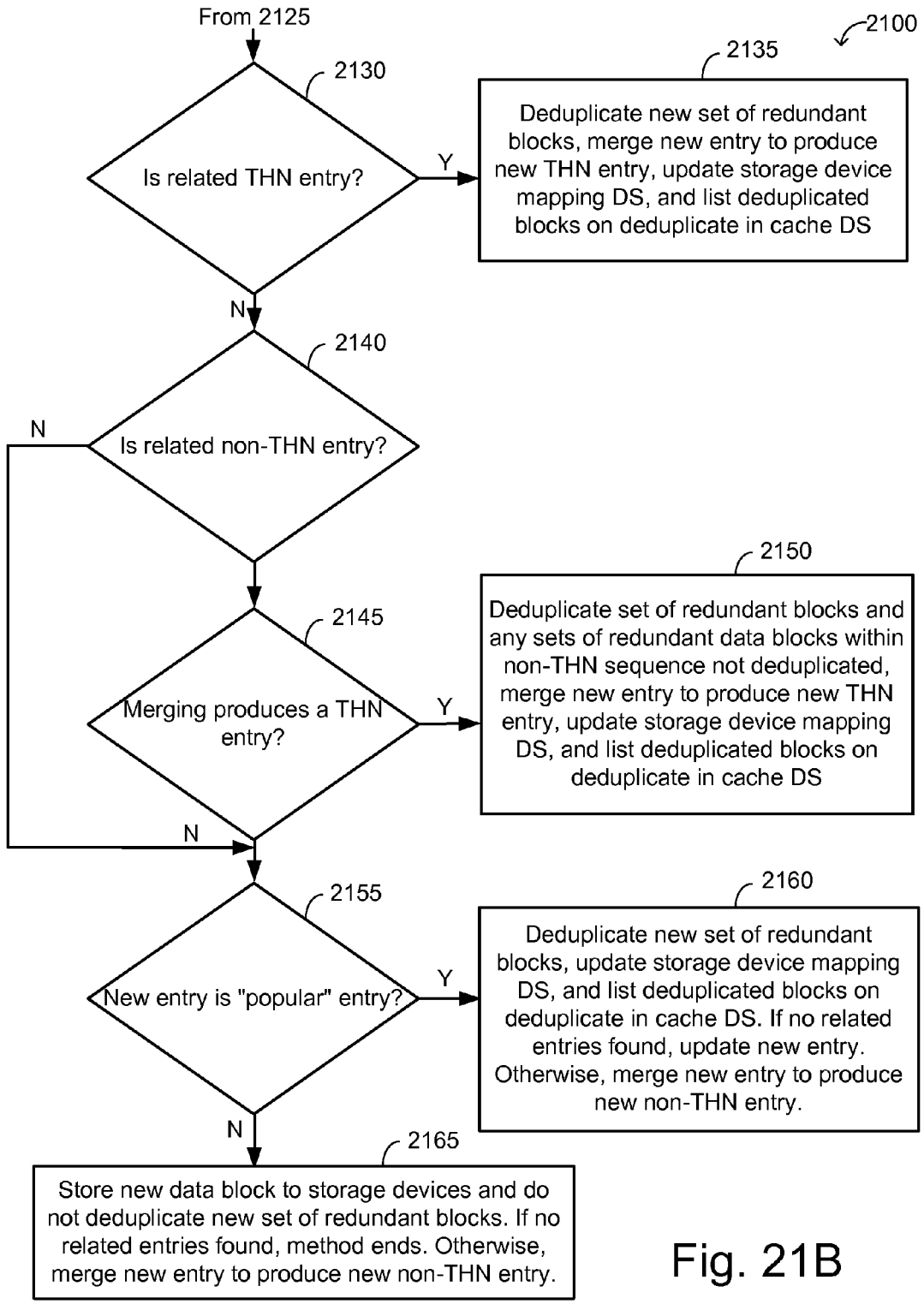
Figure 22:
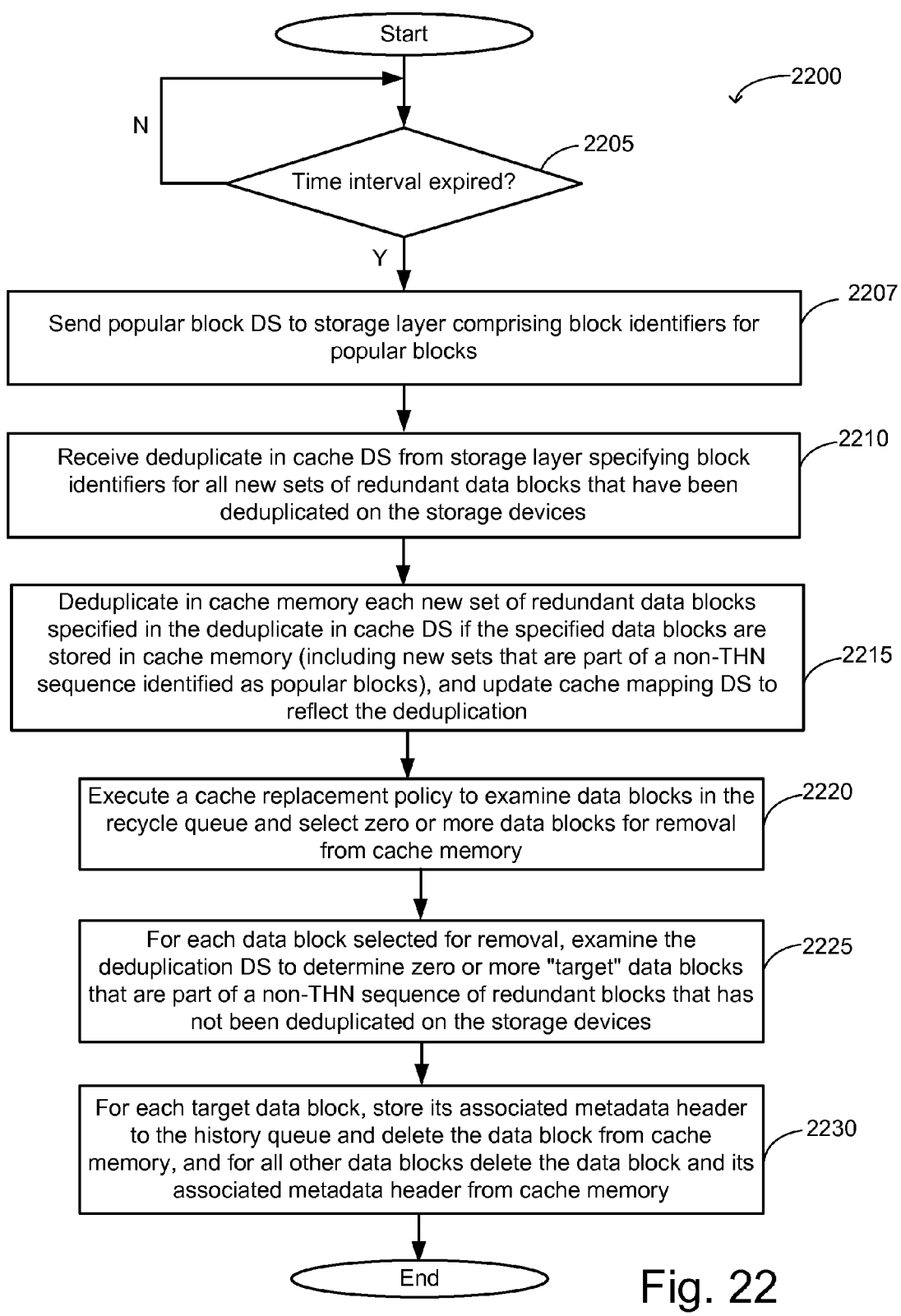
FIG. 22 is a flowchart of a method for an online background routine for deduplication of data blocks on cache memory.
Figure 23:
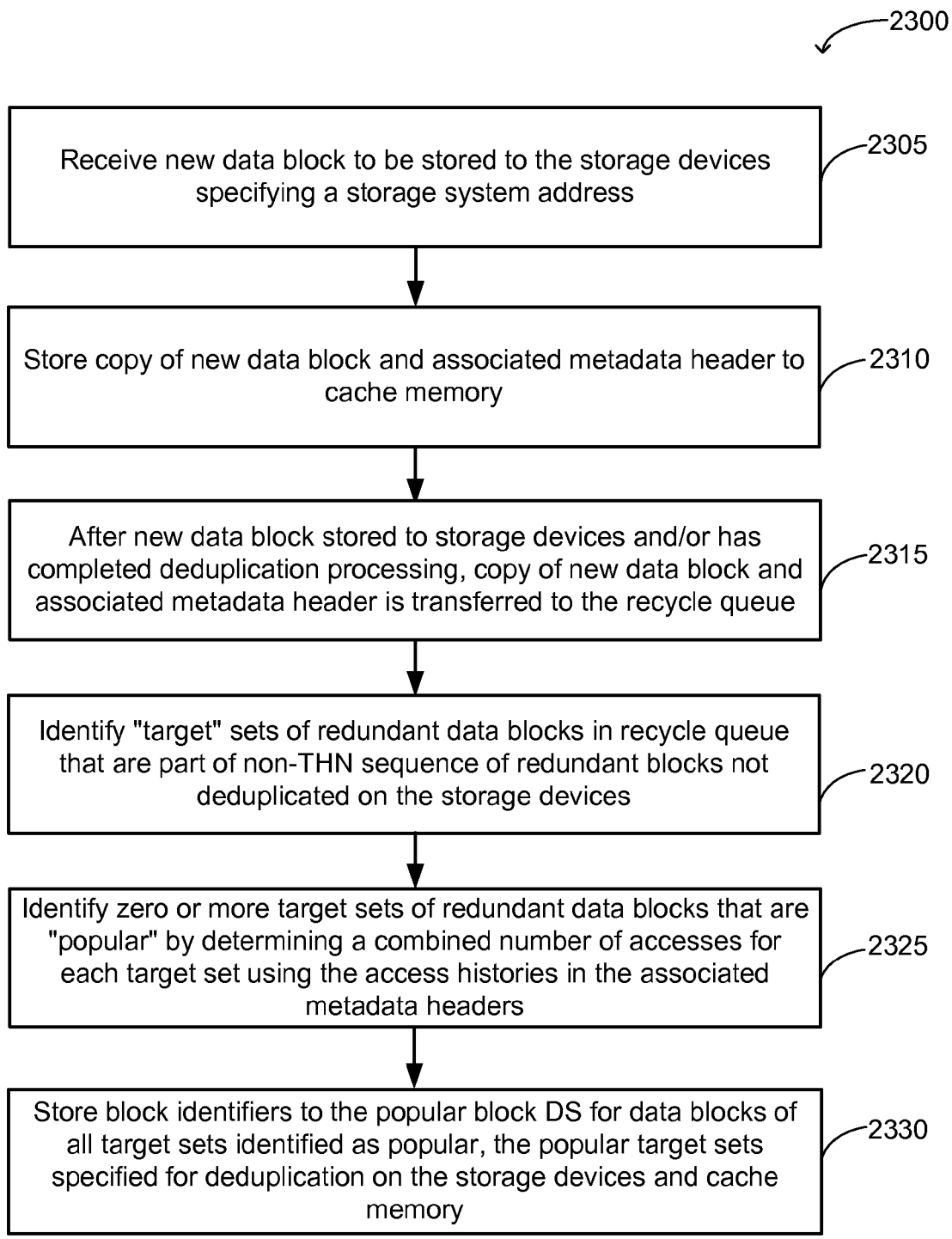
FIG. 23 is a flowchart of a method for online deduplication of data blocks on cache memory.

FIGS. 20-23 show flowcharts of methods for online deduplication on storage devices and cache memory. FIGS. 20 and 21A-B show flowcharts of methods for online deduplication performed on the storage devices (e.g., by the deduplication layer 275 and the storage layer 380). FIGS. 22 and 23 show flowcharts of methods for online deduplication performed on the cache memory (e.g., by the caching layer 280). Although interrelated, each flowchart of FIGS. 20-23 may be executed concurrently. In some embodiments, some or all of the steps of the methods shown in FIGS. 20-23 are implemented by software and/or hardware. Some of the steps of the methods shown in FIGS. 20-23 are similar to some of the steps of the methods shown in FIGS. 16-19 (discussed in detail in Section VII) and are not discussed in detail here.

A. Online Background Routine of Deduplication on Storage Devices

Since online deduplication on the storage devices is performed whenever a new write request is received, a background routine is regularly performed to ensure availability of various data and data structures (DSs) needed for the online deduplication process. For example, one or more data structures (DSs) may be sent between the deduplication and storage layers and the caching layer during the background routine. To reduce overhead incurred in such interactions, the background routine may be performed at predetermined time intervals.

FIG. 20 is a flowchart of a method 2000 for an online background routine for deduplication of data blocks on storage devices 125 of a storage system 120. In some embodiments, some of the steps of method 2000 are performed by the deduplication layer 275 and the storage layer 380 in conjunction with other layers of the storage operating system 300.

The order and number of steps of the method 2000 are for illustrative purposes only and, in other embodiments, a different order and/or number of steps are used.

The method 2000 begins by determining (at 2005) if a predetermined time interval has expired. If not, the method 2000 continues at step 2005. If the predetermined time interval has expired, the method 2000 continues at step 2010. At step 2010, the method receives a popular block DS 270 from the caching layer 280. The popular block DS 270 comprises block identifiers (e.g., storage system addresses) for data blocks identified as "popular" blocks by the caching layer 280. In some embodiments, the popular block DS 270 specifies sets of redundant data blocks that were identified as "popular" blocks by the caching layer 280 and also did not meet the predetermined deduplication requirement for the storage devices. Popular sets of redundant data blocks that did not meet the predetermined deduplication requirement for the storage devices are selected by the cache layer for deduplication in the cache memory 225. As such, the popular block DS 270 specifies sets of redundant data blocks selected for deduplication in the cache memory 225. In these embodiments, sets of redundant data blocks selected for deduplication in the cache memory 225 are also selected for deduplication on the storage devices.

The method sends (at 2015) a deduplicate in cache DS 255 to the caching layer 280 specifying block identifiers for all new sets of redundant blocks that have been deduplicated on the storage devices. In some embodiments, data blocks that have been deduplicated on the storage devices are listed on the deduplicate in cache DS 255 and also deduplicated in cache memory. The method 2000 then ends.

B. Online Deduplication on Storage Devices

FIGS. 21A-B show a flowchart of a method 2100 for online deduplication of data blocks on storage devices 125 of a storage system 120. In some embodiments, some of the steps of method 2100 are performed by the deduplication layer 275 and the storage layer 380 in conjunction with other layers of the storage operating system 300. The order and number of steps of the method 2100 are for illustrative purposes only and, in other embodiments, a different order and/or number of steps are used.

Since the method 2100 is an online process, the method 2100 is initiated and performed upon the storage operating system 300 receiving a write request comprising one or more new data blocks to be stored. The method 2100 may be performed for each new data block that is received. The method 2100 may be initiated and repeated for every new write request received. Also, since this is an online process, a received data block may be stored to a storage device after completing the deduplication process.

The method 2100 begins when a new data block to be stored to the storage devices is received (e.g., received in a new write request) at step 2105. The received write request will specify or indicate a storage system address for the new data block. The method 2100 then produces and stores (at 2110) a content identifier/fingerprint value for the new data block to the fingerprint DS 245. For example, the method 2100 may apply a checksum operation to the new data block to produce a checksum value comprising the content identifier value for the new data block. The method 2100 stores the content identifier/fingerprint value in the fingerprint DS 245 along with information describing the data block as an entry in the fingerprint DS 245.

At step 2115, the method 2100 identifies all data blocks previously stored on the storage devices (referred to as "previous data blocks") that are redundant with the new data block (have the same data content). The method may do so, for example, using the fingerprint DS 245 to identify any previous data blocks that have a fingerprint matching the fingerprint of the new data block. If matching fingerprints are found between the new data block and a previous data block (comprising a set of new and previous data blocks), the method may also perform a verification process by retrieving the data of the new and previous data blocks and comparing the data byte by byte to verify that the data content of the new and previous data blocks actually match.

If a set of new and previous data blocks are determined to have matching data content, the method produces and stores (at 2120) a new sequence entry 1101 to the deduplication DS 250 representing the set of new and previous data blocks (which comprises a new set of redundant blocks). As shown in the example of FIG. 11, a sequence entry 1101 comprises data fields describing the sequence, such as data fields for a content identifier 1105, sequence size 1115, storage system addresses 1120, reference count 1130, THN indicator 1135, sequence deduplication indicator 1140, set deduplication indicator(s) 1145, or any combination of these. The content identifier 1105 may comprise a content identifier 1105 retrieved from the fingerprint DS 245 for either the new or previous data block since they will be equal in value. The sequence size 1115 may be set to equal one since the sequence comprises one set of redundant blocks (the new and previous data blocks). The storage system addresses 1120 may comprise the storage system addresses of the new and previous data blocks. The THN indicator 1135 may indicate it is a non-THN sequence of redundant blocks. The sequence deduplication indicator 1140 may to indicate the sequence has not been deduplicated. The set deduplication indicator(s) 1145 may comprise one or more indicators 1145, each indicating whether a particular corresponding set of redundant blocks within the sequence has been deduplicated on the storage devices. Since, at this time, the sequence of redundant blocks comprises only a first set of redundant blocks, the set deduplication indicator(s) 1145 may comprise a first indicator 1145 that indicates the first set of redundant blocks has not been deduplicated on the storage devices.

The method 2100 then determines (at 2125) zero or more previous sequence entries 1101 (referred to as "related" sequence entries) in the deduplication DS 250 that are related to the new sequence entry 1101 produced at step at 2120. A related sequence entry 1101 may comprise a previous sequence entry 1101 with which the new sequence entry 1101 can be merged. For example, a related sequence entry may comprise storage system addresses that include or are sequential/consecutive with the corresponding storage system addresses of the new sequence entry. The method 2100 may identify related sequence entries 1101 in the deduplication DS 250 that specify storage system addresses 1120 that encompass or are sequential/consecutive with (just before or just after) the corresponding storage system addresses of the new sequence entry.

In some embodiments, a related sequence entry may comprise starting and ending storage system addresses that encompass the corresponding storage system addresses of the new sequence entry, may comprise starting storage system addresses that are one more (+1) than the corresponding storage system addresses of the new sequence entry, or may comprise ending storage system addresses that are one less (−1) than the corresponding storage system addresses of the new sequence entry. To illustrate, the new sequence entry represents a set of redundant blocks comprising a new block and a previous blocks, each block having different storage system address. Also, a related sequence entry represents sequence of redundant blocks comprising a first sequence of blocks that matches (in data content) a second sequence of blocks, each sequence of blocks having different starting and ending storage system addresses. As an example, assume the new data block corresponds to the first sequence of blocks and the previous data block corresponds to the second sequence of blocks. In some embodiments, for a related sequence entry, the first sequence of blocks may comprise starting and ending storage system addresses that encompass the storage system address of the new data block, comprise a starting storage system address is one more (+1) than the storage system address of the new data block, or comprises an ending storage system address that is one less (−1) than the storage system address of the new data block. In addition, for the related sequence entry, the second sequence of blocks may comprise starting and ending storage system addresses that encompass the storage system address of the previous data block, comprise a starting storage system address is one more (+1) than the storage system address of the previous data block, or comprises an ending storage system address that is one less (−1) than the storage system address of the previous data block. Both of these conditions exist for a previous sequence entry to be related to the new sequence entry.

The result of step 2125 produces either a related THN entry, a related non-THN entry, or no related sequence entries. The method then determines (at 2130) if the related sequence entry is a THN entry. If not, the method continues at step 2140. If so, the method deduplicates on the storage devices (at 2135) the set of redundant blocks represented by the new sequence entry, merges the new sequence entry with the THN entry 1101 to produce a single new THN entry 1101 in the deduplication DS 250, updates/modifies the storage device mapping DS 255 to reflect the deduplication on the storage devices, and stores block identifiers for the deduplicated data blocks on a deduplicate in cache DS 260. For example, the method may deduplicate on the storage devices the new data block instead of storing the new data block on the storage devices. The new THN entry may be updated/modified so that the content identifier 1105 incorporates the content identifier of the new data block, the sequence size 1115 may be increased by one, and the storage system addresses 1120 may incorporate the storage system addresses of the new and previous data blocks. The storage device mapping DS 255 may be updated to reflect the deduplication of the new data block on the storage devices and block identifiers for the new and previous data blocks may be stored to the deduplicate in cache DS 260. The method then ends.

At step 2140, the method determines if the related sequence entry is a non-THN entry. If not, no related entries were found and the method continues at step 2155. If so, the method determines (at 2145) if merging the new sequence entry with the related non-THN entry produces a THN entry. If not, the method continues at step 2155. If so, the method deduplicates on the storage devices (at 2150) the new set of redundant blocks represented by the new sequence entry and any sets of redundant blocks within the non-THN sequence of redundant blocks represented by the related non-THN entry that have not already been deduplicated. The method also merges the new sequence entry with the non-THN entry 1101 to produce a single new THN entry 1101 in the deduplication DS 250, updates/modifies the storage device mapping DS 255 to reflect the deduplication on the storage devices, and stores block identifiers for the deduplicated data blocks on the deduplicate in cache DS 260.

For example, the method may deduplicate on the storage devices the new data block instead of storing the new data block on the storage devices. The method may also determine any non-deduplicated sets of redundant blocks within the non-THN sequence of redundant blocks represented by the related non-THN entry by examining the set deduplication indicator(s) 1145 for the related non-THN entry. The method may deduplicate each such non-deduplicated set of redundant blocks by deleting, on the storage devices, one or more data blocks in the set of redundant blocks. The new THN entry may be updated/modified so that the content identifier 1105 incorporates the content identifier of the new data block, the sequence size 1115 may be increased by one, the storage system addresses 1120 may incorporate the storage system addresses of the new and previous data blocks, the THN indicator 1135 may indicate it is now a THN sequence of redundant blocks, and the sequence deduplication indicator 1140 may indicate the entire sequence has been deduplicated. In some embodiments, if the sequence deduplication indicator 1140 indicates that the entire sequence of redundant blocks is deduplicated, all of the set deduplication indicator(s) 1145 are also automatically set to indicate that all corresponding sets of redundant blocks are deduplicated. The storage device mapping DS 255 may be updated to reflect the deduplication of all data blocks deduplicated on the storage devices and block identifiers for all deduplicated data blocks may be stored to the deduplicate in cache DS 260. The method then ends.

If the method reaches step 2155, this indicates that either no related entries were found (at step 2140) or that merging the new sequence entry with a related non-THN entry did not produce a THN entry (at step 2145). In either case, the method determines (at 2155) whether the new sequence entry 1101 comprises a "popular" entry. A "popular" entry 1101 represents a "popular" sequence of redundant blocks comprising a data block specified on the popular block DS 270. The method 1700 may determine such by examining the popular block DS 270 and comparing the storage system addresses of popular data blocks listed in the popular block DS 270 with storage system addresses of the new and previous data blocks represented by the new sequence entry to determine if any of the storage system addresses match.

If not, the method continues at step 2165. If so, the method deduplicates on the storage devices (at 2160) the new set of redundant blocks represented by the new sequence entry. For example, the method may deduplicate on the storage devices the new data block instead of storing the new data block on the storage devices. At step 2160, if the method reached step 2155 from step 2140 (no related entries were found), the method also updates the new sequence entry in the deduplication DS 250 (so that the sequence deduplication indicator 1140 may indicate the sequence has been deduplicated), updates the storage device mapping DS 255 to reflect the deduplication on the storage devices, and stores block identifiers for the deduplicated data blocks on the deduplicate in cache DS 260.

At step 2160, if the method reached step 2155 from step 2145 (merging the new sequence entry with a related non-THN entry did not produce a THN entry), the method also merges the new sequence entry with the non-THN entry 1101 to produce a single new non-THN entry 1101 in the deduplication DS 250, updates/modifies the storage device mapping DS 255 to reflect the deduplication on the storage devices, and stores block identifiers for the deduplicated data blocks on the deduplicate in cache DS 260. The new non-THN entry may be updated/modified so that the content identifier 1105 incorporates the content identifier of the new data block, the sequence size 1115 may be increased by one, the storage system addresses 1120 may incorporate the storage system addresses of the new and previous data blocks, and a set deduplication indicator 1145 corresponding to the new set of redundant blocks represented by the new sequence entry may indicate that the new set of redundant blocks has been deduplicated. The method then ends.

If the method determines (at 2155—No) that the new sequence entry 1101 does not comprise a "popular" entry, the method then stores (at 2165) the new data block to the storage devices 125 (according to the received storage system address for the data block) and does not deduplicate the new set of redundant blocks represented by the new sequence entry 1101. At step 2165, if the method reached step 2155 from step 2140 (no related entries were found), the method does not require further steps since the new sequence entry does not need updating and no deduplication has been performed. At step 2165, if the method reached step 2155 from step 2145 (merging the new sequence entry with a related non-THN entry did not produce a THN entry), the method also merges the new sequence entry with the non-THN entry 1101 to produce a single new non-THN entry 1101 in the deduplication DS 250. The new non-THN entry may be updated/modified so that the content identifier 1105 incorporates the content identifier of the new data block, the sequence size 1115 may be increased by one, and the storage system addresses 1120 may incorporate the storage system addresses of the new and previous data blocks. The method then ends.

C. Online Background Routine of Deduplication on Cache Memory

Since online deduplication on the cache memory is performed whenever a new write request is received, a background routine is regularly performed to ensure availability of various data and data structures (DSs) needed for the online deduplication process. For example, one or more data structures (DSs) may be sent between the caching layer and the deduplication and storage layers during the background routine. To reduce overhead incurred in such interactions, the background routine may be performed at predetermined time intervals.

FIG. 22 is a flowchart of a method 2200 for an online background routine for deduplication of data blocks on cache memory 225 of a storage system 120. In some embodiments, some of the steps of method 2200 are performed by the caching layer 280 in conjunction with other layers of the storage operating system 300. The order and number of steps of the method 2200 are for illustrative purposes only and, in other embodiments, a different order and/or number of steps are used.

The method 2200 begins by determining (at 2205) if a predetermined time interval has expired. If not, the method 2200 continues at step 2205. If the predetermined time interval has expired, the method 2200 continues at step 2207. At step 2207, the method sends a popular block DS 270 to the storage layer 380 for further processing. The popular block DS 270 comprises block identifiers (e.g., storage system addresses) for data blocks identified as "popular" blocks by the caching layer 280.

The method receives (at 2210) a deduplicate in cache DS 255 from the storage layer 380 for all new sets of redundant blocks that have been deduplicated on the storage devices since the just previous time interval expired. The method 2200 deduplicates in cache memory (at 2215) each new set of redundant blocks specified in the deduplicate in cache DS 260 if the specified data block is currently stored in cache memory 225 (including the recycling queue) and modifies the cache mapping DS 265 to reflect the deduplication. Note that the deduplicate in cache DS 260 may specify/list new sets of redundant blocks that may be part of a THN or non-THN sequence of redundant blocks that have been identified as popular blocks. As such, the method 2200 may deduplicate in cache memory (at 2215) new sets of redundant blocks that are part of a THN sequence of redundant blocks or are part of a non-THN sequence of redundant blocks that have been identified as popular blocks.

The method 2200 also executes a cache replacement policy on regular intervals to examine (at 2220) data blocks 1410 in the recycle queue 1415 and selects zero or more data blocks for replacement/removal from cache memory 225. For each data block 1410 in the recycle queue 1415 selected for replacement/removal from cache memory 225 in step 2220, the method 2200 examines (at 2225) the deduplication DS 250 to determine zero or more data blocks 1410 that are part of a non-THN sequence of redundant blocks that has not been deduplicated on the storage devices (referred to as a "target" data block). For each target data block, the method 2200 stores (at 2230) its associated metadata header 1410 to the history queue 1420 and deletes the data block 1410 from cache memory 225. For all other data blocks 1410 selected for replacement/removal from cache memory 225 in step 2220, the method 2200 deletes (at 2230) the data block 1410 and its associated metadata header 1410 from cache memory 225. The method 2200 then ends.

D. Online Deduplication in Cache Memory

FIG. 23 is a flowchart of a method 2300 for online deduplication of data blocks on cache memory 225 of a storage system 120. In some embodiments, some of the steps of method 2300 are performed by the caching layer 280 in conjunction with other layers of the storage operating system 300. The order and number of steps of the method 2300 are for illustrative purposes only and, in other embodiments, a different order and/or number of steps are used. Note that the method 2300 assumes that the cache memory 225 comprises redundant blocks that have not been deduplicated on the storage devices.

Since the method 2300 is an online process, the method 2300 is initiated and performed upon the storage operating system 300 receiving a write request comprising one or more new data blocks to be stored. The method 2300 may be performed for each new data block that is received. The method 2300 may be initiated and repeated for every new write request received. Also, since this is an online process, a received data block may be stored to a storage device after completing the deduplication process.

The method 2300 begins when a new data block to be stored to the storage devices is received (e.g., received in a new write request) at step 2305. The received write request will specify or indicate a storage system address for the new data block. The method 2300 then stores (at 2310) a copy of the new data block 1410 to a cache address in cache memory 225 and produces and stores an associated metadata header 1405 to another cache address in cache memory 225. The associated metadata header 1405 may store metadata describing the data block 1410, such as block access history, storage system address information, and a pointer to the data block 1410 in cache memory, etc. Note that the new data blocks of the new write request will also be concurrently processed by the deduplication and storage layers. After a new data block is stored to the storage devices and/or has completed deduplication processing on the storage devices, the corresponding copy of the new data block 1410 and its associated metadata header 1405 in the cache memory 225 is transferred (at 2315) to the recycle queue 1415.

At step 2320, the method 2300 identifies all sets of redundant blocks in the recycle queue 1415 that are also part of a non-THN sequence of redundant blocks that have not been deduplicated on the storage devices (referred to as "target" sets of redundant blocks). The method 2300 may do so by examining the deduplication DS 250 to locate all sets of redundant blocks in the recycle queue 1415 that are also represented in non-THN sequence entries 1101 that indicate they are not deduplicated on the storage devices. All sets of redundant blocks in the recycle queue 1415 represented by non-THN sequence entries 1101 that have not been deduplicated are referred to as "target" sets of redundant blocks. In some embodiments, a non-THN sequence entry 1101 representing a set of redundant blocks in cache memory may also specify one or more additional data blocks that also contain the same data content as the set of redundant blocks in cache memory. These additional data blocks may comprise data blocks that were previously stored to cache memory but were removed from cache by the cache replacement policy. As discussed above, the associated metadata headers 1410 of these additional data blocks are stored to the history queue 1420 prior to their removal from the cache memory. In these embodiments, these additional data blocks are also added to the "target" sets of redundant blocks.

In some embodiments, the method 1900 for offline deduplication on cache memory, at step 1920, the method 1900 searches the entire cache memory (including the recycle queue) for target sets of redundant blocks. In some embodiments, in the method 2300 for online deduplication on cache memory, at step 2320, the method 2300 searches only the recycle queue of the cache memory for target sets of redundant blocks. Since the method 2300 is an online process, the method 2300 should execute quickly and in a faster time than the offline method 1900, where time is not as important a factor. The recycle queue will typically store the most recently received new data block as well as the more recently received new data blocks for further deduplication processing for cache memory.

The method 2300 then identifies (at 2325) zero or more target sets of redundant blocks that are "popular" based on the number of accesses for the target set of redundant blocks while the data blocks are stored (currently and/or previously) in cache memory. In some embodiments, a target set of redundant blocks is determined to be "popular" based on the combined total number of accesses for the data blocks in the target set while the data blocks are stored (currently and/or previously) in cache memory. The combined total number of accesses may be based on the individual number of accesses for each data block in the target set. The method may do so, for example, by determining a combined number of accesses for each target set of redundant blocks by determining an individual number of accesses for each data block in the target set and combining the individual number of accesses. The method may do so by locating the metadata headers 1405 associated with each data block in the target set. The associated metadata headers 1405 may be located anywhere in the cache memory, including the recycle queue 1415 and the history queue 1420 (for data blocks in the target set that were previously stored to cache memory but were removed). If the combined number of accesses is equal to or greater than a predetermined threshold number of accesses, the method identifies each data block in the target set as "popular."

The method 2300 then stores block identifiers (at 2330) to the popular block DS 270 for the data blocks of all target sets of redundant blocks identified as popular in step 2325. As discussed above, sets of redundant blocks identified as popular in cache memory (as specified in the popular block DS 270) are later deduplicated on the storage devices by the deduplication and storage layers. This may be referred to as "cache initiated deduplication on storage devices." In turn, any sets of redundant blocks that are deduplicated on the storage devices (as specified in the deduplicate in cache DS 260) are then deduplicated in cache memory by the cache layer. As such, the target sets of redundant blocks identified as popular in cache memory are eventually deduplicated on the storage devices and cache memory. The method 2300 then ends.

Various Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising instructions for performing various steps of the methods, techniques, or embodiments described herein. The computer readable medium may comprise a non-transitory computer readable medium. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The modules, algorithm, techniques, processes, or methods described in connection with embodiments disclosed herein may be embodied directly in computer hardware configured to perform the embodiments disclosed herein, in software executed by a processor, or in a combination of the two. In some embodiments, any software application, program, tool, module, or layer described herein may comprise an engine (such as a caching engine 280, deduplication engine 275, storage engine 380, etc.) comprising hardware, software, or a combination of the two configured to perform embodiments described herein. In general, functions of a software application, program, tool, module, or layer described herein may be embodied directly in hardware, or embodied as software executed by a processor, or embodied as a combination of the two.

A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

I claim:

1. A computer-implemented method, comprising:
storing one or more sets of redundant data blocks that have not met a predetermined deduplication requirement on one or more storage devices;
receiving a first data structure specifying at least a first set of redundant data blocks selected for deduplication in a cache memory; and
deduplicating the first set of redundant data blocks on the one or more storage devices based on the selection of the first set of redundant data blocks for deduplication in the cache memory.

2. The method of claim 1, wherein:
the first data structure specifies one or more sets of redundant data blocks determined to be popular in the cache memory, each popular set of redundant data blocks comprising data blocks having a combined number of accesses in the cache memory greater than a predetermined threshold number of accesses.

3. The method of claim 1, comprising:
determining, before deduplicating the first set of redundant data blocks on the one or more storage devices, that the first set of redundant data blocks did not meet the predetermined deduplication condition for the one or more storage devices and remains duplicated on the one or more storage devices.

4. The method of claim 1, comprising:
maintaining a deduplication data structure for storing information for sets of redundant data blocks on the one or more storage devices, the deduplication data structure comprising a plurality of entries, each entry representing one or more sets of redundant data blocks and indicating whether the one or more sets of redundant data blocks meets the predetermined deduplication requirement for the one or more storage devices.

5. The method of claim 4, wherein:
each entry in the deduplication data structure further indicates whether all of the one or more sets of redundant data blocks have been deduplicated on the one or more storage devices.

6. The method of claim 4, wherein:
a first entry represents a plurality of sets of redundant data blocks; and
the first entry further indicates individually, for each set of redundant data blocks, whether the set of redundant data blocks has been deduplicated on the one or more storage devices.

7. The method of claim 1, wherein:
each data block stored to the one or more storage devices comprises an associated storage system address;
a data block in a deduplicated set of redundant data blocks is stored to the one or more storage devices; and
the storage system address of each data block in the deduplicated set of redundant data blocks maps to the data block stored to the one or more storage devices.

8. A non-transitory computer readable medium having instructions stored thereon that when executed by a processor deduplicates data blocks, the non-transitory computer readable medium comprising instructions to:
store one or more sets of redundant data blocks that have not met a predetermined deduplication requirement on one or more storage devices;
receive a first data structure specifying at least a first set of redundant data blocks selected for deduplication in a cache memory; and
deduplicate the first set of redundant data blocks on the one or more storage devices based on the selection of the first set of redundant data blocks for deduplication in the cache memory.

9. The non-transitory computer readable medium of claim 8, wherein:
the first data structure specifies sets of redundant data blocks determined to be popular in the cache memory, each popular set of redundant data blocks comprising data blocks having a combined number of accesses in the cache memory greater than a predetermined threshold number of accesses.

10. The non-transitory computer readable medium of claim 8, further comprising instructions to:
determine, before deduplicating the first set of redundant data blocks on the one or more storage devices, that the first set of redundant data blocks did not meet the predetermined deduplication requirement for the one or more storage devices and remains duplicated on the one or more storage devices.

11. The non-transitory computer readable medium of claim 8, further comprising instructions to:
maintain a deduplication data structure for storing information for sets of redundant data blocks on the one or more storage devices, the deduplication data structure comprising a plurality of entries, each entry representing one or more sets of redundant data blocks and indicating whether the one or more sets of redundant data blocks meets the predetermined deduplication requirement for the one or more storage devices.

12. The non-transitory computer readable medium of claim 11, wherein:
each entry in the deduplication data structure further indicates whether all of the one or more sets of redundant data blocks have been deduplicated on the one or more storage devices.

13. The non-transitory computer readable medium of claim 11, wherein:
a first entry represents a plurality of sets of redundant data blocks; and
the first entry further indicates individually, for each set of redundant data blocks, whether the set of redundant data blocks has been deduplicated on the one or more storage devices.

14. The non-transitory computer readable medium of claim 8, further comprising instructions to:
store a data block in a deduplicated set of redundant data blocks to the one or more storage devices; and
map a storage system address with the data block in the deduplicated set of redundant data blocks stored to the one or more storage devices.

15. An apparatus, comprising:
a processor; and
memory operatively coupled to the processor, the memory comprising one or more engines configured for execution by the processor, the one or more engines comprising
a storage engine to store one or more sets of redundant blocks on one or more storage devices, with each of the one or more sets of redundant blocks to comprise a plurality of blocks that match in data content;
a cache engine to select a first set of redundant blocks stored on the one or more storage devices for deduplication in a cache memory;
a deduplication engine to deduplicate, on the one or more storage devices, at least one redundant block in the first set of redundant blocks selected by the cache engine for deduplication in the cache memory.

16. The apparatus of claim 15, the deduplication engine to deduplicate on the one or more storage devices a threshold number (THN) sequence of redundant blocks, with each THN sequence of redundant blocks to comprise a plurality of THN sequences of blocks that match in data content.

17. The apparatus of claim 16, the cache engine to deduplicate the THN sequence of redundant blocks in the cache memory.

18. The apparatus of claim 15, the cache engine to deduplicate the first set of redundant blocks in the cache memory.

19. The apparatus of claim 15, the cache engine to select the first set of redundant blocks for deduplication in the cache memory based on the first set of redundant blocks having a combined number of accesses equal to or greater than a predetermined threshold number of accesses.

20. The apparatus of claim 15, comprising one or more data structures to store data to identify redundant blocks for deduplication in the one or more storage devices or the cache memory.

* * * * *